United States Patent
Fuglevand et al.

(10) Patent No.: US 6,387,556 B1
(45) Date of Patent: May 14, 2002

(54) FUEL CELL POWER SYSTEMS AND METHODS OF CONTROLLING A FUEL CELL POWER SYSTEM

(75) Inventors: William A. Fuglevand; Shiblihanna I. Bayyuk; Greg Lloyd; Peter D. Devries; David R. Lott; John P. Scartozzi, all of Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/322,666

(22) Filed: May 28, 1999

Related U.S. Application Data

(63) Continuation-in-part of application No. 09/108,667, filed on Jul. 1, 1998, now Pat. No. 6,096,449, which is a continuation-in-part of application No. 08/979,853, filed on Nov. 20, 1997, now Pat. No. 6,030,718.

(51) Int. Cl.[7] .......................... H01M 8/04; H01M 14/00
(52) U.S. Cl. .............................. 429/22; 429/23; 429/24; 429/25; 429/9
(58) Field of Search .............................. 429/22, 23, 24, 429/25, 9

(56) References Cited

U.S. PATENT DOCUMENTS

| | | | |
|---|---|---|---|
| 3,432,356 A | * | 3/1969 | Christian |
| 3,498,844 A | | 3/1970 | Sanderson |
| 3,507,702 A | | 4/1970 | Sanderson |
| 3,553,023 A | * | 1/1971 | Doyle |
| 3,623,913 A | | 11/1971 | Adlhart et al. |
| 3,808,534 A | | 4/1974 | Summers et al. ............ 340/249 |
| 3,823,358 A | | 7/1974 | Rey ................................ 320/3 |

(List continued on next page.)

FOREIGN PATENT DOCUMENTS

| | | |
|---|---|---|
| GB | 2129237 | 5/1984 |
| WO | WO98/42038 | 9/1998 |

OTHER PUBLICATIONS

U.S. Dept. of Energy; Fuel Cells A Handbook (Revision 3); Jan. 1994, pp. 1–1–9–14.

Prater et al; Solid Polymer Fuel Cell Developments at Ballard; Journal of Power Sources; vol. 37 (1992), pp. 181–188.

Cairns et al.; Recent Advances in Fuel Cells and Their Application to New Hybrid Systems; Nov. 20, 1967; pp. 393–425.

*Avista Labs*, Theory of Fuel Cell Operation, Issue No. 1 1998, pages 1–6 (Month Unknown).

Ronald H. Wolk, Fuel cells for homes and hospitals, *IEEE Spectrum May* 1999, pp. 45–52.

Primary Examiner—Stephen Kalafut
(74) Attorney, Agent, or Firm—Wells, St. John, Roberts, Gregory & Matkin P.S.

(57) ABSTRACT

Fuel cell power systems and methods of controlling a fuel cell power system are provided. According to one aspect, a fuel cell power system includes a plurality of fuel cells electrically coupled with plural terminals and individually configured to convert chemical energy into electricity; and a digital control system configured to at least one of control and monitor an operation of the fuel cells. Another aspect provides a method of controlling a fuel cell power system including providing a plurality of fuel cells individually configured to convert chemical energy into electricity; electrically coupling the plurality of fuel cells; providing a first terminal coupled with the fuel cells; providing a second terminal coupled with the fuel cells; and coupling a digital control system with the fuel cells to at least one of monitor and control an operation of the fuel cells.

300 Claims, 28 Drawing Sheets

U.S. PATENT DOCUMENTS

| | | | | |
|---|---|---|---|---|
| 3,964,930 A | | 6/1976 | Riser ........................... 136/86 |
| 4,035,551 A | | 7/1977 | Grevstad | |
| 4,192,906 A | | 3/1980 | Maru ........................... 429/13 |
| 4,435,252 A | | 3/1984 | Kadija | |
| 4,467,018 A | | 8/1984 | Schroll ........................ 429/18 |
| 4,500,612 A | | 2/1985 | Fujii et al. .................... 426/26 |
| 4,510,211 A | | 4/1985 | Struthers ..................... 429/18 |
| 4,670,702 A | | 6/1987 | Yamada et al. ........... 429/23 X |
| 4,769,297 A | | 9/1988 | Reiser et al. ................. 429/17 |
| 4,913,983 A | * | 4/1990 | Chelky ..................... 429/22 X |
| 4,961,151 A | | 10/1990 | Early et al. ................. 364/492 |
| 4,973,531 A | | 11/1990 | Zaima et al. | |
| 4,994,331 A | | 2/1991 | Cohen ......................... 429/17 |
| 5,023,150 A | * | 6/1991 | Takabayashi ................ 429/22 |
| 5,045,414 A | | 9/1991 | Bushnell et al. .......... 429/23 X |
| 5,047,298 A | | 9/1991 | Perry, Jr. et al. .............. 429/17 |
| 5,109,186 A | | 4/1992 | Lieu .......................... 323/299 |
| 5,154,986 A | | 10/1992 | Takechi et al. ............... 429/23 |
| 5,156,928 A | * | 10/1992 | Takabayashi ................ 428/23 |
| 5,192,627 A | | 3/1993 | Perry, Jr. et al. .............. 429/17 |
| 5,200,278 A | | 4/1993 | Watkins et al. ............... 429/24 |
| 5,200,279 A | | 4/1993 | Draper et al. ................ 429/30 |
| 5,248,566 A | | 9/1993 | Kumar ........................ 429/33 |
| 5,292,599 A | | 3/1994 | Sona et al. ................... 429/30 |
| 5,304,430 A | | 4/1994 | Ludwig ....................... 429/17 |
| 5,306,574 A | | 4/1994 | Singh et al. .................. 429/13 |
| 5,334,463 A | | 8/1994 | Tajima et al. | |
| 5,336,570 A | | 8/1994 | Dodge, Jr. ................... 429/31 |
| 5,338,622 A | | 8/1994 | Hsu et al. .................... 429/26 |
| 5,344,721 A | | 9/1994 | Somai et al. ................. 429/20 |
| 5,354,626 A | | 10/1994 | Kobayashi et al. ........... 429/30 |
| 5,358,799 A | | 10/1994 | Gardner ....................... 429/26 |
| 5,364,711 A | | 11/1994 | Yamada et al. .............. 429/15 |
| 5,366,818 A | | 11/1994 | Wilkinson et al. ............ 429/13 |
| 5,419,980 A | | 5/1995 | Okamoto et al. ............. 429/32 |
| 5,470,671 A | | 11/1995 | Fletcher et al. ............... 429/26 |
| 5,500,292 A | | 3/1996 | Muranaka et al. .......... 429/209 |
| 5,502,629 A | | 3/1996 | Ito et al. ....................... 363/60 |
| 5,519,312 A | | 5/1996 | Wang et al. .................. 323/60 |
| 5,532,072 A | | 7/1996 | Spaeh et al. .................. 429/34 |
| 5,532,572 A | | 7/1996 | Okamura | |
| 5,534,362 A | | 7/1996 | Okamato et al. ............. 429/32 |
| 5,599,638 A | | 2/1997 | Surampudi et al. ........... 429/33 |
| 5,607,785 A | | 3/1997 | Tozawa et al. | |
| 5,658,681 A | | 8/1997 | Sato et al. | |
| 5,680,027 A | | 10/1997 | Hiratsuka et al. | |
| 5,691,622 A | | 11/1997 | Mack et al. | |
| 5,707,755 A | | 1/1998 | Grot | |
| 5,714,874 A | * | 2/1998 | Bonnefoy ................... 323/299 |
| 5,759,712 A | | 6/1998 | Hockaday .................... 429/30 |
| 5,763,113 A | | 6/1998 | Meltser et al. ................ 429/13 |
| 5,776,625 A | | 7/1998 | Kaufman et al. ............. 429/30 |
| 5,780,981 A | | 7/1998 | Sonntag et al. | |
| 5,798,186 A | | 8/1998 | Fletcher et al. ............... 429/13 |
| 5,877,600 A | * | 3/1999 | Sonntag .................... 429/24 X |
| 5,925,322 A | | 7/1999 | Werth ........................ 422/170 |
| 5,931,658 A | | 8/1999 | Sederquist et al. ......... 431/207 |
| 5,935,726 A | | 8/1999 | Chow et al. .................. 429/13 |
| 5,985,474 A | | 11/1999 | Chen et al. | |
| 6,001,499 A | * | 12/1999 | Grot et al. .................... 429/22 |
| 6,007,931 A | | 12/1999 | Fuller et al. .................. 429/13 |
| 6,013,385 A | * | 1/2000 | Dubose .................... 429/24 X |
| 6,015,634 A | | 1/2000 | Bonville, Jr. et al. ......... 429/17 |
| 6,030,718 A | | 2/2000 | Fulevand et al. ............. 429/26 |
| 6,045,934 A | | 4/2000 | Enami ......................... 429/30 |
| 6,051,192 A | | 4/2000 | Maston et al. .............. 422/110 |
| 6,051,331 A | | 4/2000 | Spear | |
| 6,096,449 A | * | 8/2000 | Fuglevand et al. ....... 429/23 X |
| 6,194,095 B1 | | 2/2001 | Hockaday .................... 429/34 |
| 6,214,484 B1 | | 4/2001 | Hauer ............................ 429/9 |
| 6,214,487 B1 | | 4/2001 | Kelley et al. ................. 429/73 |
| 6,242,120 B1 | | 6/2001 | Herron ........................ 429/22 |

\* cited by examiner

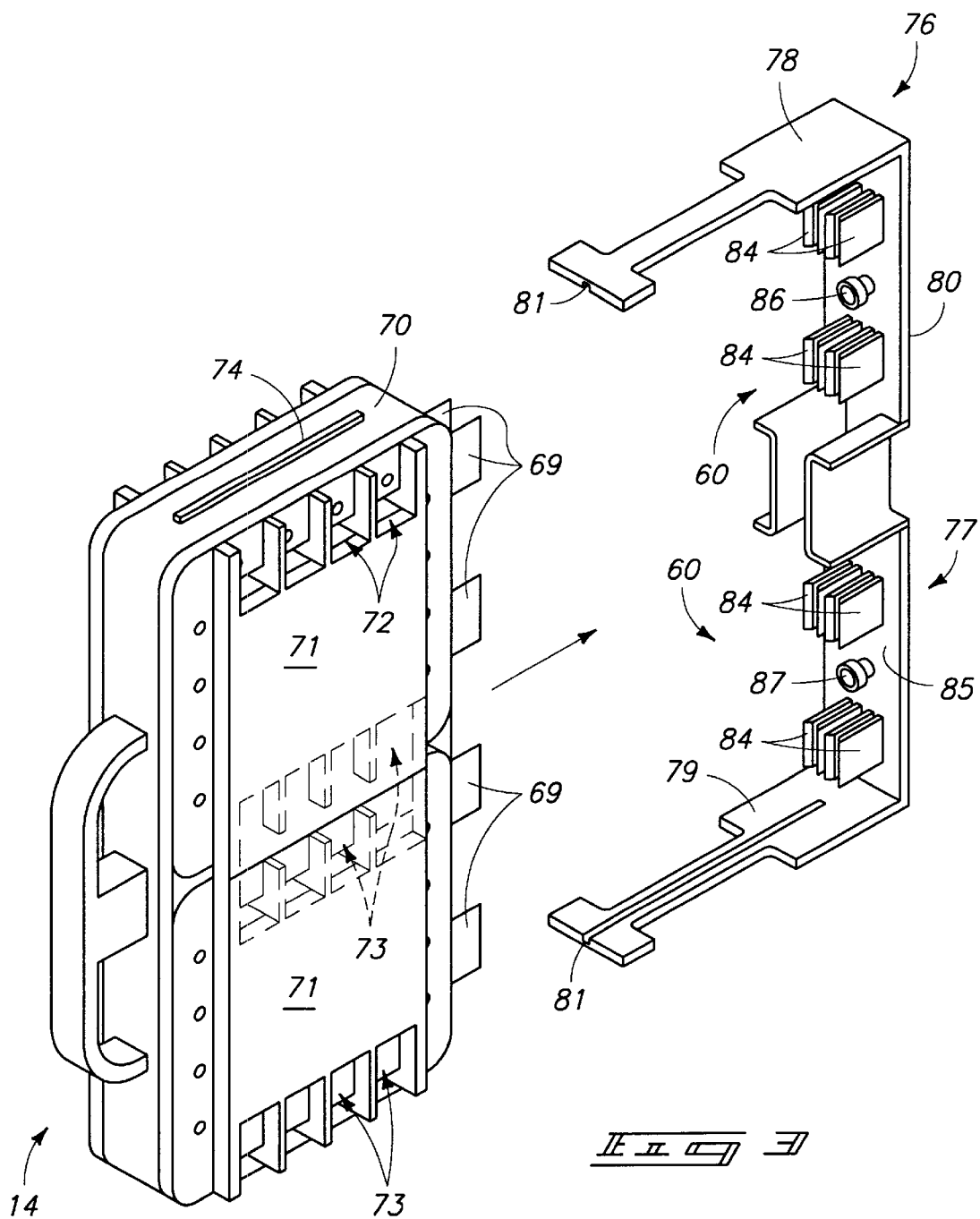

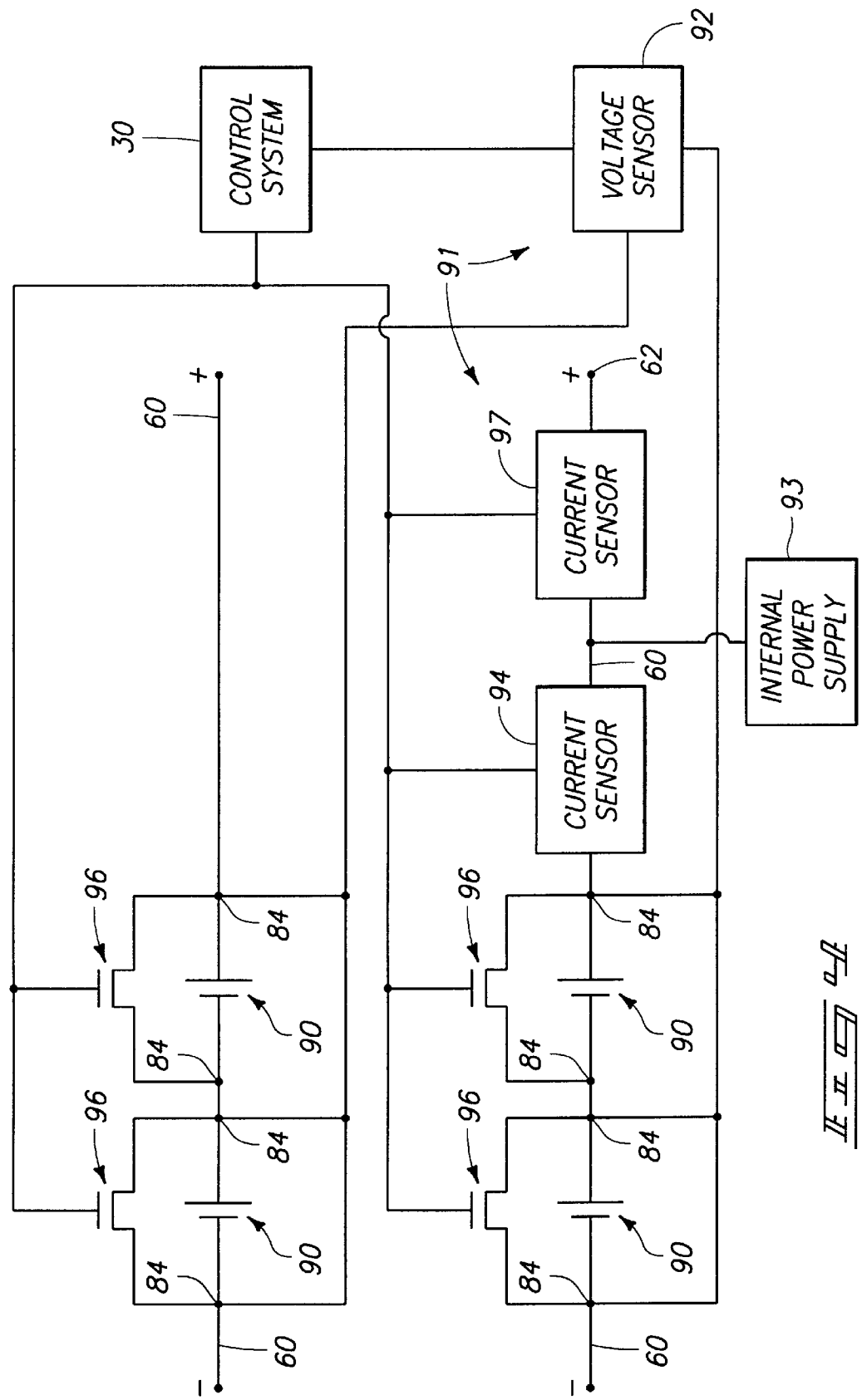

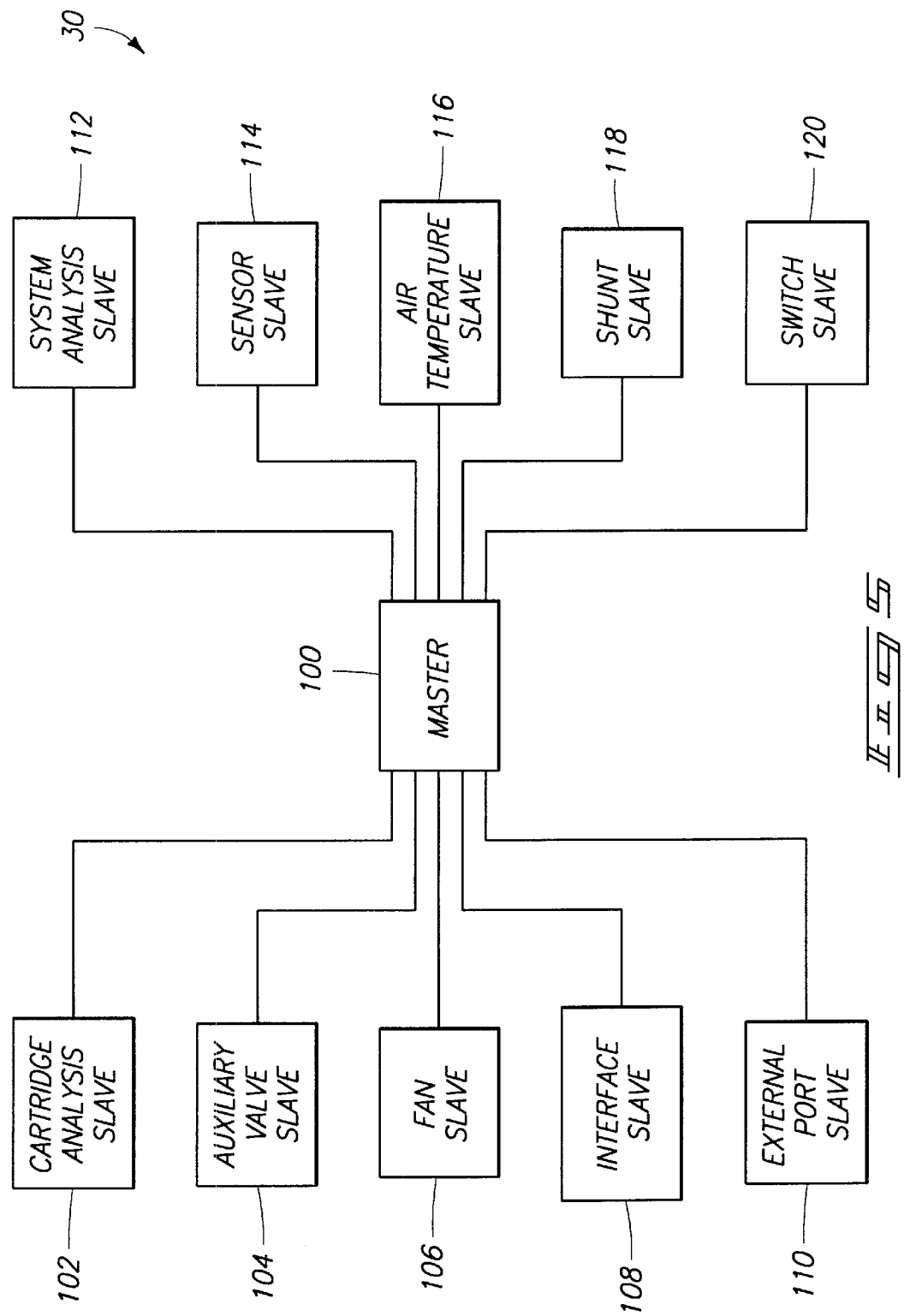

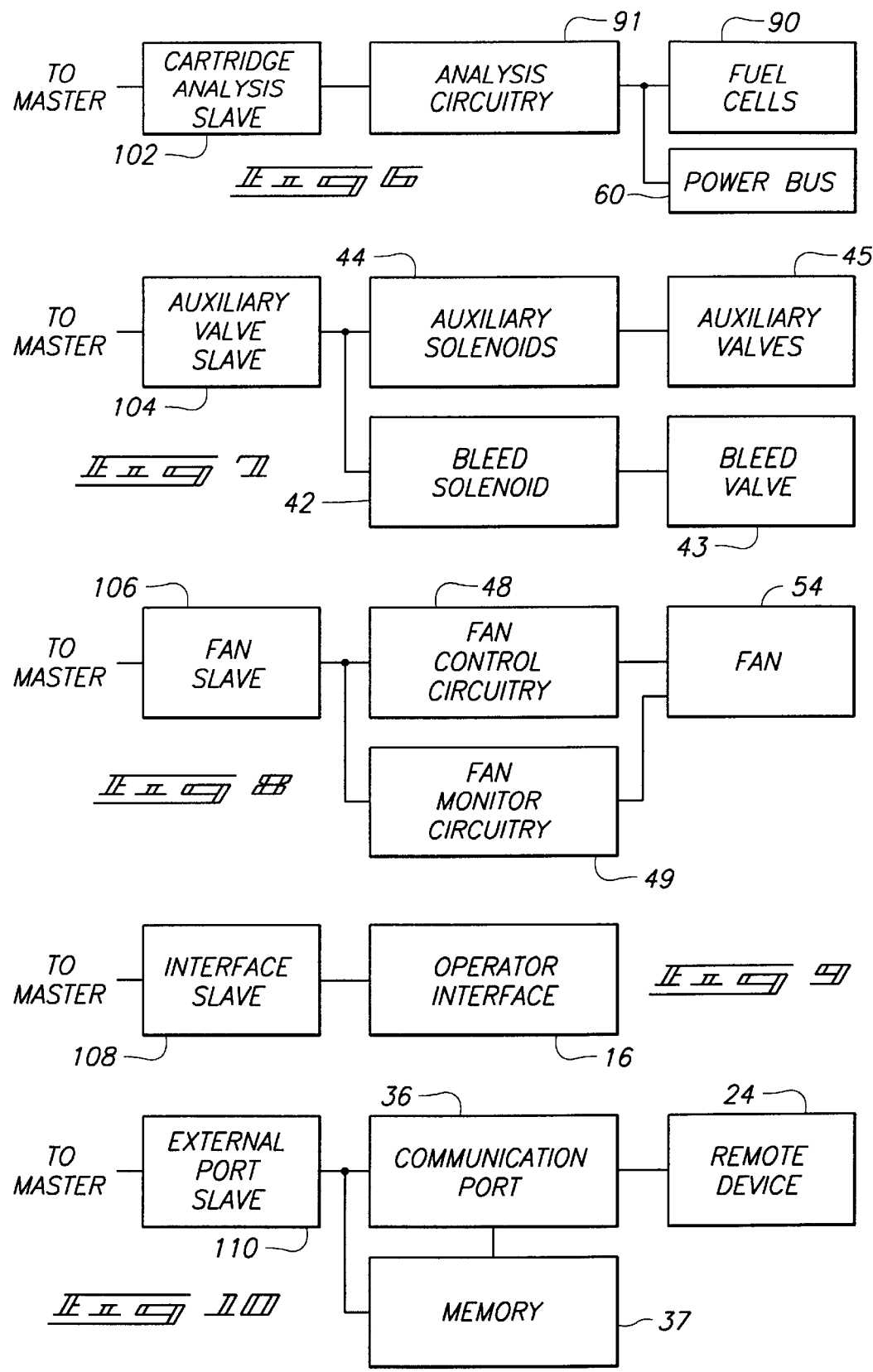

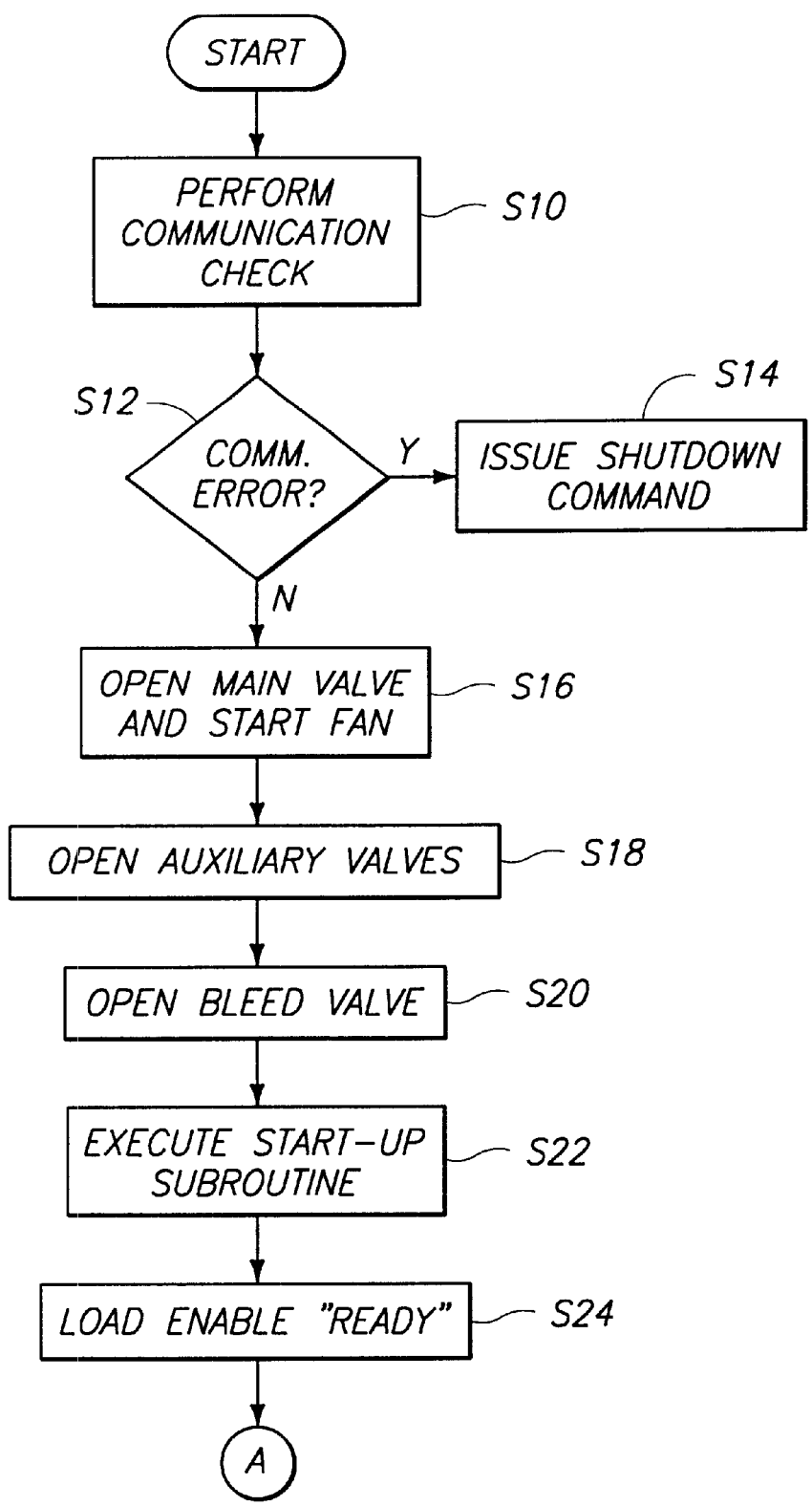

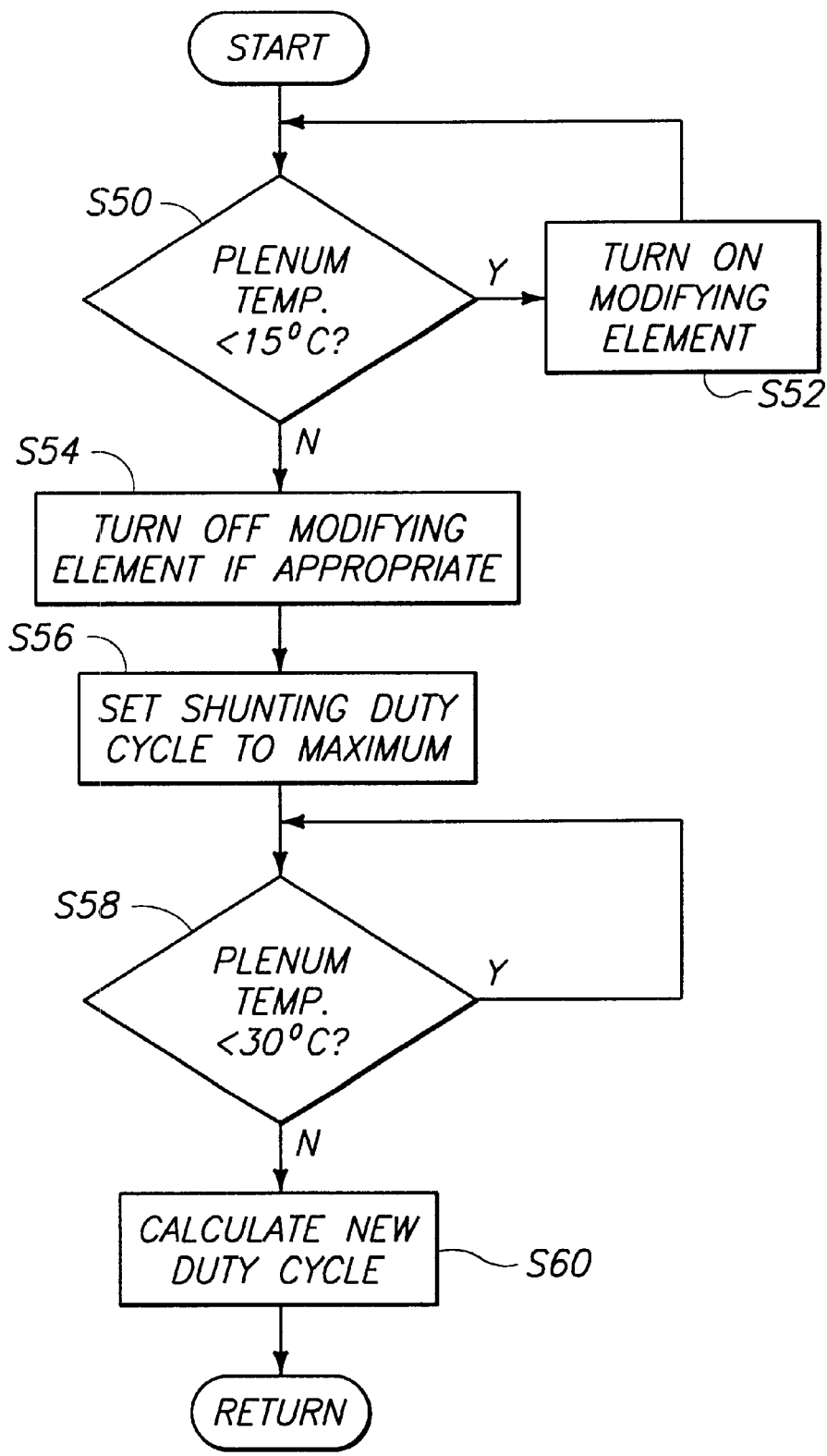

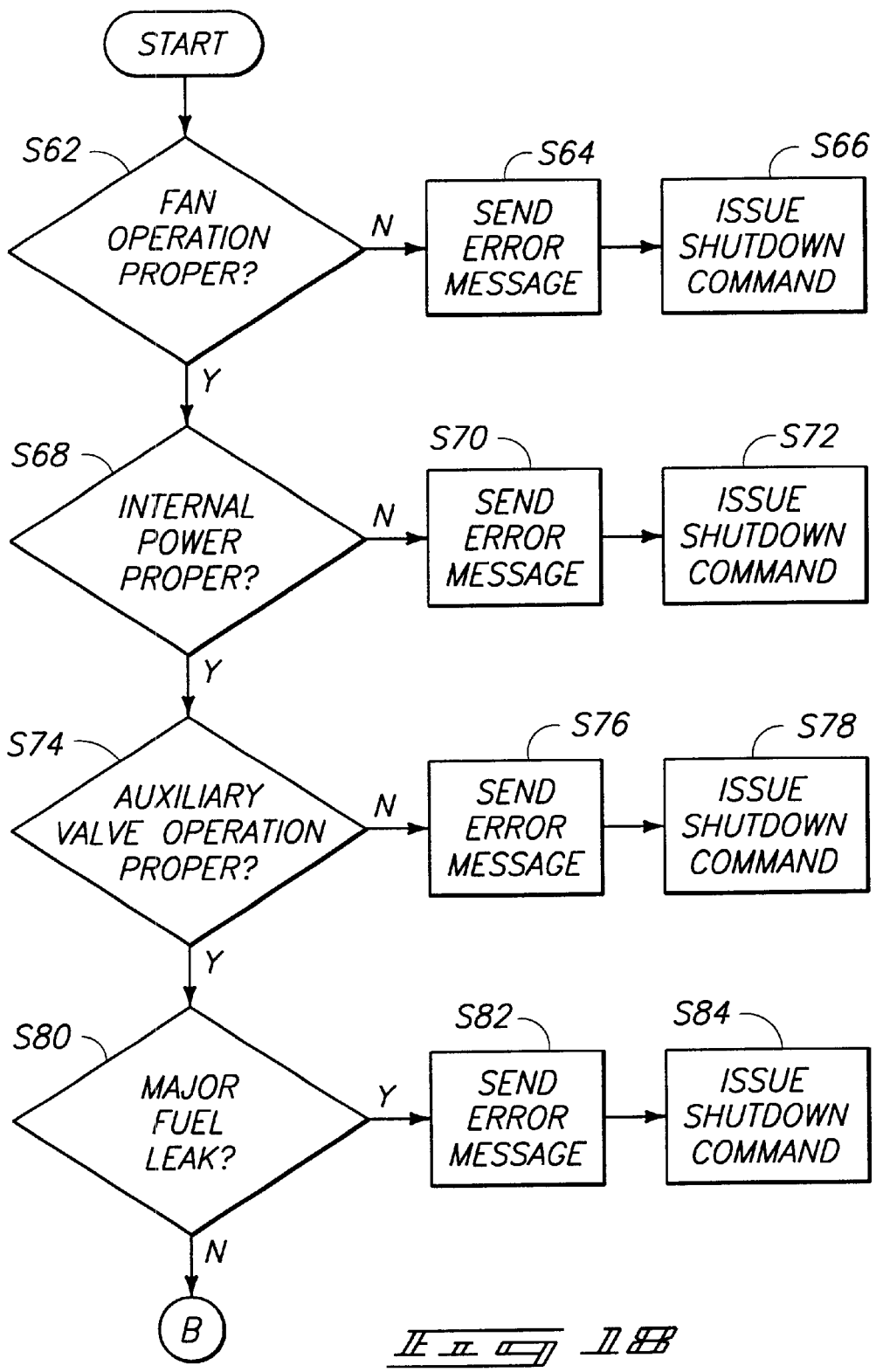

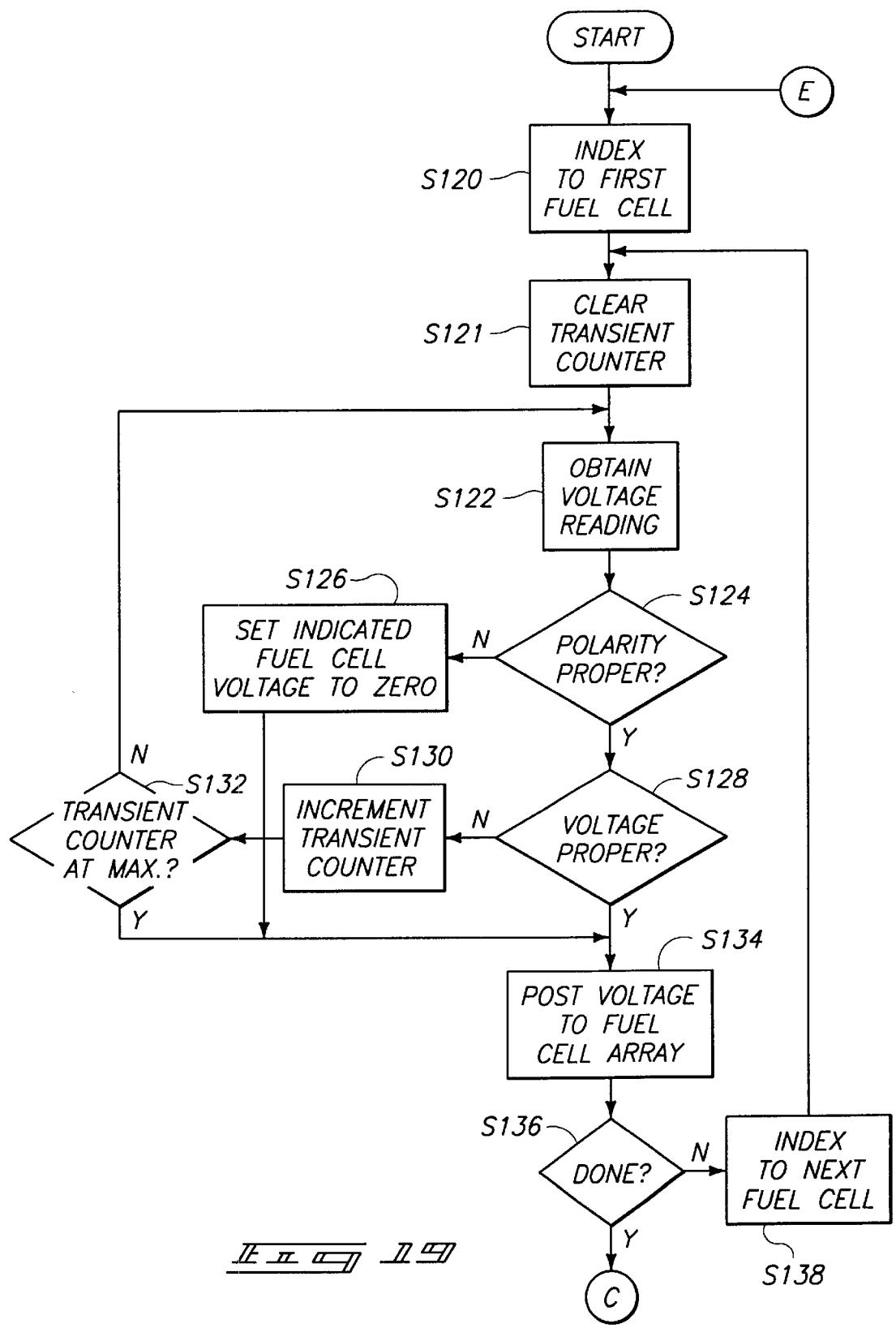

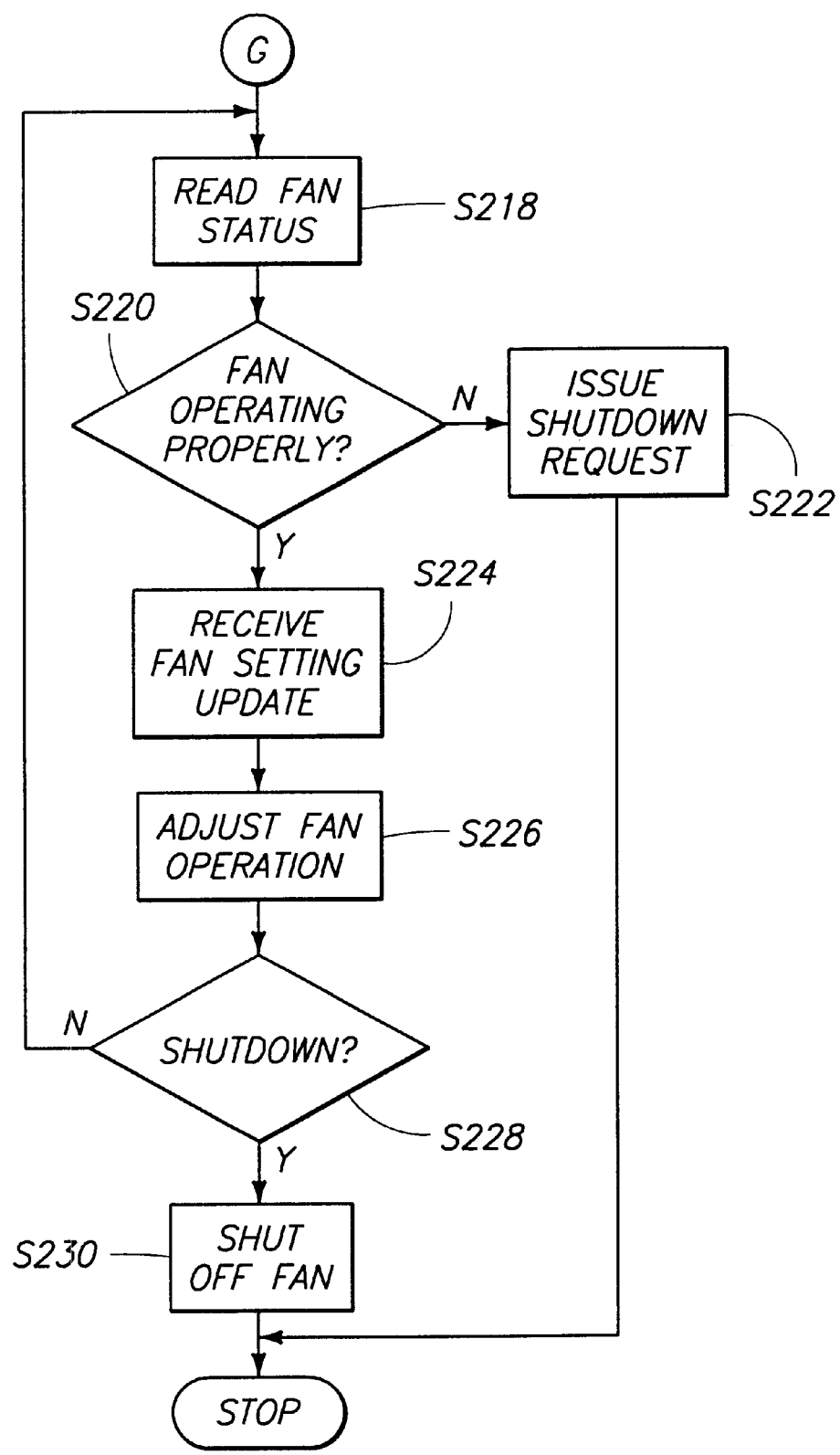

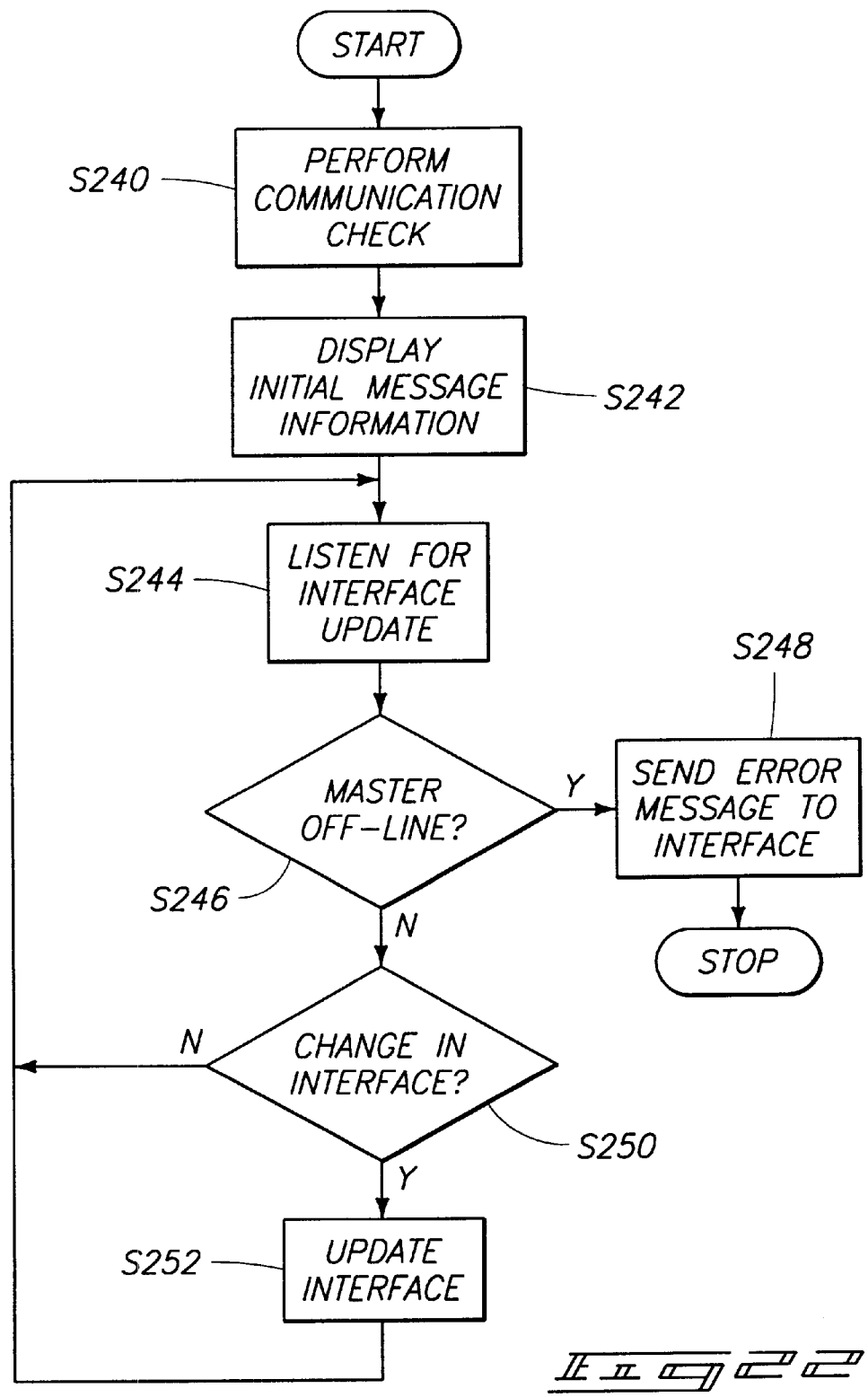

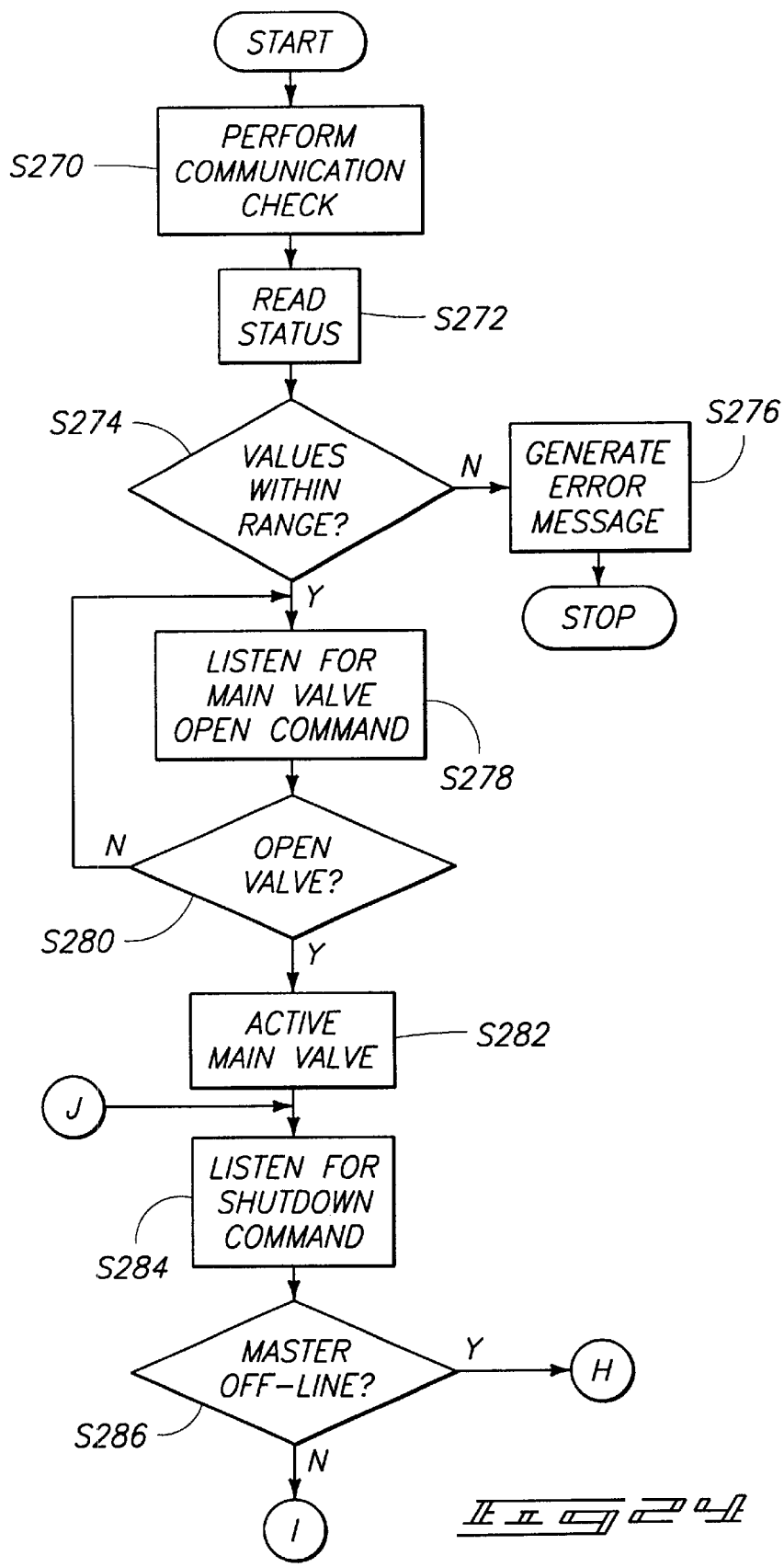

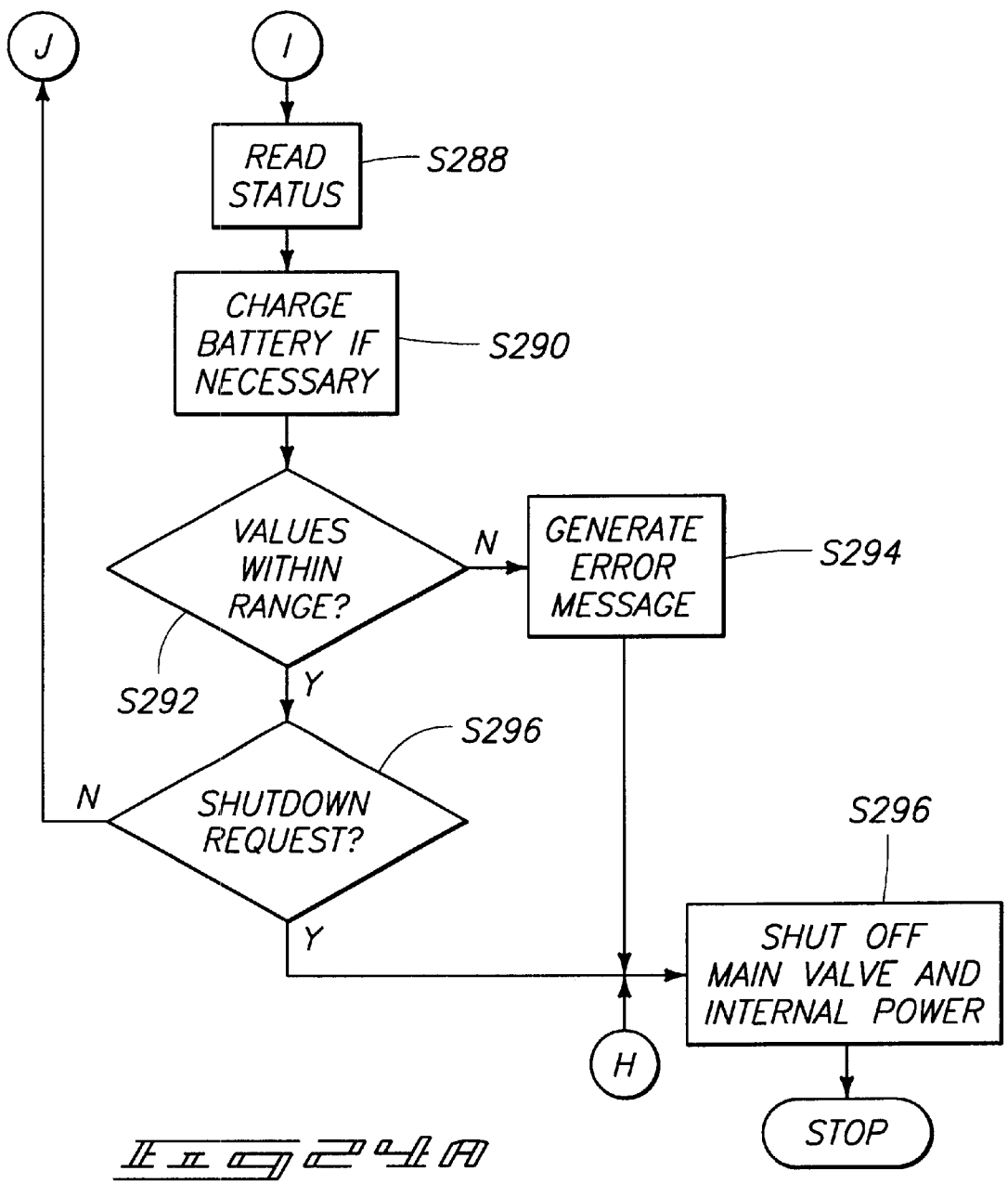

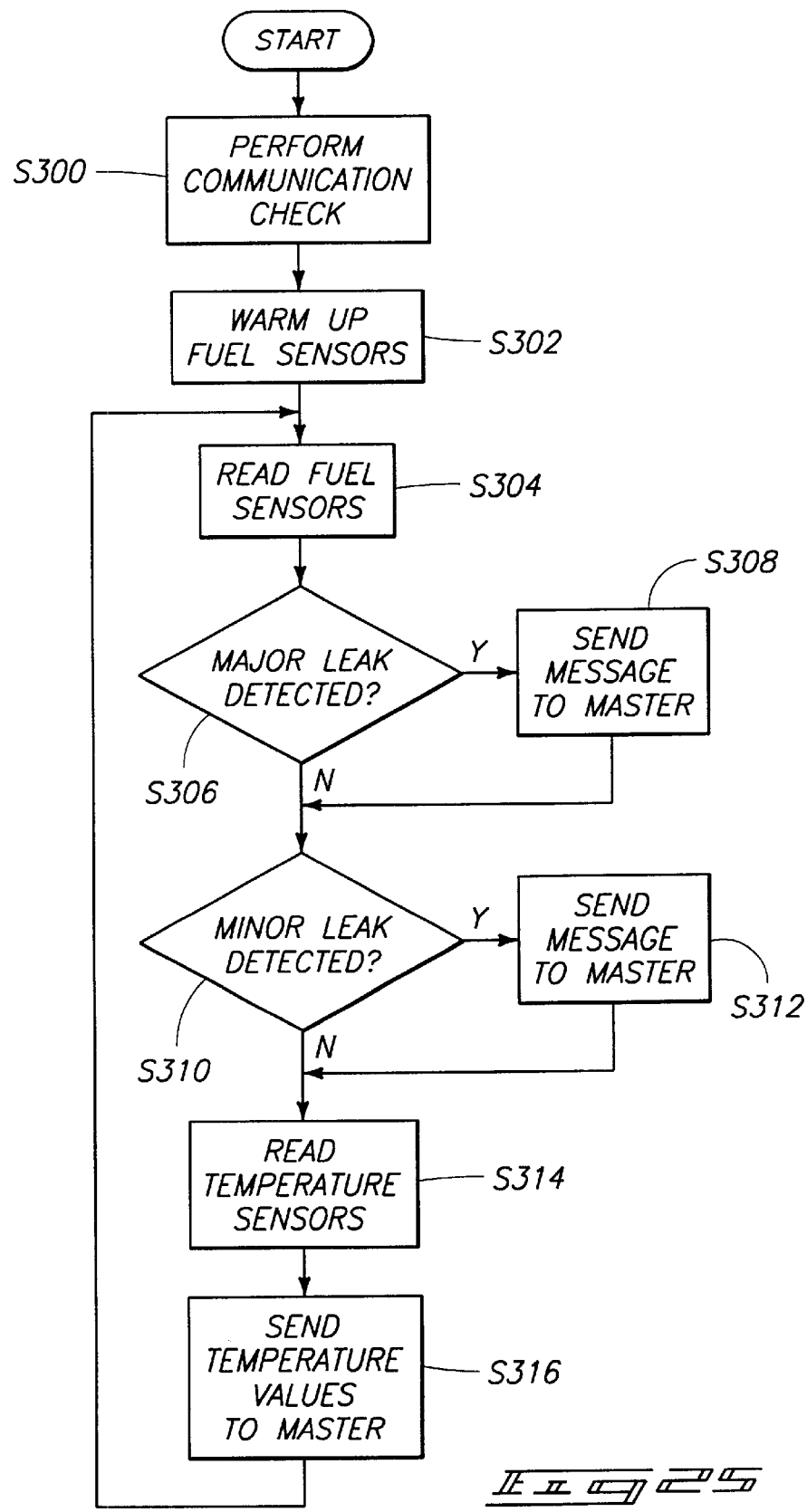

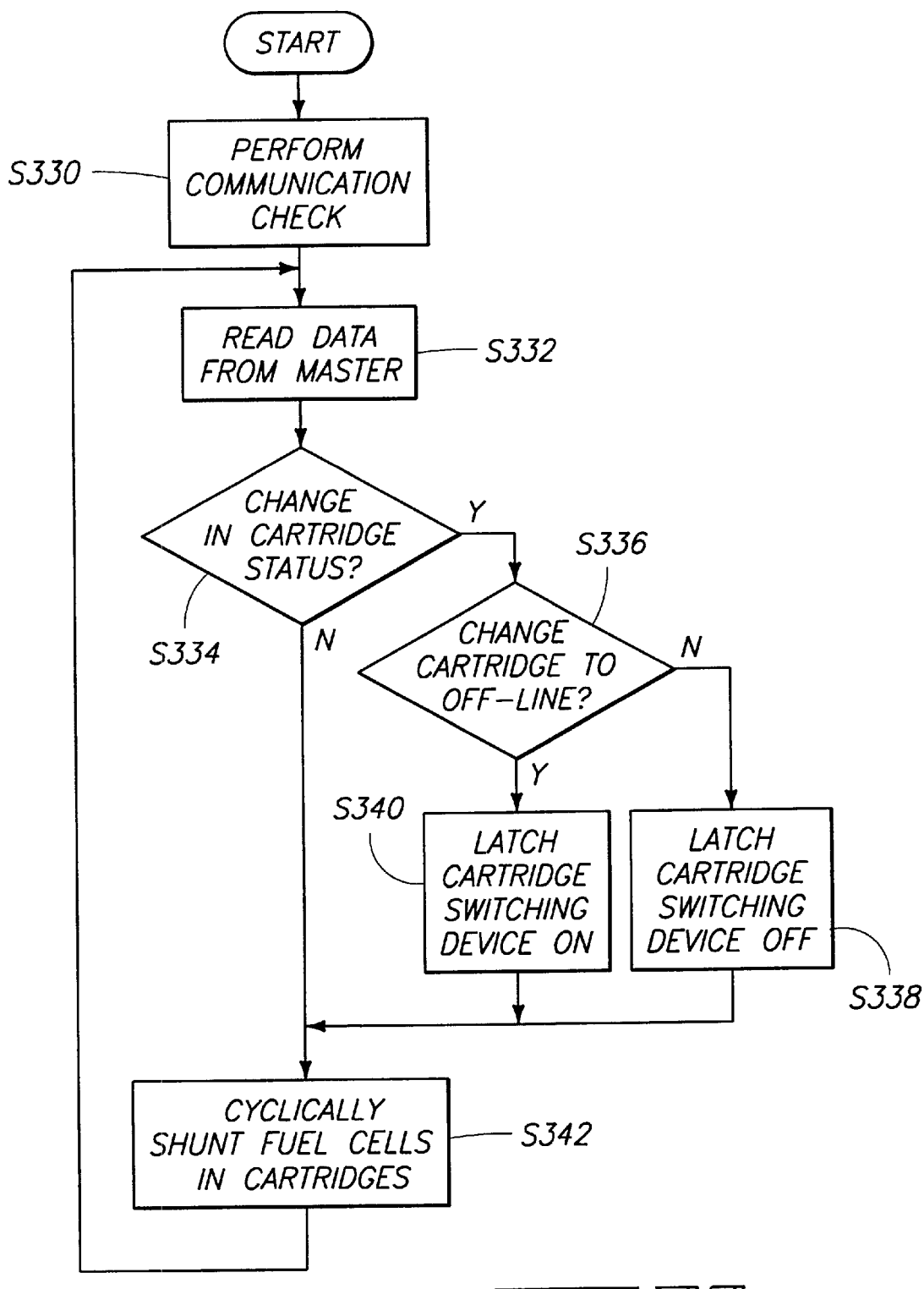

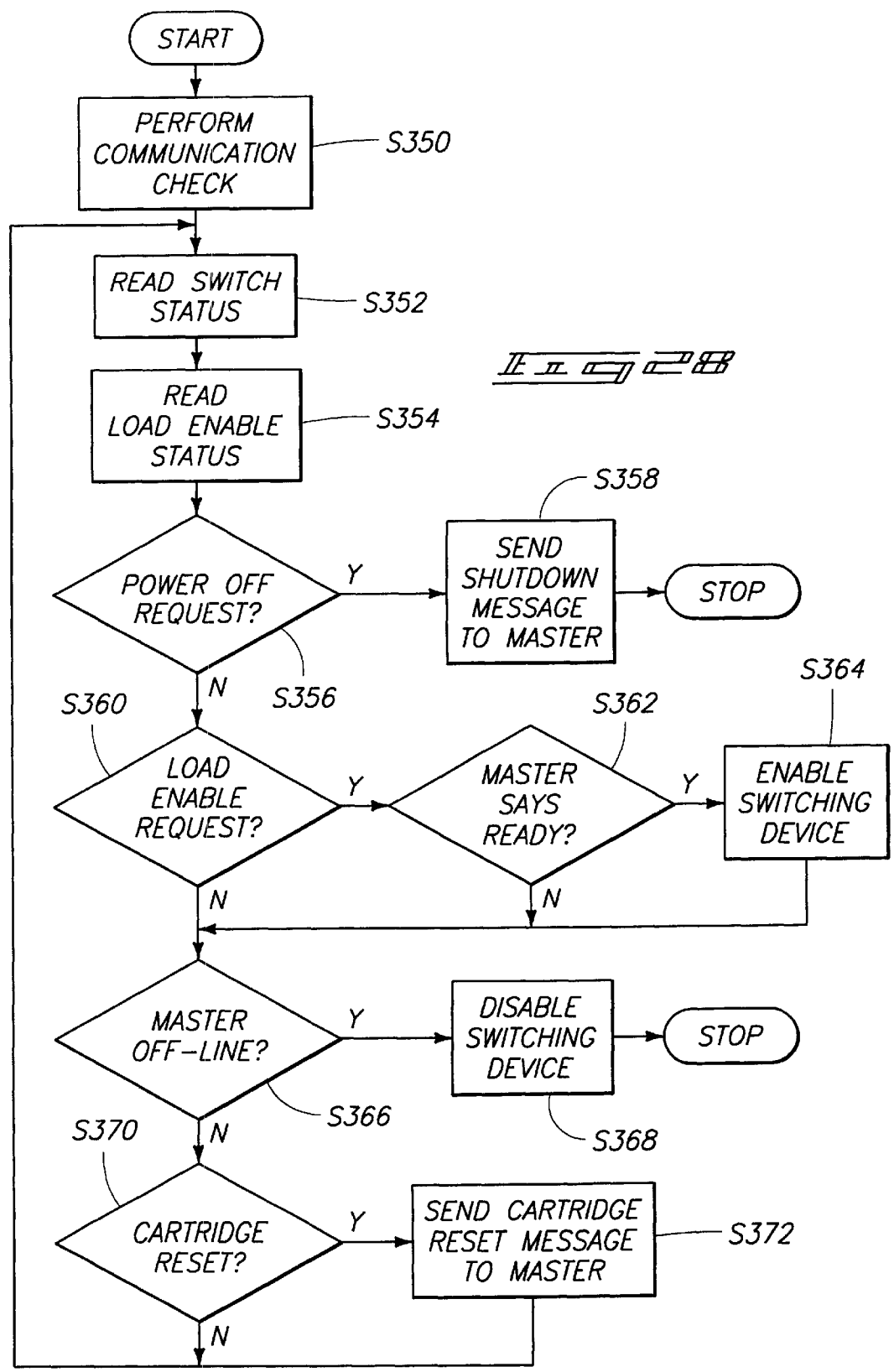

FUEL CELL POWER SYSTEMS AND METHODS OF CONTROLLING A FUEL CELL POWER SYSTEM

RELATED PATENT DATA

The present application is a continuation-in-part of U.S. patent application Ser. No. 09/108,667, filed on Jul. 1, 1998, now U.S. Pat. No. 6,096,499 which was a continuation-in-part of U.S. patent application Ser. No. 08/979,853, filed on Nov. 20, 1997 now U.S. Pat. No. 6,030,718.

TECHNICAL FIELD

The present invention relates to fuel cell power systems and methods of controlling a fuel cell power system.

BACKGROUND OF THE INVENTION

Fuel cells are known in the art. The fuel cell is an electrochemical device which reacts hydrogen, and oxygen, which is usually supplied from the ambient air, to produce electricity and water. The basic process is highly efficient and fuel cells fueled directly by hydrogen are substantially pollution free. Further, since fuel cells can be assembled into stacks of various sizes, power systems have been developed to produce a wide range of electrical power output levels and thus can be employed in numerous industrial applications.

Although the fundamental electrochemical processes involved in all fuel cells are well understood, engineering solutions have proved elusive for making certain fuel cell types reliable, and for others economical. In the case of polymer electrolyte membrane (PEM) fuel cell power systems reliability has not been the driving concern to date, but rather the installed cost per watt of generation capacity has. In order to further lower the PEM fuel cell cost per watt, much attention has been directed to increasing the power output of same. Historically, this has resulted in additional sophisticated balance-of-plant systems which are necessary to optimize and maintain high PEM fuel cell power output. A consequence of highly complex balance-of-plant systems is that they do not readily scale down to low capacity applications. Consequently, cost, efficiency, reliability and maintenance expenses are all adversely effected in low generation applications.

It is well known that single PEM fuel cells produce a useful voltage of only about 0.45 to about 0.7 volts D.C. per cell under a load. Practical PEM fuel cell plants have been built from multiple cells stacked together such that they are electrically connected in series. It is further well known that PEM fuel cells can operate at higher power output levels when supplemental humidification is made available to the proton exchange membrane (electrolyte). In this regard, humidification lowers the resistance of proton exchange membranes to proton flow. To achieve this increased humidification, supplemental water can be introduced into the hydrogen or oxygen streams by various methods, or more directly to the proton exchange membrane by means of the physical phenomenon known as of wicking, for example. The focus of investigations, however, in recent years has been to develop membrane electrode assemblies (MEA) with increasingly improved power output when running without supplemental humidification. Being able to run an MEA when it is self-humidified is advantageous because it decreases the complexity of the balance-of-plant with its associated costs. However, self-humidification heretofore has resulted in fuel cells running at lower current densities and thus, in turn, has resulted in more of these assemblies being required in order to generate a given amount of power.

While PEM fuel cells of various designs have operated with varying degrees of success, they have also had shortcomings which have detracted from their usefulness. For example, PEM fuel cell power systems typically have a number of individual fuel cells which are serially electrically connected (stacked) together so that the power system can have a increased output voltage. In this arrangement, if one of the fuel cells in the stack fails, it no longer contributes voltage and power. One of the more common failures of such PEM fuel cell power systems is where a membrane electrode assembly (MEA) becomes less hydrated than other MEAs in the same fuel cell stack. This loss of membrane hydration increases the electrical resistance of the effected fuel cell, and thus results in more waste heat being generated. In turn, this additional heat drys out the membrane electrode assembly. This situation creates a negative hydration spiral. The continual overheating of the fuel cell can eventually cause the polarity of the effected fuel cell to reverse such that it now begins to dissipate electrical power from the rest of the fuel cells in the stack. If this condition is not rectified, excessive heat generated by the failing fuel cell may cause the membrane electrode assembly to perforate and thereby leak hydrogen. When this perforation occurs the fuel cell stack must be completely disassembled and repaired. Depending upon the design of fuel cell stack being employed, this repair or replacement may be a costly, and time consuming endeavor.

Further, designers have long sought after a means by which current densities in self-humidified PEM fuel cells can be enhanced while simultaneously not increasing the balance-of-plant requirements for these same devices.

BRIEF DESCRIPTION OF THE DRAWINGS

Preferred embodiments of the invention are described below with reference to the following accompanying drawings.

FIG. 3 is an exploded perspective view of one configuration of a fuel cell cartridge of the fuel cell power system.

FIG. 4 is a schematic representation of one embodiment of circuitry coupled with plural fuel cells of the fuel cell cartridge.

FIG. 5 is a functional block diagram of one configuration of the control system for the fuel cell power system.

FIG. 6 is a functional block diagram of a cartridge analysis slave controller of the control system coupled with associated circuitry and components.

FIG. 7 is a functional block diagram of an auxiliary valve slave controller of the control system coupled with associated circuitry and components.

FIG. 8 is a functional block diagram of a fan slave controller of the control system coupled with associated circuitry and components.

FIG. 9 is a functional block diagram of an interface slave controller of the control system coupled with associated circuitry and components.

FIG. 10 is a functional block diagram of an external port slave controller of the control system coupled with associated circuitry and components.

FIGS. 16–16A are a flow chart illustrating exemplary operations of a master controller of the control system.

FIG. 17 is a flow chart illustrating an exemplary start-up operation of the master controller.

FIGS. 18–18A are a flow chart illustrating exemplary error operations of the master controller.

FIGS. 19–19B are a flow chart of exemplary operations of the cartridge analysis slave controller.

FIGS. 21–21A are a flow chart illustrating exemplary operations of the fan slave controller of the control system.

FIG. 22 is a flow chart illustrating exemplary operations of the interface slave controller of the control system.

FIGS. 24–24A are a flow chart illustrating exemplary operations of the system analysis slave controller of the control system.

FIG. 25 is a flow chart illustrating exemplary operations of the sensor slave controller of the control system.

FIG. 27 is a flow chart illustrating exemplary operations of the shunt slave controller of the control system.

FIG. 28 is a flow chart illustrating exemplary operations of the switch slave controller of the control system.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
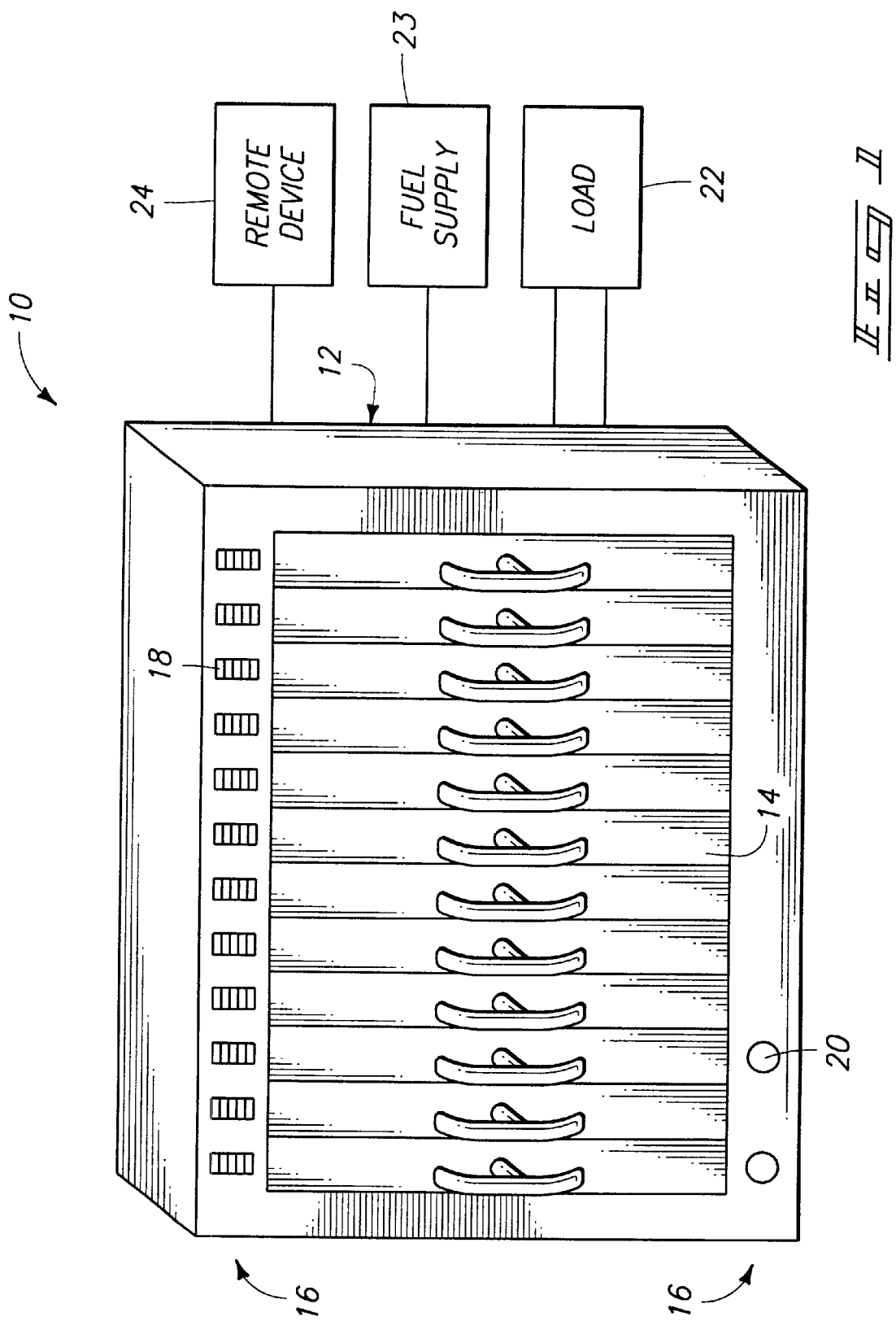
FIG. 1 is a prospective view of one embodiment of a fuel cell power system according to the present invention.

Referring to FIG. 1, one configuration of a fuel cell power system 10 is illustrated. The depicted configuration of fuel cell power system 10 is exemplary and other configurations are possible. As shown, fuel cell power system 10 includes a housing 12 provided about a plurality of fuel cell cartridges 14. Housing 12 defines a subrack assembly in the described embodiment.

Fuel cell power system 10 is configured to utilize one or more of fuel cell cartridges 14. Twelve such fuel cell cartridges 14 are utilized in the embodiment of fuel cell power 10 described herein. As described below, individual fuel cell cartridges 14 include a plurality of fuel cells. In the described configuration, individual fuel cell cartridges 14 include four fuel cells.

Such fuel cells can comprise polymer electrolyte membrane (PEM) fuel cells. In the described embodiment, the fuel cells can comprise membrane electrode assembly (MEA) fuel cells or membrane electrode diffusion assembly (MEDA) fuel cells. Further details of one configuration of fuel cells and fuel cell cartridges 14 are described in a co-pending U.S. patent application Ser. No. 08/979,853, entitled "A Proton Exchange Membrane Fuel Cell Power System", filed Nov. 20, 1997, naming William A. Fuglevand, Dr. Shiblihanna I. Bayyuk, Ph.D., Greg A. Lloyd, Peter D. Devries, David R. Lott, John P. Scartozzi, Gregory M. Somers and Ronald G. Stokes as inventors, assigned to the assignee hereof, and incorporated herein by reference.

Housing 12 additionally includes an operator interface 16. In the present embodiment, operator interface 16 includes a display 18 and interface switches 20. Operator interface 16 is configured to indicate operation of fuel cell power system 10 and also enable an operator to control various functions of fuel cell power system 10.

Display 18 of operator interface 16 is configured to emit a human perceptible signal, such as visible signals, to indicate operation of fuel cell power system 10. In the depicted embodiment, display 18 comprises a plurality of light emitting diode (LED) bar graph arrays to indicate operational conditions of respective fuel cell cartridges 14. In one configuration, individual bar graph arrays of display 18 indicate high and low voltages of fuel cells within the corresponding fuel cell cartridge 14.

Interface switches 20 permit a user to control operations of fuel cell power system 10. For example, one interface switch 20 can be provided to enable a user to turn on fuel cell power system 10. In addition, another interface switch 20 can include a load enable switch which permits a user to selectively apply power from fuel cell power system 10 to a load 22 coupled with the fuel cell power system 10. Another interface switch 20 can control a cartridge reset function a described below.

Figure 2:
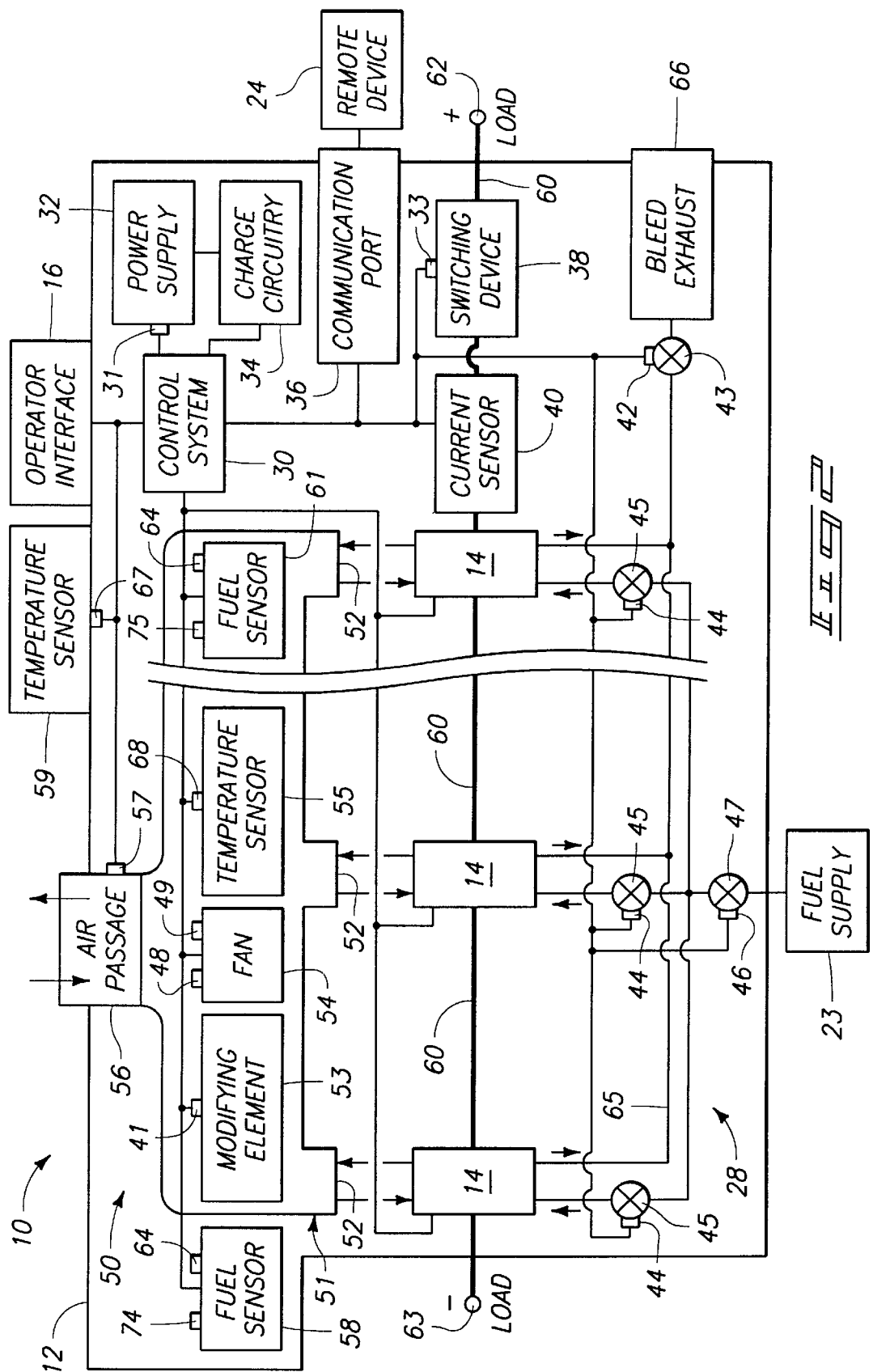
FIG. 2 is an illustrative representation of a control system coupled with components of the fuel cell power system.

Referring to FIG. 2, some components of fuel cell power system 10 are shown. The components are internal and external of housing 12 of fuel cell power system 10. Internally, only three fuel cell cartridges 14 are shown for purposes of discussion herein. More fuel cell cartridges 14 are provided in typical configurations.

Fuel cell power system 10 is shown coupled with a remote device 24. Fuel cell power system 10 is preferably configured to communicate with remote device 24. An exemplary remote device 24 comprises an off-site control and monitoring station. Fuel cell power system 10 receives communications from remote device 24 which may comprise data and commands. Fuel cell power system 10 is also configured to output data, requests, etc. to remote device 24.

The depicted components include the plural fuel cell cartridges 14 and operator interface 16 discussed above. In addition, fuel cell power system 10 includes a control system 30. One configuration of control system 30 is described below in detail. The illustrated control system 30 is coupled with a power supply sensor 31 associated with a power supply 32, and charge circuitry 34. Control system 30 is additionally coupled with fuel cell cartridges 14 and operator interface 16. Further, control system 30 is coupled with a communication port 36, switching device 38 and current sensor 40. Control system 30 is additionally coupled with a bleed solenoid 42 associated with a bleed valve 43.

The depicted fuel cell power system 10 includes a fuel delivery system 28. Fuel delivery system 28 couples with a fuel supply 23 to supply fuel to fuel cell cartridges 14. Exemplary fuel comprises hydrogen gas in the described embodiment. Other fuels may be possible.

The depicted fuel delivery system 28 includes a main valve 47 and plural auxiliary valves 45 associated with respective fuel cell cartridges 14. Main valve 47 controls the flow of fuel from fuel supply 23 into fuel cell power system 10. Auxiliary valves 45 control the flow of fuel to respective fuel cell cartridges 14. Control system 30 is coupled with plural auxiliary solenoids 44 of associated auxiliary valves 45. Control system 30 is further coupled with a main solenoid 46 of associated main valve 47.

The depicted fuel cell power system 10 includes an air temperature control assembly 50. The illustrated air temperature control assembly 50 includes a plenum 51 having associated ports 52 corresponding to fuel cell cartridges 14. Within plenum 51 of air temperature control assembly 50, a temperature modifying element 53, fan 54, temperature sensor 55 and fuel sensor 61 are provided.

A controllable air flow device or air passage 56 couples plenum 51 to exterior ambient air outside of housing 12. Air passage 56 can permit the intake of air into plenum 51 as well as the exhaustion of air from plenum 51. Control system 30 is coupled with control circuitry 51 of modifying element 53, control circuitry 48 and monitoring circuitry 49 of fan 54, temperature circuitry 68 associated with temperature sensor 55, control circuitry 57 of air passage 56, and heater 75 of fuel sensor 61.

A first fuel sensor 58 is provided within housing 12 and outside of plenum 51 as shown. First fuel sensor 58 is operable to monitor for the presence of fuel within housing 12. A second fuel sensor 61 is provided within plenum 51 to monitor for the presence of fuel within plenum 51. Control system 30 is configured to couple with fuel detection circuitry 64 associated with fuel sensors 58, 61. Fuel detection circuitry 64 can condition measurements obtained from sensors 58, 61.

Heaters 74, 75 are coupled with respective fuel sensors 58, 61 to provide selective heating of fuel sensors 58, 61 responsive to control from control system 30. Heaters 74, 75 are integral of fuel sensors 58, 61 in some configurations. An exemplary fuel sensor configuration with an integral heater has designation TGS 813 available from Figaro Engineering, Inc. Such heaters are preferably provided in a predefined temperature range to assure proper operation. Other configurations of sensors 58, 61 are possible.

An external temperature sensor 59 is provided outside of housing 12 in one embodiment. Control system 30 is also coupled with temperature circuitry 67 associated with temperature sensor 59 to monitor the exterior temperature. Temperature circuitry 67 conditions signals received from temperature sensor 59.

Control system 30 is configured to at least one of control and monitor at least one operation of fuel cell power system 10. During operation, fuel from fuel supply 23 is applied to main valve 47. Main valve 47 is coupled with auxiliary valves 45 as shown. Responsive to control from control system 30, main valve 47 and auxiliary valves 45 apply fuel to respective fuel cell cartridges 14. Responsive to the supply of fuel, and in the presence of oxygen, fuel cell cartridges 14 produce electrical power.

A power bus 60 couples the fuel cell cartridges 14 in series. Power bus 60 is coupled with external terminals 62, 63 which may be connected with an external load 22 (shown in FIG. 1). Terminal 62 provides a positive terminal and terminal 63 provides a negative terminal of fuel cell power system 10.

Air temperature control assembly 50 applies oxygen to the respective fuel cell cartridges 14 via ports 52. Fuel cell cartridges 14 are individually operable to convert chemical energy into electricity. As described below, fuel cartridges 14 individually contain plural fuel cells individually having an anode side and a cathode side. Auxiliary valves 45 apply fuel to the anode sides of the fuel cells. Plenum 51 directs air within the cathode sides of the fuel cells.

Air temperature control assembly 50 preferably provides circulated air within a predetermined temperature range. Such circulated air can be exterior air and/or recirculated air. In the preferred embodiment, air temperature control assembly 50 provides air within plenum 51 within an approximate temperature range of 25° Celsius to 80° Celsius.

Upon start-up conditions of fuel cell power system 10, modifying element 53 may be controlled via control system 30 using element control circuitry 41 to either increase or decrease the temperature of air present within plenum 51. Fan 54 operates to circulate the air within plenum 51 to respective fuel cell cartridges 14. Fan control circuitry 48 and fan monitor circuitry 49 are shown coupled with fan 54. Responsive to control from control system 30, fan control circuitry 48 operates to control air flow rates (e.g., speed of rotation) of fan 54. Fan monitor circuitry 49 operates to monitor the actual air flow rates induced by fan 54 (e.g., circuitry 49 can comprise a tachometer for rotational fan configurations).

Control system 30 monitors the temperature of the air within plenum 51 using temperature sensor 55. During operation, heat is generated and emitted from fuel cell cartridges 14. Thus, it may be necessary to decrease the temperature of air within plenum 51 to provide efficient operation of fuel cell power system 10. Responsive to control from control system 30, air passage 56 can be utilized to introduce exterior air into plenum 51 and exhaust air from plenum 51 to ambient.

Control system 30 communicates with control circuitry 57 to control air passage 56. In one embodiment, air passage 56 includes a plurality of vanes and control circuitry 57 operates to control the position of the vanes of air passage 56 to selectively introduce exterior air into plenum 51. The vanes of air passage 56 can preferably be provided in a plurality of orientations between an open position and a closed position to vary the amount of exterior fresh air introduced into plenum 51 or the amount of air exhausted from plenum 51 responsive to control from control system 30. Air circulated within plenum 51 can comprise recirculated and/or fresh ambient air.

Utilizing temperature sensor 59, control system 30 can also monitor the temperature of ambient air about housing 12. Control system 30 can utilize such exterior temperature information from temperature sensor 59 to control the operation of air passage 56. Temperature sensor 59 is located adjacent air passage 56 in a preferred embodiment.

As described in further detail below, control system 30 controls air flow rates of fan 54 using fan control circuitry 48. Fan monitor circuitry 49 provides air flow rate information to control system 30. Control system 30 can monitor the total system voltage being delivered via power bus 60 by summing the individual cell voltages. Control system 30 can also monitor the electrical load being delivered via power bus 60 using current sensor 40. With knowledge of the system bus voltage and load, control system 30 can calculate waste thermal power and provide a desired cooling air flow.

More specifically, the efficiency of one or more fuel cells may be determined by dividing the respective fuel cell voltage by 1.23 (a theoretical maximum voltage of a single fuel cell). An average efficiency can be determined for all fuel cells 90 of fuel cell power system 10. The remaining energy (energy not associated to electricity) as determined from the efficiency calculation is waste thermal power. The determined waste thermal power may be utilized to provide a desired cooling air flow. Control system 30 controls the air flow rates of fan 54 depending upon the waste thermal power in accordance with one aspect of the described fuel cell power system 10.

During operation of fuel cell cartridges 14, non-fuel diluents such as cathode-side water and atmospheric constituents can diffuse from the cathode side of the fuel cell through a membrane electrode assembly of the fuel cell and accumulate in the anode side of the fuel cell. In addition, impurities in the fuel supply delivered directly to the anode side of the fuel cell also accumulate. Without intervention, these diluents can dilute the fuel sufficiently enough to degrade performance. Accordingly, the anode side of the individual fuel cells is connected to a bleed manifold 65. Bleed manifold 65 is additionally coupled with bleed valve 43.

Control system 30 selectively operates bleed solenoid 42 to selectively open and close bleed valve 43 permitting exhaustion of matter such as entrained diluents and perhaps some fuel via a bleed exhaust 66 within housing 12. Control system 30 can operate to open and close bleed valve 43 on a periodic basis. The frequency of openings and closings of bleed valve 43 can be determined by a number of factors, such as electrical load coupled with terminals 62, 63, etc. Although not shown, a fuel recovery system may be coupled with bleed exhaust 66 to retrieve unused fuel for recirculation or other uses.

Following a start-up condition either inputted via interface or from remote device 24, control system 30 selectively controls switching device 38 to couple power bus 60 with positive terminal 62. Switching device 38 can comprise parallel MOSFET switches to selectively couple power bus 60 with an external load 22.

For example, control system 30 may verify when an appropriate operational temperature within plenum 51 has been reached utilizing temperature sensor 55. In addition, control system 30 can verify that at least one electrical characteristic, such as voltage and/or current, of respective fuel cell cartridges 14 has been reached before closing switching device 38 to couple power bus 60 with an associated load 22. Such provides proper operation of fuel cell power system 10 before coupling bus 60 with an external load 22.

Power supply 32 includes power supplies having different voltage potentials in the described embodiment. For example, power supply 32 can provide a 5-volt supply voltage for operating the digital circuitry of fuel cell power system 10, such as control system 30. Power supply 32 can also provide higher voltage potentials, such as +/−12 volts for operation of components such as fan 54 within fuel cell power system 10.

Further, power supply 32 can include a battery powering components during start-up procedures. Following start-up procedures, power supply 32 can be coupled with power bus 60 and internal power utilized by fuel cell power system 10 can be derived from electrical power generated from fuel cell cartridges 14. Charge circuitry 34 is provided to selectively charge batteries of power supply 32 utilizing power from power bus 60. Control system 30 is configured to monitor electrical conditions of the batteries and the supplied voltages of power supply 32 using power supply sensors 31. Control system 30 can operate charge circuitry 34 to charge batteries of power supply 32 depending upon such monitoring operations.

Control system 30 is also coupled with communication port 36 providing communications to an external device such as a remote device 24. An exemplary remote device 24 comprises an external control system or monitoring system off-site from fuel cell power system 10. Control system 30 can output data including requests, commands, operational conditions, etc., of fuel cell power system 10 using communication port 36. In addition, control system 30 can receive data including commands, requests, etc., from remote device 24 using communication port 36.

Referring to FIG. 3, an exemplary fuel cell cartridge 14 is shown. Further details of fuel cell cartridge 14 are disclosed in detail in U.S. Pat. No. 6,0303,718 incorporated by reference above. The depicted fuel cell cartridge 14 includes a fuel distribution frame 70 and a force application assembly which includes plural cathode covers 71 which partially occlude respective cavities housing membrane electrode assemblies (MEA) or membrane electrode diffusion assemblies (MEDA) within fuel distribution frame 70. The depicted fuel cell cartridge 14 includes four fuel cells (individually shown as reference numeral 90 in FIG. 4). Other configurations are possible.

The respective cathode covers 71 individually cooperate or otherwise mate with each other, and with the fuel distribution frame 70. Individual apertures 72 which are defined by the cathode cover, define passageways 73 which permit air from plenum 51 to circulate to the cathode side of the membrane electrode diffusion assembly contained within fuel distribution frame 70. The circulation of air through the fuel cell cartridge 14 is discussed in significant detail in U.S. Pat. No. 6,030,718 incorporated by reference above.

Conductive members 63 extend outwardly from a main body of individual fuel cells within fuel cell cartridge 14. Conductive members 63 are designed to extend through respective gaps or openings which are provided in fuel distribution frame 70. Each conductive member 63 is received between and thereafter electrically coupled with pairs of conductive contacts which are mounted on a rear wall of a subrack described in greater detail below.

Fuel cell cartridge 14 is operable to be serially electrically coupled with a plurality of other fuel cell cartridges 14 by way of a subrack which is generally indicated by the numeral 76. Subrack 76 has a main body 77 having top and bottom portions 78, 79, respectively. The top and bottom portions are joined together by a rear wall 80. Elongated channels 81 are individually formed in top and bottom portions 78, 79 and are operable to slidably receive individual spines 74 which are formed on fuel distribution frame 70.

Subrack 76 is made of a number of mirror image portions 85, which when joined together, form the main body 77 of subrack 76. These mirror image portions 85 are fabricated from a moldable dielectric substrate. Power bus 60 is affixed on rear wall 80 of the subrack 90. A repeating pattern of eight pairs of conductive contacts 84 are attached on rear wall 80 and are coupled with power bus 60. Electrical coupling of fuel cells within fuel cell cartridge 14 with power bus 60 is implemented using contacts 84 in the described embodiment.

First and second conduits 86, 87 are also attached to rear wall 80 and are operable to matingly couple in fluid flowing relation to the fuel distribution frame 70. The respective first and second conduits 86, 87 extend through rear wall 80 and connect with suitable external conduits (not shown). First conduit 86 is coupled in fluid flowing relation with fuel supply 23 (FIG. 1) and with anode sides of internal fuel cells. Further, second conduit 87 exhausts from the anode sides of the fuel cells to bleed manifold 65 (FIG. 2).

Individual fuel cell cartridges 14 may be selectively deactivated. For example, fuel cell cartridges 14 are individually physically removable from fuel cell power system 10. Removal of one or more fuel cell cartridges 14 may be desired for maintenance, replacement, etc. of the fuel cell cartridges 14. The remaining fuel cell cartridges 14 and internal fuel cells thereof may continue to supply power to an associated load 22 with one or more of the fuel cell cartridges 14 deactivated.

Individual contacts 84 may be configured to maintain electrical continuity of bus 60 upon physical removal of a fuel cell cartridge 14 from an associated subrack 76. As shown, individual contacts 84 comprise make before break contacts which individually include plural conductive members configured to receive an associated contact 69 of a fuel cell cartridge 14. Individual contacts 69 can comprise a tang or knife. Upon physical removal of fuel cell cartridge 14 and the corresponding terminals 69, conductive members of contacts 84 are mechanically coupled together to maintain a closed circuit within bus 60 intermediate terminals 62, 63. Such maintains a supply of electrical power to load 22 coupled with terminals 62, 63 during removal of one or more fuel cell cartridges 14 from fuel cell power system 10.

Referring to FIG. 4, a schematic representation of four fuel cells 90 of a fuel cell cartridge 14 is shown. Individual fuel cells 90 have plural contacts 84 as described above. Fuel cells 90 are typically coupled in series using power bus 60. Control system 30 is configured to monitor at least one electrical characteristic of individual fuel cells 90 using analysis circuitry 91 in the described embodiment.

More specifically, analysis circuitry 91 includes a voltage sensor 92 which may be provided electrically coupled with contacts 84 as shown. Such coupling enables voltage sensor 92 to monitor the voltages of the individual respective fuel cells 90. Fuel cells 90 have been observed to typically produce a useful voltage of about 0.45 to about 0.7 volts DC under a typical load.

An exemplary configuration of voltage sensor 92 is implemented as a differential amplifier for monitoring voltages. Voltage sensor 92 is preferably configured to monitor voltage magnitude across individual fuel cells 90 as well as polarity of individual fuel cells 90.

Analysis circuitry 91 can additionally include plural current sensors 94, 97. Individual current sensors may be coupled with contacts 84 of individual fuel cells 90 to monitor current flowing through respective individual fuel cells 90 in an alternative arrangement (not shown). Control system 30 is coupled with current sensors 94, 97 and is configured to monitor corresponding respective currents through fuel cells 90 and outputted to load 22 via bus 60.

Current sensor 94 is coupled intermediate one of fuel cells 90 and a coupling with internal power supply 93. Current sensor 94 is coupled intermediate the coupling with internal power supply 93 and external terminal 62 coupled with an associated load.

Following start-up operations, power for internal use within fuel cell power system 10 (e.g., power provided to the circuitry of control system 30) is provided from fuel cell cartridges 14. Internal power supply 93 extracts current from bus 60 as shown to provide internal power to fuel cell power system 10.

Accordingly, current sensor 94 provides information regarding current flow through serially coupled fuel cell cartridges 14. Current sensor 97 provides information regarding current flow to a load coupled with terminal 62 (i.e., load 22 shown in FIG. 1).

Plural switching devices 96 are also provided which correspond to respective fuel cells 90. Switching devices 96 can be individually provided intermediate contacts 84 of respective fuel cells 90 as illustrated. In the depicted configuration, switching devices 96 can comprise MOSFET devices. Gate electrodes of switching devices 96 are coupled with control system 30.

Control system 30 is operable to selectively shunt electrodes 84 using switching devices 96 corresponding to a desired one or more of fuel cells 90 to electrically bypass or deactivate such fuel cells 90. For example, if control system 30 observes that an electrical characteristic (e.g., voltage) of a fuel cell 90 as sensed via sensors 92, 94 is below a desired range, control system 30 can instruct a respective switching device 96 to turn on and shunt the respective fuel cell 90. In addition, individual fuel cells 90 can be selectively shunted using respective switching devices 96 to enhance the performance of fuel cells 90.

In one configuration, fuel cells 90 can be shunted according to a duty cycle. The duty cycle may be adjusted by control system 30 depending upon operation of fuel cell cartridges 14 and fuel cell power system 10. Fuel cells 90 can be shunted by sequential order as determined by control system 30. Shunting is also helpful during startup operations to generate heat within housing 12 to bring fuel power system 10 up to operating temperature in an expedient manner.

Alternatively, individual fuel cells 90 may be shunted for extended periods of time if control system 30 observes such fuel cells are operating below desired ranges (e.g., low voltage conditions, reverse polarity conditions). Shunting operations are discussed in co-pending U.S. Pat. No. 6,096, 449 entitled Improved Fuel Cell and Method for Controlling Same", filed on Jul. 1, 1998, naming William A. Fuglevand, Peter D. Devries, Greg A. Lloyd, David R. Lott, and John P. Scartozzi as inventors, assigned to the assignee hereof, and incorporated herein by reference.

Referring to FIG. 5, one configuration of control system 30 is illustrated. In the depicted arrangement, control system 30 includes a distributed control system including a plurality of controllers 100–120. Individual controllers 100–120 comprise programmable microcontrollers in the described embodiment. Exemplary microcontrollers have trade designation MC68HC705P6A available from Motorola, Inc. In the described embodiment, controllers 100–120 individually comprise a controller configured to execute instructions provided within executable code. In an alternative configuration, the steps described with reference to FIGS. 16–28 below are implemented within hardware.

Individual controllers can include random access memory (RAM), read only memory (ROM), analog-to-digital (A/D) converters, serial input/output port (SIOP) communications, timers, digital input/output (I/O), timer interrupts and external interrupts. Individual controllers 102–120 have internal digital processing circuitry configured to execute a set of software or firmware instructions. Such instructions can be stored within the internal read only memory of the respective controllers 100–120. Other configurations of control system 30 are possible.

Among other functions, master controller 100 functions as a communication router to implement communications intermediate master controller 100 and individual slave controllers 102–120. In the described embodiment, communications are implemented in a limited full-duplex mode. Other communication protocols may be utilized.

Master controller 100 outputs messages to slave controllers 102–120. Outputted messages are seen by all slave controllers 102–120. Individual slaves 102–120 identified by the outgoing message process the corresponding message. Thereafter, receiving slave controllers 102–120 can output a message to master controller 100. In addition, master controller 100 can sequentially poll slave controllers 102–120 to determine whether such slave controllers 102–120 have communications for master controller 100. Master controller 100 can also supply clock information to slave controllers 102–120 to establish a common timing reference within control system 30.

Individual slave controllers 102–120 perform specific tasks in control system 30 including a plurality of distributed controllers. Individual slave controllers 102–120 can monitor specified functions of fuel cell power system 10 and report to master controller 100. Further, master controller 100 can direct operations of individual slave controllers 102–120.

Referring to FIG. 6, cartridge analysis slave controller 102 is coupled with master controller 100 and associated circuitry. In particular, cartridge analysis slave controller 102 is coupled with analysis circuitry 91 which is in turn coupled with fuel cells 90 and power bus 60 as previously described. Utilizing voltage sensor 92 and current sensor 94 of analysis circuitry 91, cartridge analysis slave controller 102 can monitor electrical characteristics such as the voltage of individual fuel cells 90 as well as the current through fuel cells 90. Further, cartridge analysis slave controller 102 can monitor current flowing through power bus 60 to load 22 using current sensor 97 of analysis circuitry 91. As described below, cartridge analysis slave controller 102 can communicate such electrical characteristics to master controller 100.

Referring to FIG. 7, auxiliary valve slave controller 104 is shown coupled with master controller 100 and auxiliary solenoids 44 and bleed solenoid 42. In turn, auxiliary solenoids 44 are coupled with auxiliary valves 45 and bleed solenoid 42 is coupled with bleed valve 43 as discussed above. Responsive to control communications from master controller 100, auxiliary valve slave controller 104 is configured to operate auxiliary solenoids 44 and bleed solenoid 42 to control auxiliary valves 45 and bleed valve 43, respectively.

Referring to FIG. 8, fan slave controller 106 is coupled with fan control circuitry 48 and fan monitor circuitry 49. As described above, fan control circuitry 48 and fan monitor circuitry 49 are individually coupled with fan 54. Upon receiving instruction from master controller 100, fan slave controller 106 is operable to control operation of fan 54 using fan control circuitry 48. For example, fan slave controller 106 controls on/off operational modes of fan 54 and the air flow rate of fan 54. Using fan monitor circuitry 49, fan slave controller 106 can monitor operation of fan 54. Fan slave controller 106 can output fan status information (e.g., RPM for a rotational fan) to master controller 100.

Referring to FIG. 9, interface slave controller 108 is coupled with master controller 100 and operator interface 16. Master controller 100 supplies operational status information from other slave controllers to interface slave controller 108. Thereafter, interface slave controller 108 can control operator interface 16 to convey such status information to an operator. Exemplary indications can include a light emitting diode (LED) array, bar graph display, audio warning buzzer, etc.

Referring to FIG. 10, external port slave controller 110 is coupled with communication port 36 and memory 37 as well as master controller 100. As described previously, communication port 36 is additionally coupled with a remote device 24. Communication port 36 and memory 37 operate to provide bi-directional communications intermediate external port slave controller 110 and remote device 24. Although memory 37 is shown external of external port slave controller 110, in some configurations such memory 37 can be implemented as internal circuitry of external port slave controller 110. Memory 37 operates to buffer data passing to remote device 24 or data received from remote device 24 within external port slave controller 110. External port slave controller 110 operates to forward received communications to master controller 100 according to timing of master controller 100. External port slave controller 110 operates to output messages from master controller 100 to remote device 24 using communication port 36 according to an agreed-upon communication protocol intermediate external port slave controller 110 and remote device 24.

Figure 11:
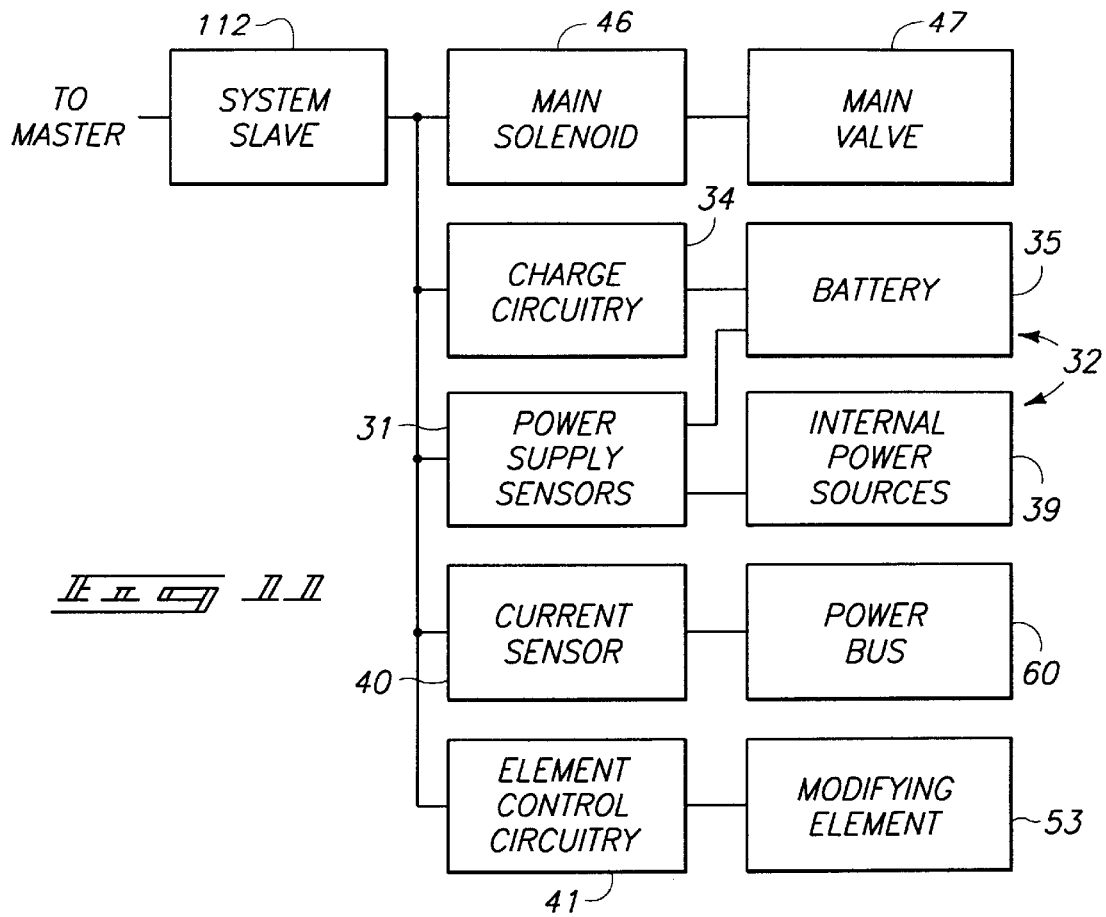
FIG. 11 is a functional block diagram of a system analysis slave controller of the control system coupled with associated circuitry and components.

Referring to FIG. 11, system slave controller 112 is coupled with master controller 100 as well as main solenoid 46, charge circuitry 34, power supply sensors 31, current sensor 40 and element control circuitry 41. Responsive to control from master controller 100, system slave controller 112 is configured to control the operation of main valve 47 using main solenoid 46. Further, responsive to control from master controller 100, system slave controller 112 can selectively charge a battery 35 of power supply 30 using charge circuitry 34.

Slave controller 112 can implement the charging of battery 35 responsive to information from power supply sensors 31. Power supply sensors 31 provide electrical characteristic information of battery 35 and internal power sources 39 to system slave controller 112. Internal power sources 39 of power supply 32 include the 5 Volt DC source and +/−12 Volt DC source previously described.

Using current sensor 40, system slave controller 112 can monitor current flowing through power bus 60. Such provides load information and output power of fuel cell power system 10 to system slave controller 112. Thereafter, system slave controller 112 can provide such current and load information to master controller 100.

System slave controller 112 is also coupled with element control circuitry 41 utilized to control modifying element 53. Such is utilized to control the temperature within plenum 51. Modifying element 53 can be controlled to provide circulated air within plenum 51 within a desired operational temperature range. Modifying element 53 is advantageously utilized in some start-up situations to bring the temperature within plenum 51 within the operational range in an expedient manner.

Figure 12:
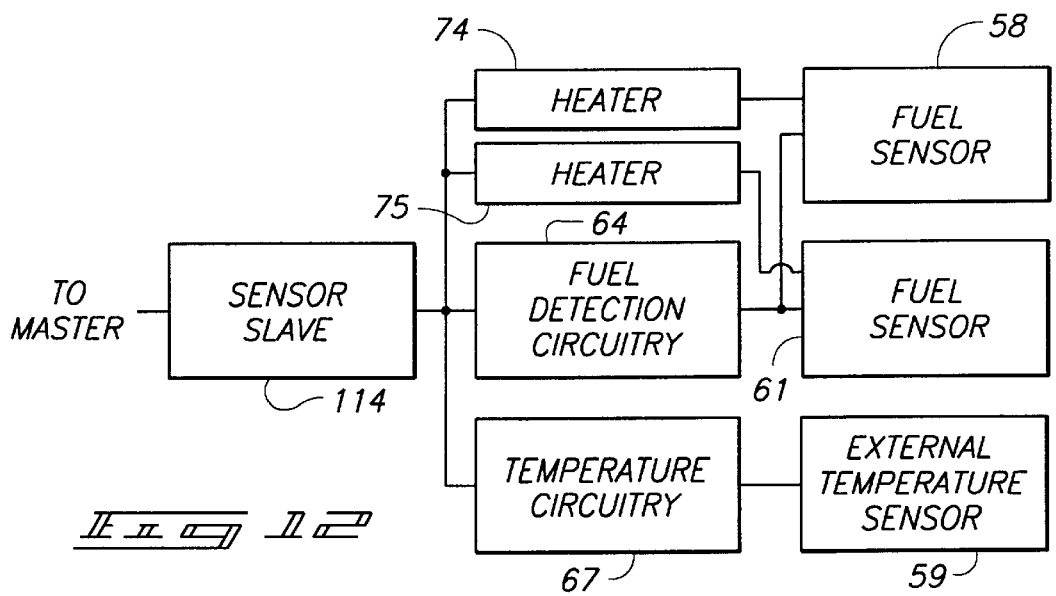
FIG. 12 is a functional block diagram of a sensor slave controller of the control system coupled with associated circuitry and components.

Referring to FIG. 12, sensor slave controller 114 is coupled with master controller 100, heaters 74, 75, fuel detection circuitry 64 and temperature circuitry 67. Fuel detection circuitry 64 is associated with plural fuel sensors 58, 61 provided within housing 12 and plenum 51, respectively. Temperature circuitry 67 is coupled with temperature sensor 59 located outside of housing 12. Sensor slave 114 can control heaters 74, 75 to selectively bring fuel sensors 58, 61 within an appropriate temperature range for operation.

Fuel detection circuitry 64 receives data from fuel sensors 58, 61 and can condition such information for application to sensor slave controller 114. If fuel is detected using fuel sensors 58, 61, fuel detection circuitry 64 can process such information and provide such data to sensor slave controller 114. Such information can indicate the concentration of fuel detected within housing 12 or plenum 51 using fuel sensors 58, 61, respectively. Sensor slave controller 114 can in turn provide such information to master controller 100.

Temperature sensor 59 provides information regarding the temperature of the surroundings of fuel cell power system 10. Temperature circuitry 67 receives outputted signals from temperature sensor 59 and can condition such signals for application to sensor slave controller 114 monitoring the external temperature. Sensor slave controller 114 can provide external temperature information to master controller 100.

Figure 13:
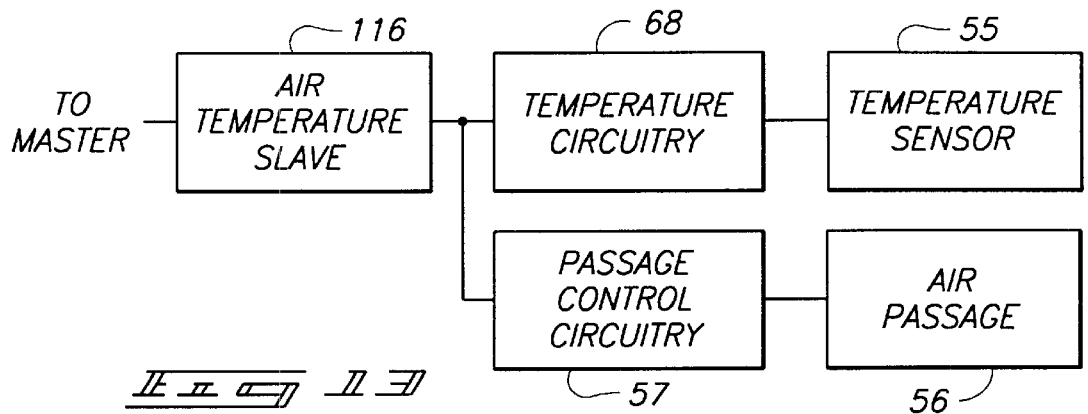
FIG. 13 is a functional block diagram of an air temperature slave controller of the control system coupled with associated circuitry and components.

Referring to FIG. 13, air temperature slave controller 116 is coupled with master controller 100 and temperature circuitry 68 and passage control circuitry 57. Temperature circuitry 68 is associated with temperature sensor 55 provided within plenum 51. Passage control circuitry 57 operates to control air passage 56. For example, passage control circuitry 57 can control the position of vanes of air passage 56 in an exemplary embodiment.

Temperature sensor 55 is positioned within plenum 51 to monitor the temperature of circulated air within plenum 51. Temperature circuitry 68 receives the sensor information from temperature sensor 55 and conditions the information for application to air temperature slave controller 116. Thereafter, air temperature slave controller 116 may operate to output the temperature information to master controller 100.

During operation of fuel cell power system 10, air temperature slave controller 116 operates to control the flow of air into housing 12 using air passage 56 as well as the exhaustion of air within plenum 51 to the exterior of housing 12. Air temperature slave controller 116 controls air passage 56 using passage control circuitry 57 to maintain the temperature of circulated air within plenum 51 within the desired operational temperature range. Further, modifying element 63 of FIG. 11 can be controlled as previously discussed to raise or lower the temperature of the circulated air. Such control of air passage 56 by air temperature slave controller 116 can be responsive to information from temperature sensor 55 and external temperature sensor 59. Further, efficiency information regarding fuel cells 90 can be calculated by air temperature slave controller 116 to determine waste thermal power. Air passage 56 may be controlled responsive to the calculated waste thermal power.

Figure 14:
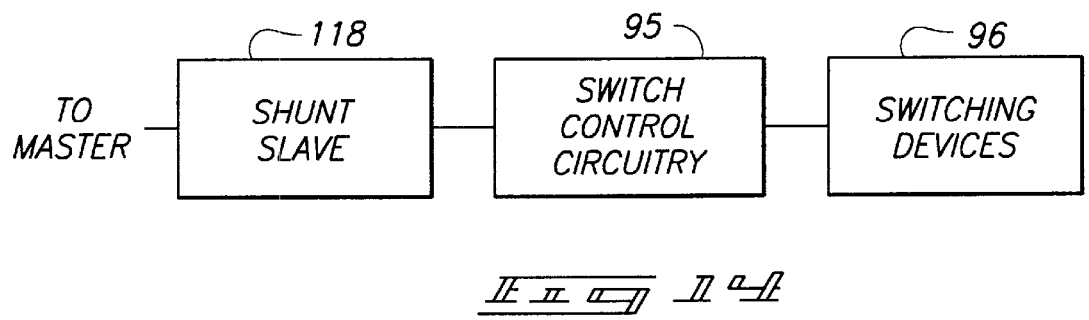
FIG. 14 is a functional block diagram of a shunt slave controller of the control system coupled with associated circuitry and components.

Referring to FIG. 14, shunt slave controller 118 is coupled with so master controller 100 and switch control circuitry 95. Plural switching devices 96 are coupled with switch control circuitry 95. As described above, switching devices 96 are provided to implement selective shunting of respective fuel cells 90 of fuel cell cartridges 14. Master controller 100 can be configured to output shunt information to shunt slave controller 118 for selectively shunting using switching devices 96. Alternatively, shunt slave controller 118 can execute internally stored code to provide controlled selective shunting of switching devices 96.

Such shunting operations of fuel cells 90 can be utilized to provide increased power, to expedite start-up procedures, to shunt a faulty fuel cell cartridge 14, and to monitor for fuel leaks in exemplary embodiments. Switch control circuitry 95 is provided to provide conditioning of control signals intermediate shunt slave controller 118 and switching devices 96.

Figure 15:
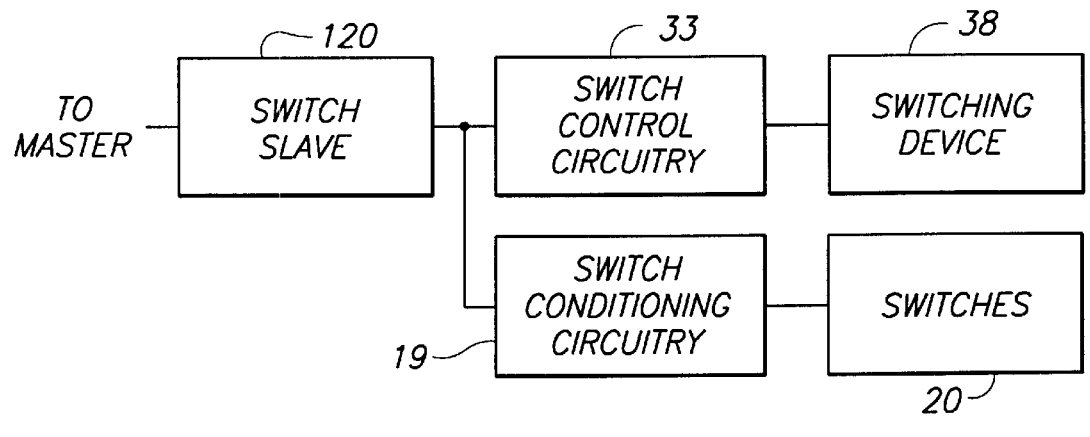
FIG. 15 is a functional block diagram of a switch slave controller of the control system coupled with associated circuitry and components.

Referring to FIG. 15, switch slave controller 120 is coupled with master controller 100 and switch control circuitry 33 and switch conditioning circuitry 19. Switch control circuitry 33 is coupled with switching device 38 provided in series with power bus 60. Responsive to master controller 100, switch slave controller 120 can instruct switch controller circuitry 33 to control switching device 38. Switching device 38 provides selective coupling of power bus 60 to an external load 22. Such can be utilized to assure proper operation of fuel cell power system 10 prior to coupling power bus 60 with load 22.

Switch slave controller 120 can also monitor the status of operator interface switches 20 which may be set by an operator of fuel cell power system 10. Exemplary switches include power on/off of fuel cell power system 10, enable load, cartridge reset, etc. Switch conditioning circuitry 19 can filter signals provided from switches 20 and provide corresponding information regarding switch position to switch slave controller 120. Thereafter, switch slave controller 120 can output the switch status information to master controller 100.

Figure 16A:
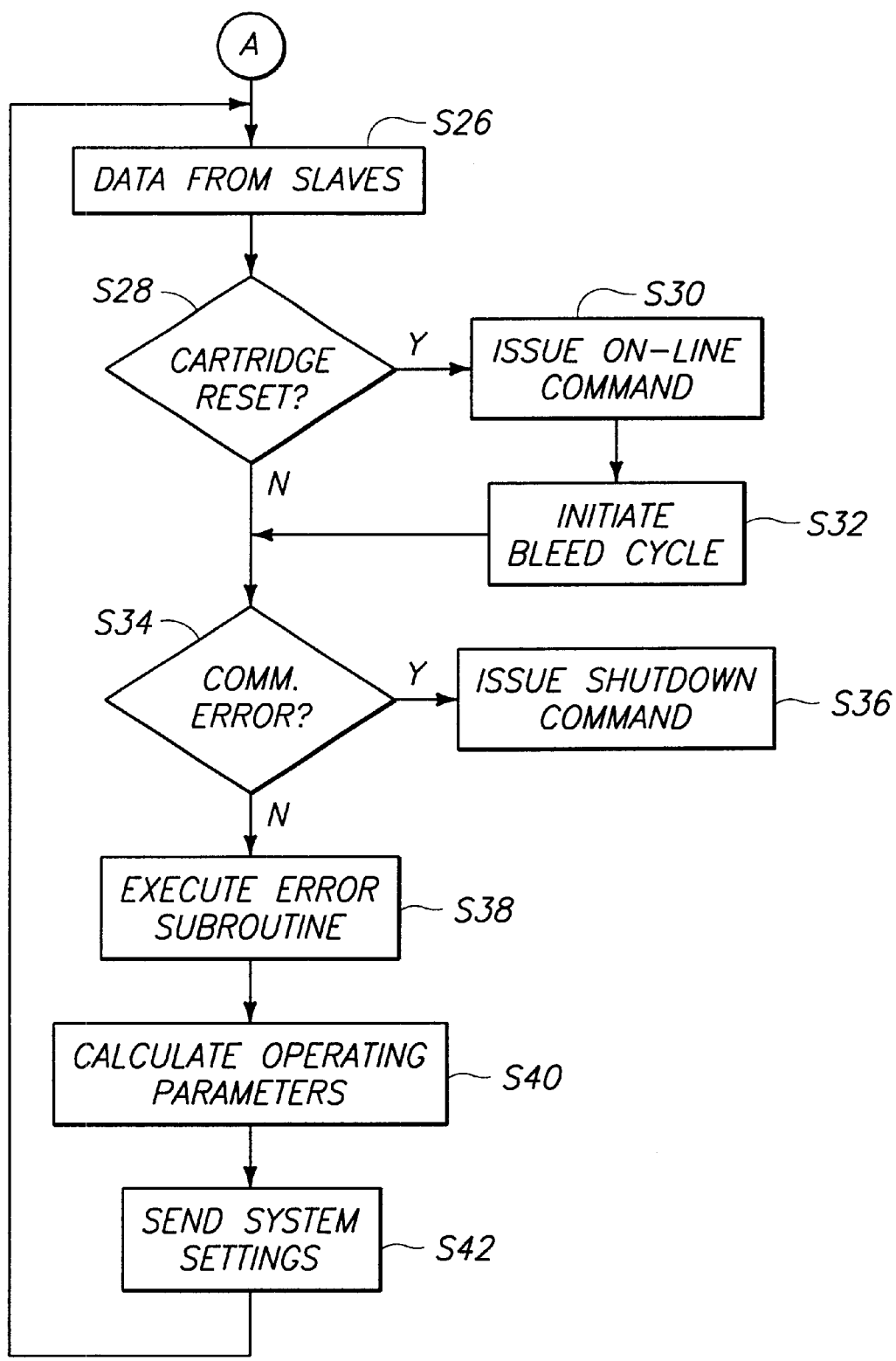

Referring to FIGS. 16–16A, a flow chart illustrating exemplary operations of master controller 100 of control system 30 is shown. Initially, master controller 100 performs a communications check at step S10. Communication checks may be implemented on a periodic interrupt basis to verify communications of master controller 100 and slave controllers 102–120.

At step S12, master controller 100 determines whether a communication error was discovered. If such an error is present, master controller 100 issues a shut down command to slave controllers 102–120 at step S14. Respective slave controllers 102–120 implement shut down operations to bring fuel cell power system 10 into a shut down condition. Interface slave controller 108 can indicate the shut down status using operator interface 16. Further, master controller 100 can instruct external port slave controller 110 to notify remote device 24 of the shut down condition.

Alternatively, if no communication error is present in step S12, master controller 100 instructs system slave controller 112 to open main valve 47 at step S16. In addition, master controller 100 instructs fan slave controller 106 to start fan 54 at step S16. At step S18, master controller 100 instructs auxiliary valve slave controller 104 to open auxiliary valves 45 using auxiliary solenoids 44. Next, master controller 100 issues a command to auxiliary valve slave controller 104 to open bleed valve 43 using bleed solenoid 42 at step S20.

Thereafter, master controller 100 may execute a start-up subroutine as set forth in FIG. 17 at step S22. Following successful execution of the start-up subroutine, master controller 100 outputs a load enable "ready" signal to switch slave controller 120 at step S24. Switch slave controller 120 controls, using switch control circuitry 33, switching device 38 to couple power bus 60 with an external load.

At step S26 of FIG. 16A, master controller 100 extracts data from slave controllers 102–120. More specifically, master controller 100 can receive information from cartridge analysis slave controller 102, auxiliary valve slave controller 104, fan slave controller 106, external port slave controller 110, system slave controller 112, sensor slave controller 114, air temperature slave controller 116 and switch slave controller 120.

Next, master controller 100 proceeds to step S28 where it is determined if a cartridge reset request has been issued. An operator can implement a cartridge reset condition using switches 20. If a cartridge reset is indicated, master controller 100 proceeds to step S30 and issues an on-line command to change the status of all off-line fuel cell cartridges 14 to being on-line. Thereafter, master controller 100 initiates a bleed cycle utilizing auxiliary valve slave controller 104 at step S32. During the bleed cycle, fuel may be applied to individual fuel cell cartridges 14 and the bleed valve 43 can be opened to allow exhaust operations using bleed manifold 65 and bleed exhaust 66.

If no cartridge reset request is indicated at step S28, or after the bleed cycle is initiated at step S32, master controller 100 proceeds to step S34 to determine whether a communication error is present. If a communication error is present, master controller 100 issues a shut down command at step S36.

If no communication error is present at step S34, master controller 100 proceeds to step S38 to execute an error subroutine as described in FIGS. 18–18A below. At step S40, master controller 100 calculates operating parameters utilizing the data obtained at step S26. Based upon the calculated operating parameters (e.g., setting of fan 54, modifying element 53, etc.), master controller 100 sends the system settings at step S42 to the appropriate slave controllers 102–120.

Referring to FIG. 17, a start-up subroutine executable by master controller 100 is described. Initially, data from sensor slave controller 114 is analyzed to determine whether the temperature within plenum 51 is less than 15° Celsius. If yes, master controller 100 turns on modifying element 53 utilizing system slave controller 112 at step S52. Alternatively, master controller 100 instructs systems slave controller 112 to turn off modifying element 53 if appropriate at step S54.

Thereafter, master controller 100 proceeds to step S56 and instructs shunt slave controller 118 to set a shunting duty cycle to maximum. At step S58, master controller 100 again retrieves the temperature within plenum 51 from air temperature slave controller 116. At step S58, master controller 100 determine s whether the temperature within plenum 51 is less than 30° Celsius. If so, master controller loops at step S58 until the temperature within plenum 51 is equal to or greater 30° Celsius. Next, at step S60, master controller 100 can calculate a new duty cycle for application to shunt slave controllers 118. Thereafter, master controller 100 returns to the main set of instructions described in FIGS. 16–16A.

Figure 18A:
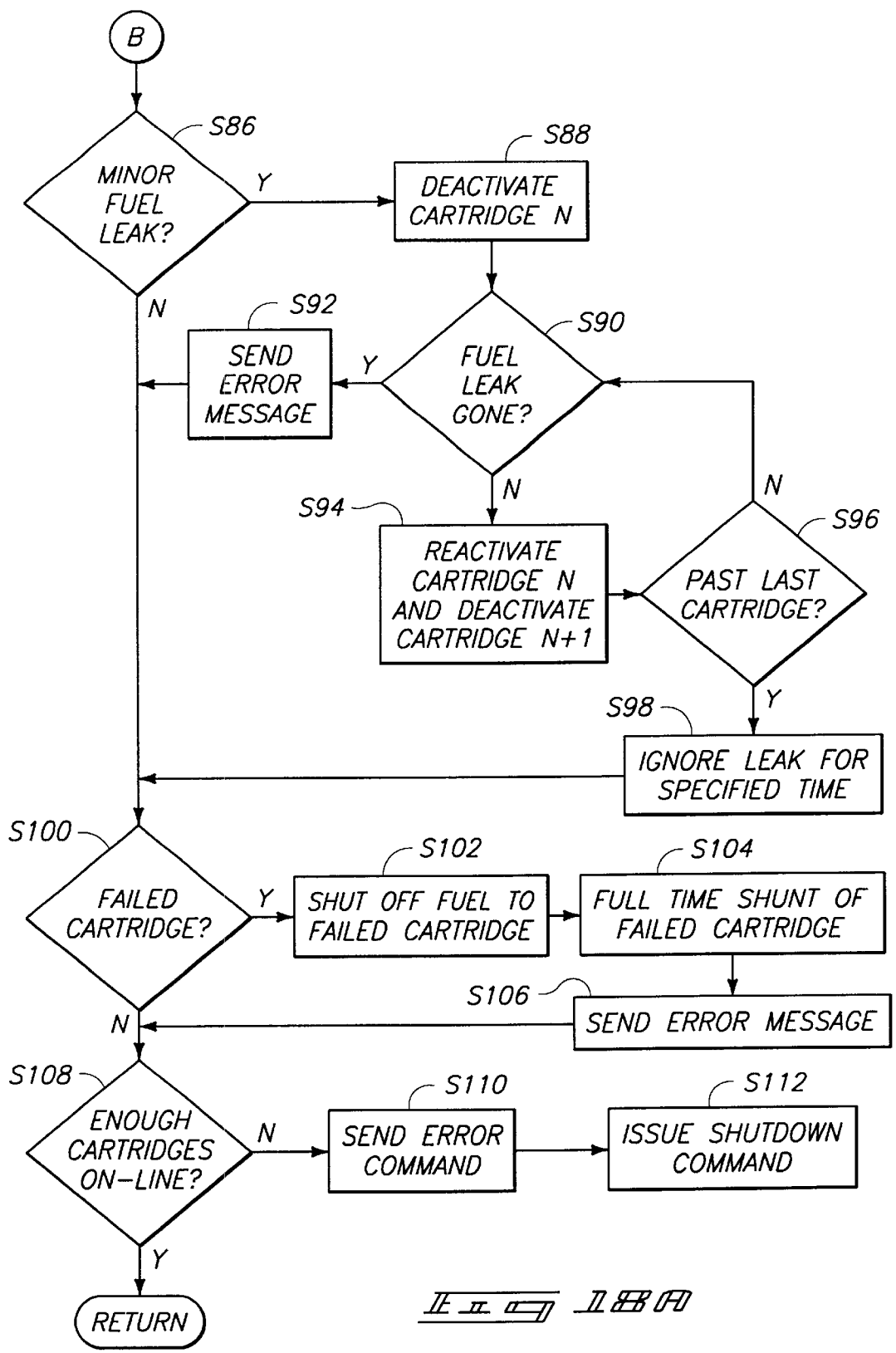
Figure 15A:
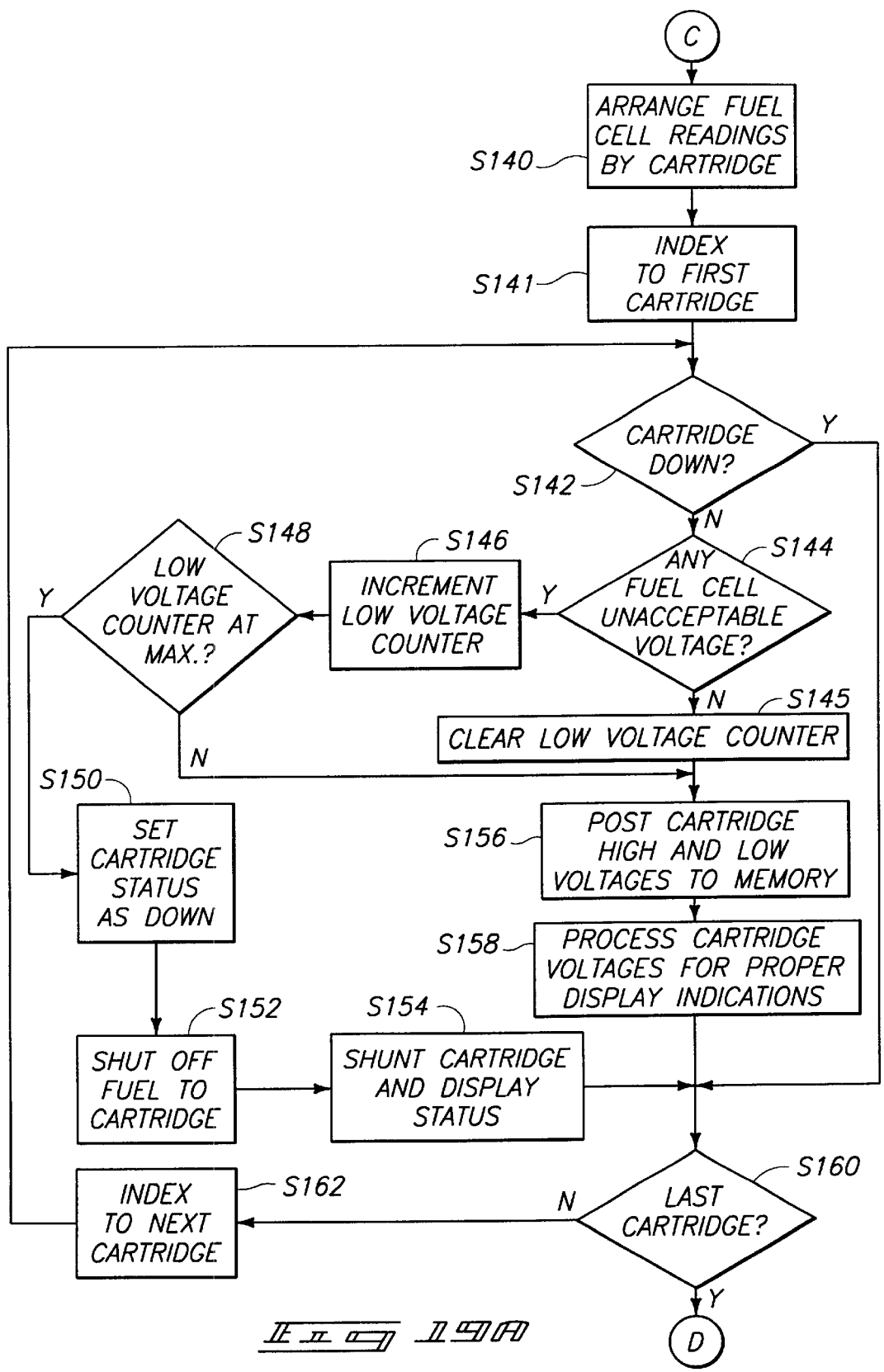

Referring to FIGS. 18–18A, a flow chart illustrating exemplary error operations of master controller 100 is illustrated. Initially, at step S62, master controller 100 determines whether fan operation is proper. Master controller 100 observes data from fan slave controller 106 and outputs a fan error message to interface slave controller 108 at step S64 if fan operation is not proper. Thereafter, a shut down command is issued at step S66 to initiate a shut down procedure of fuel cell power system 10.

At step S68, it is determined whether internal power supplies are operating properly. More specifically, master controller 100 interfaces with system slave controller 112 to determine whether values monitored by power supply sensors 31 are within range. If not, master controller 100 sends a power supply error message to interface slave controller 108 at step S70. Thereafter, master controller 100 issues a shut down command at step S72.

At step S74, master controller 100 determines whether auxiliary valve operation is proper. Such is determined by data received from auxiliary valve slave controller 104 regarding the status of auxiliary valves 45. This can be additionally performed by monitoring the voltage of a deactivated fuel cell 90. A zero voltage should result if auxiliary valve operation is proper. Master controller 100 outputs an auxiliary valve error message at step S76 to interface slave controller 108 if operation is not proper. Such error message can thereafter be displayed using operator interface 16. At step S78, master controller 100 issues a shut down command.

Alternatively, master controller 100 proceeds to step S80 and determines whether a major fuel leak is present. Such is determined by monitoring data received from sensor slave controller 114 responsive to the monitoring of fuel sensors 58, 61. If a major fuel leak is detected, master controller 100 sends a major fuel leak error message to interface slave controller 108 at step S82. Thereafter, a shut down command is issued at step S84.

If no major fuel leak is determined, master controller 100 proceeds to step S86 to determine whether a minor fuel leak is present. In one configuration, a major fuel leak may be defined as $\geq 5000$ ppm and a minor fuel leak may be defined as 1000–4999 ppm. In some applications, the ranges may be varied for increased or decreased sensitivity to fuel.

If a minor fuel leak is determined at step S86, master controller 100 proceeds to step S88 to try to determine if one of fuel cell cartridges 14 is faulty and the source of the fuel leak. Accordingly, a first fuel cell cartridge 14 is deactivated at step S88. Next, master controller 100 attempts to determine whether the fuel leak is gone. Deactivation of the fuel cell cartridge 14 ceases the supply of fuel to the fuel cell cartridge 14 using the appropriate auxiliary valve 45. If it is determined that the fuel leak is gone, an error message is sent at step S92 to interface slave controller 108 for conveyance to operator interface 16.

If the fuel leak remains as determined at step S90, master controller 100 proceeds to step S94 to reactivate the previously deactivated fuel cell cartridge 14 and deactivate a subsequent fuel cell cartridge 14. At step S96, master controller 100 determines whether an index has led past the last fuel cell cartridge 14. If not, master controller 100 returns to steps S90–S94 to continue with the minor leak analysis. Alternatively, master controller 100 proceeds to step S98 and ignores the minor leak for a specified period of time. Once the specified period of time has elapsed, and the fuel leak is still present, master controller 100 can issue a shut down command which will cease the supply of fuel from fuel supply 23 into housing 12 using main valve 47.

At step S100, master controller 100 determines whether there is a failed fuel cell cartridge 14. If so, master controller 100 shuts off the supply fuel to the failed fuel cell cartridge 14 using the appropriate auxiliary valve 45 at step S102. In addition, a full-time shunt command for the failed fuel cell cartridge 14 is applied to shunt slave controller 118 at step S104. At step S106, master controller 100 sends an error message to interface slave controller 108 for conveyance using operator interface 16.

At step S108, master controller 100 determines whether enough fuel cell cartridges 14 are currently on-line. In one exemplary arrangement, master controller 100 determines whether less than eight fuel cell cartridges 14 are on-line. If not enough cartridges are on-line, master controller 100 sends an error command at step S110 to interface slave controller 108. Such error message can be conveyed to an operator using operator interface 16. Next, at step S112, master controller 100 issues a shut down command for fuel cell power system 10. If enough fuel cell cartridges 14 are on-line at step S108, master controller 100 proceeds to the main set of instructions defined in the flow chart of FIGS. 16–16A.

Figure 19B:
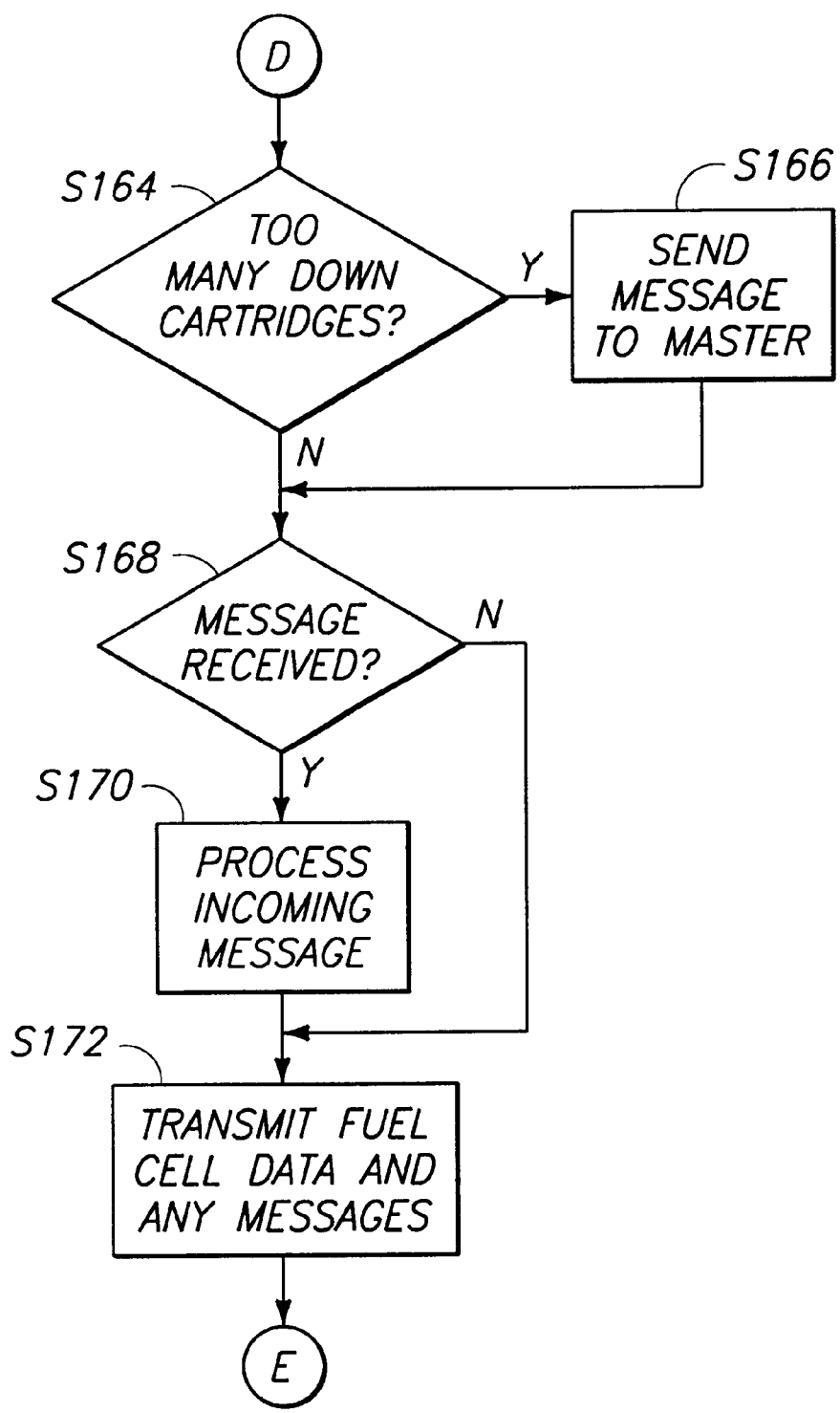

Referring to FIGS. 19–19B, a flow chart illustrating exemplary operations of cartridge analysis slave controller 102 is shown. Initially, at step S120, slave controller 102 indexes to a first fuel cell 90 within fuel cell power system 10. A transient counter described below is cleared at step S121. Slave controller 102 obtains a voltage reading of the indexed fuel cell 90 at step S122. At step S124, slave controller 102 determines whether the polarity of the indexed fuel cell 90 is proper. If not, slave controller 102 proceeds to step S126 and sets the indicated fuel cell voltage to zero. Thereafter, the voltage for the currently indexed fuel cell 90 is posted to a fuel cell array at step S134.

Alternatively, if the polarity of the indexed fuel cell 90 is proper at step S124, slave controller 102 determines whether the voltage is proper at step S128. If not, slave controller 102 increments a ride-through through transient counter at step S130. Thereafter, slave controller 102 determines whether the transient counter is at a maximum value at step S132. If not, slave controller 102 returns to step S122. If the transient counter has reached a maximum value, slave controller 102 proceeds to step S134 to post the voltage to the fuel cell array.

At step S136, slave controller 102 determines whether all of the fuel cells 90 have been indexed. If not, slave controller 102 indexes to a next fuel cell 90 at step S138 and thereafter returns to step S122. If all fuel cells 90 have been analyzed using analysis circuitry 91, slave controller 102 proceeds to step S140 to arrange the fuel cell readings into readings for respective fuel cell cartridges 14.

Next, slave controller 102 proceeds to step S141 to index to a first of fuel cell cartridges 14. Slave controller 102 then proceeds to step S142 to determine whether any of the fuel cell cartridges 14 were previously provided in a down or off-line condition. If so, slave controller 102 proceeds to step S160 to determine whether the last fuel cell cartridge 14 has been indexed. Otherwise, slave controller 102 proceeds to step S144 to determine whether a voltage of any of the fuel cells of a currently indexed fuel cell cartridge 14 have an unacceptable voltage condition (e.g., low voltage). If so, slave controller 102 increments a low voltage counter at step S146. Next, slave controller 102 proceeds to step S148 to determine whether the low voltage counter is at a maximum value. The maximum value is selected to provide the unacceptable fuel cell with a chance to recover and provide an acceptable voltage during a subsequent pass through the flow chart. If the low voltage counter is at maximum, slave controller 102 proceeds to step S150 to set the currently indexed fuel cell cartridge 14 status as deactivated (e.g., down or off-line). Slave controller 102 instructs master controller 100 to shut off fuel to the currently indexed fuel cell cartridge 14 at step S152. Master controller 100 thereafter instructs auxiliary valve slave controller 104 to shut off fuel to the respective fuel cell cartridge 14. At step S154, master controller 100 additionally outputs a command to shunt slave controller 118 to shunt the appropriate fuel cell cartridge 14. Also, master controller 100 can output the message to interface slave controller 108 to convey the status of the currently indexed fuel cell cartridge 14 using operator interface 16.

If the currently indexed fuel cell cartridge 14 has a proper voltage as determined at step S144, slave controller 102 proceeds to step S145 to clear the low voltage counter. Slave controller 102 associates the fuel cells with respective low voltage counter values. The low voltage counter for a given fuel cell previously determined to be unacceptable during the current pass through the flow chart is cleared at step S145 if the voltage is deemed acceptable at step S144.

Slave controller 102 proceeds to step S156 to post high and low voltages of the fuel cells of the currently indexed fuel cell cartridge 14 to memory. At step S158, slave controller 102 outputs the high and low voltage information of the fuel cells of the fuel cell cartridge 14 to master controller 100. Master controller 100 processes the high and low voltages for the fuel cell cartridge 14 and can instruct interface slave controller 108 to display or otherwise convey the voltages to an operator using operator interface 16.

At step S160, slave controller 102 determines whether the last fuel cell cartridge 14 has been indexed. If not, slave controller 102 indexes to a next fuel cell cartridge 14 at step S162 and thereafter returns to step S142. If the last fuel cell cartridge 14 has been indexed at step S160, slave controller 102 proceeds to step S164 to determine whether too many fuel cell cartridges 14 are down (e.g., less than seven fuel cell cartridges 14 are down or off-line). If so, slave controller 102 sends an appropriate message to master controller 100 at step S166.

At step S168, slave controller 102 monitors for the reception of messages from master controller 100. If a message is received, slave controller 102 processes the incoming message at step S170. At step S172, slave controller 102 can transmit fuel cell data and any messages. Thereafter, slave controller 102 returns to step S120 to index the first fuel cell 90 to repeat the analysis.

Figure 20:
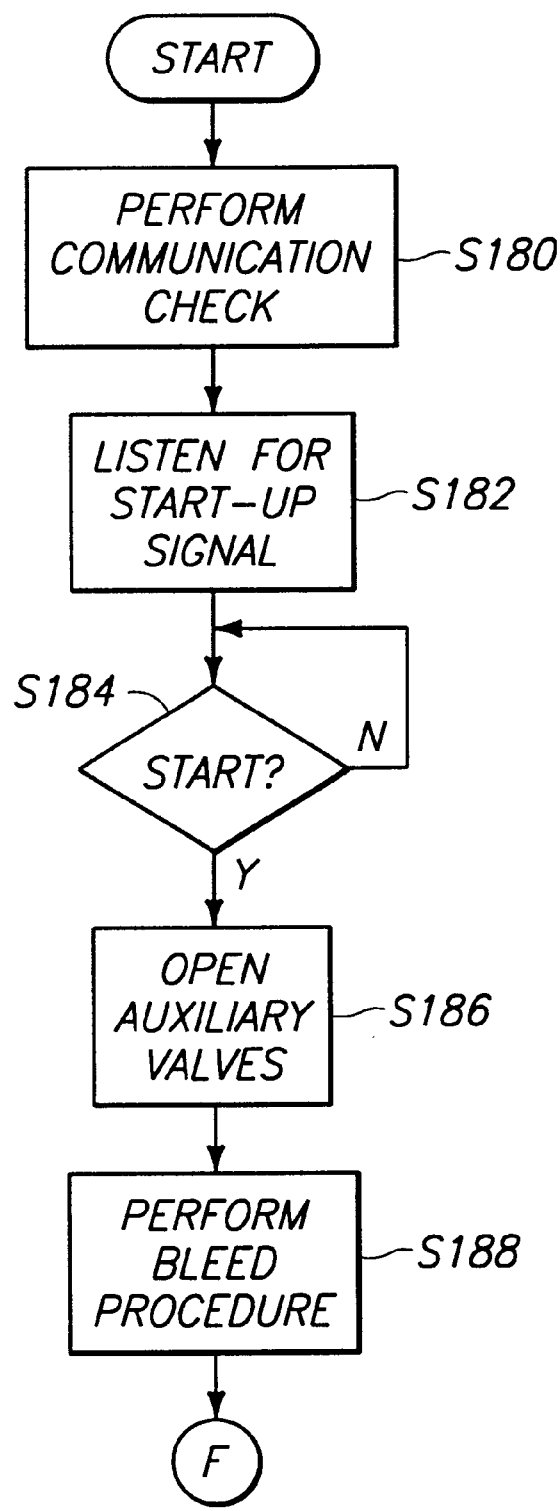
FIGS. 20–20A are a flow chart illustrating exemplary operations of the auxiliary valve slave controller of the control system.
Figure 20A:
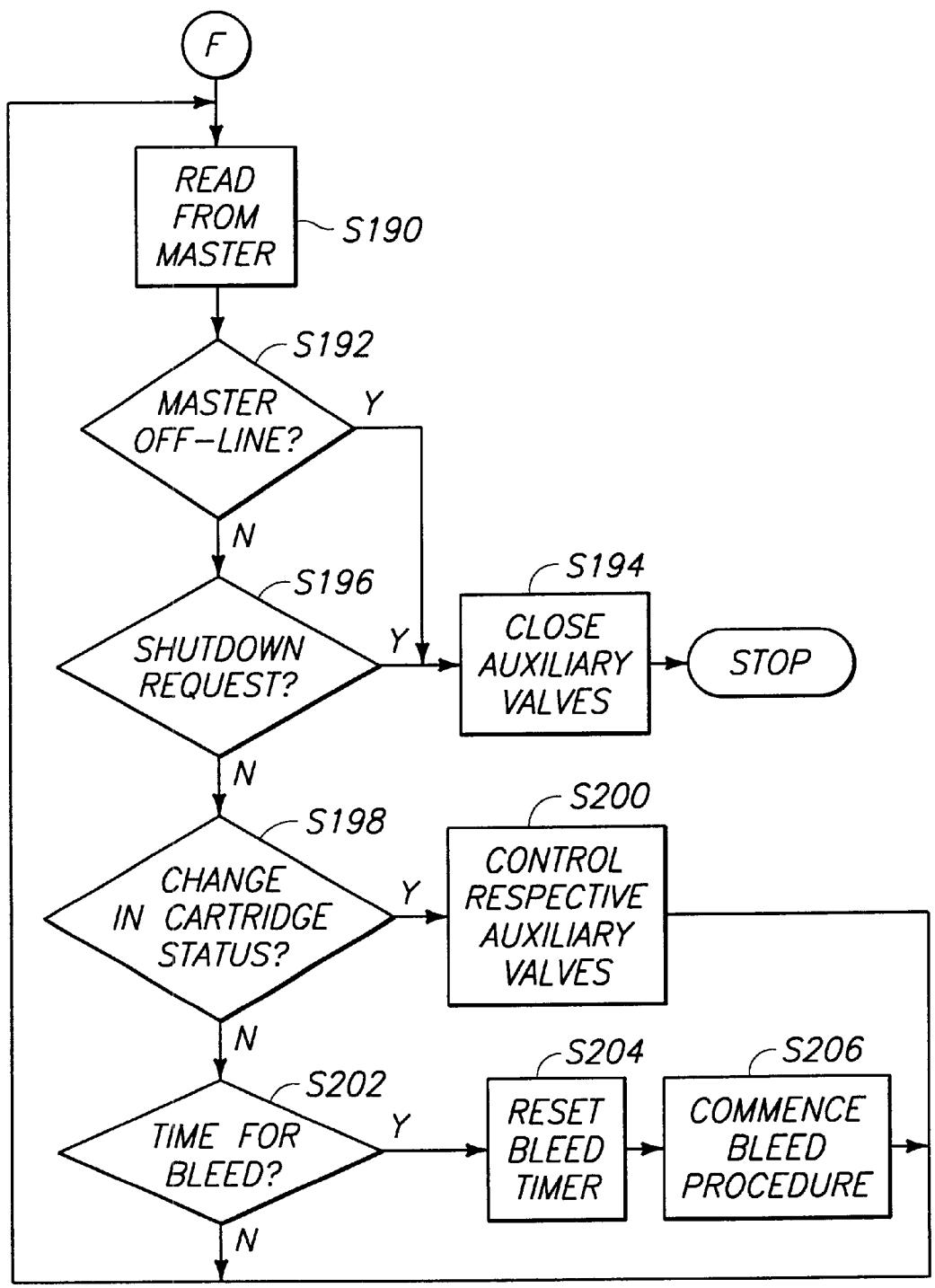

Referring to FIGS. 20–20A, a flow chart illustrating exemplary operations of auxiliary valve slave controller 104 is shown. Initially, slave controller 104 performs a communication check at step S180 to assure proper communications with master controller 100. At step S182, slave controller 104 listens for a start-up signal from master controller 100. At step S184, it is determined whether the appropriate start-up signal has been received. Once the start-up signal is received, slave controller 104 instructs auxiliary solenoids 44 to open respective auxiliary valves 45 at step S186. At step S188, slave controller 104 commences to perform a bleed procedure wherein slave controller 104 instructs bleed solenoid 42 to open bleed valve 43 for a defined length of time.

At step S190, slave controller 104 reads data and messages from master controller 100. Slave controller 104 determines whether the master is off-line at step S192. If so, slave controller 104 closes auxiliary valves 45 at step S194. Otherwise, slave controller 104 proceeds to step S196 to determine whether a shut down request has been issued by master controller 100. If so, slave controller 104 proceeds to step S194. Otherwise, slave controller 104 proceeds to step S198 to determine whether a change in status of any fuel cell cartridges 14 has been made. If so, slave controller 104 controls respective auxiliary valves 45 at step S200 to either supply fuel if the corresponding fuel cell cartridge 14 is on-line, or cease supply of fuel if the fuel cell cartridge 14 has been taken off-line.

At step S202, slave controller 104 monitors to determine whether it is time for a bleed cycle. Slave controller 104 can be configured to periodically implement a bleed cycle using bleed solenoid 42 and bleed valve 43 according to a bleed timer. If it is time for a bleed cycle, slave controller 104 proceeds to step S204 to reset the bleed timer and thereafter commence a bleed procedure at step S206. As shown, slave controller 104 cycles back to step S190 to read any new data from master controller 100.

Figure 21:
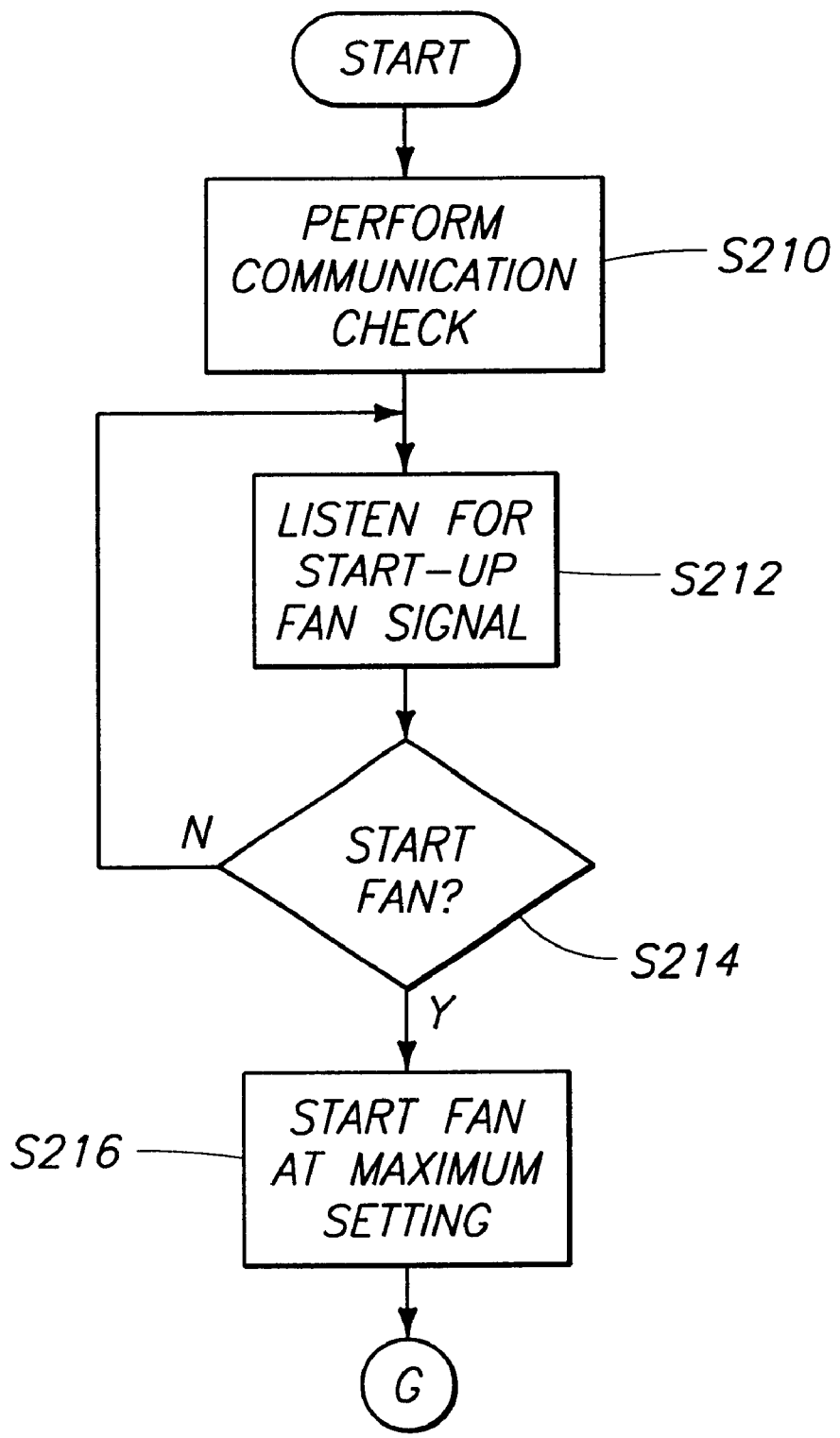

Referring to FIGS. 21–21A, a flow chart illustrating exemplary operations of fan slave controller 106 is illustrated. Slave controller 106 initially proceeds to step S210 and performs a communications check to verify proper Communications with master controller 100. At step S212, slave controller 106 listens for an appropriate fan start-up signal from master controller 100.

Once the appropriate start-up signal is received as determined at so step S214, slave controller 106 proceeds to step S216 to start operation of fan 54 at a maximum air flow setting. Thereafter, slave controller 106 reads fan status information from fan monitoring circuitry 49 at step S218. At step S220, slave controller 106 determines whether fan 54 is operating properly. If not, slave controller 106 issues a shut down request to master controller 100 at step S222.

Otherwise, slave controller 106 receives any updated fan setting from master controller 100 at step S224. At step S226, slave controller 106 can output appropriate signals to fan control circuitry 48 to adjust the operation of fan 54. At step S228, slave controller 106 determines whether a shut down command has been issued by master controller 100. If not, slave controller 106 returns to step S218 to read the status of fan 54. Otherwise, slave controller 106 proceeds to step S230 to shut off fan 54.

Referring to FIG. 22, a flow chart illustrating exemplary operations of interface slave controller 108 is shown. Initially, slave controller 108 proceeds to step S240 to perform a communications check with master controller 100. Thereafter, slave controller 108 outputs appropriate message information to operator interface 16 for conveyance to an operator. In the described embodiment, operator interface 16 displays the message information received from master controller 100.

Slave controller 108 listens for updates to operator interface 16 at step S244. At step S246, it is determined whether master controller 100 is off-line. If so, slave controller 108 sends an error message to operator interface 16 to indicate master controller 100 is off-line. Otherwise, slave controller 108 proceeds to step S250 to determine whether there was a change in the status of operator interface 16. If not, slave controller 108 proceeds to step S244 and listens for updates for operator interface 16. If a change in interface status is indicated at step S250, slave controller 108 proceeds to step S252 to update operator interface 16.

Figure 23:
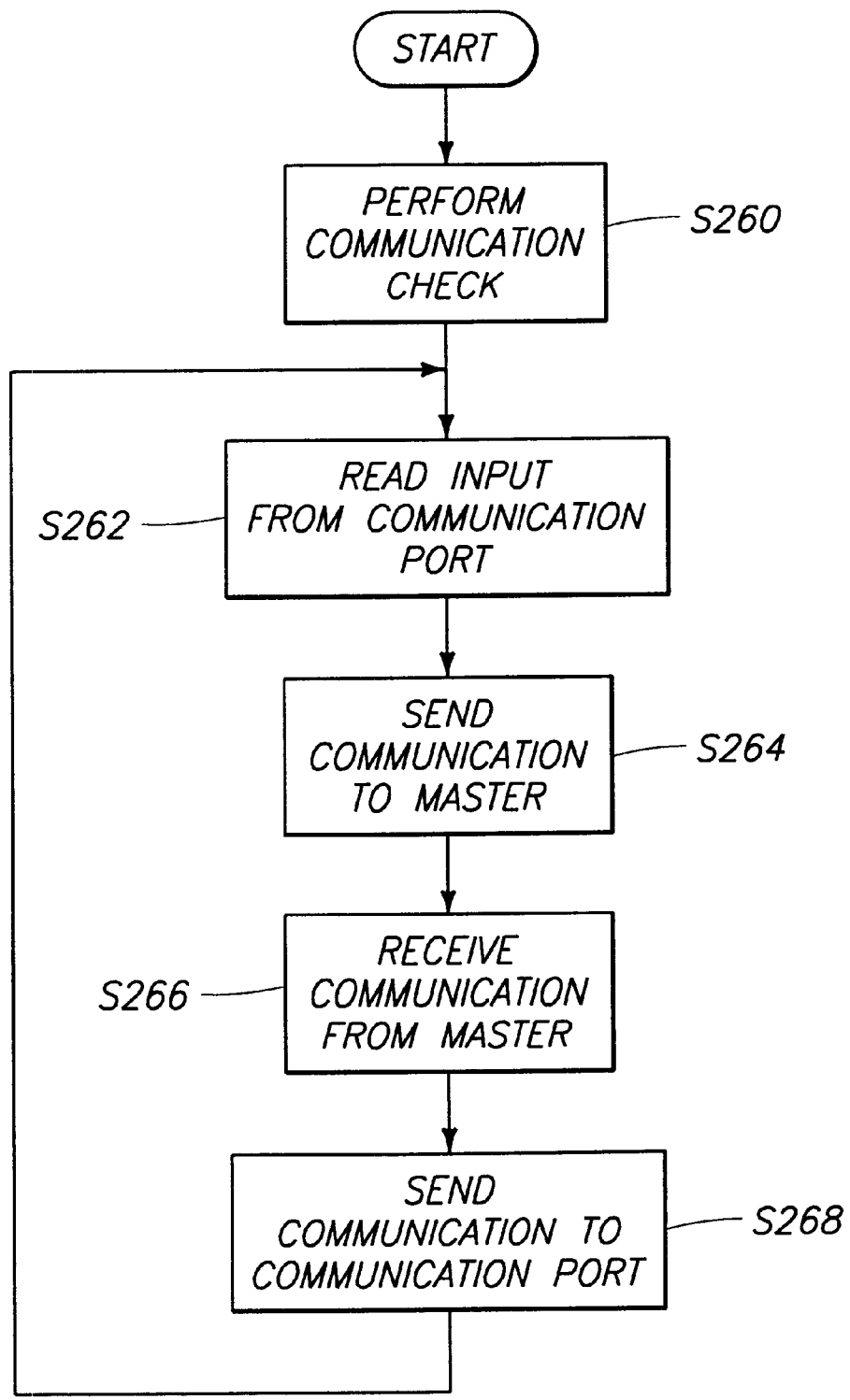
FIG. 23 is a flow chart illustrating exemplary operations of the external port slave controller of the control system.

Referring to FIG. 23, a flow chart illustrating exemplary operations of external port slave controller 110 is illustrated. Initially, slave controller 110 performs a communications check with master controller 100 at step S260. Thereafter, slave controller 100 reads any input communication from remote device 24 and communication port 36. At step S264, slave controller 110 sends any received communications to master controller 100. At step S266, slave controller 110 receives any communications from master controller 100. Slave controller 110 proceeds to forward any communications to communication port 36 and remote device 24 at step S268.

Referring to FIGS. 24–24A, a flow chart illustrating exemplary operations of system slave controller 112 is shown. Initially, at step S270, slave controller 112 performs a communications check with master controller 100. Next, slave controller 112 can read status information from power supply sensors 31 and current sensor 40 at step S272. At step S274, it is determined by slave controller 112 whether the inputted status values are within appropriate ranges. If not, slave controller 112 can generate an error message at step S276 for application to master controller 100.

Otherwise, slave controller 112 proceeds to step S278 and listens for a main valve open command from master controller 100. At step S280, it is determined whether the open valve command was received. Once the open valve command is received, slave controller 112 proceeds to step S282 to activate main valve 47 using main solenoid 46. At step S284, slave controller 112 listens for a shut down command from master controller 100.

Proceeding to step S286, slave controller 112 determines whether the master controller 100 is off-line. If so, slave controller 112 proceeds to step S296 to shut off power supply 32 and main valve 47 using main solenoid 46. If master controller 100 is on-line, slave controller 112 proceeds to step S288 to again read status values from power supply sensors 31 and current sensor 40. Slave controller 112 can control charge circuitry 34 to charge battery 35, if necessary, at step S290 responsive to the values read at step S288.

At step S292, slave controller 112 determines whether the values are within the appropriate ranges. If not, slave controller 112 proceeds to step S294 to generate an error message for application to master controller 100. Otherwise, at step S296, slave controller 112 monitors for the presence of a shut down command or request from master controller 100. If no shut down command is issued, slave controller 112 returns to step S284. If a shut down request or command is received at step S296, slave controller 112 proceeds to step S296 to shut off main valve 47 using main solenoid 46 as well as turn off power supply 32.

Referring to FIG. 25, a flow chart illustrating exemplary operations of sensor slave controller 114 is shown. Initially, at step S300, slave controller 114 performs a communication check with master controller 100. At step S302, slave controller 114 controls heaters 74, 75, if necessary, to bring associated fuel sensors 58, 61 within proper operating temperature ranges. Thereafter, slave controller 114 is configured to read information from fuel detection circuitry 64 and corresponding fuel sensors 58, 61.

Responsive to reading the fuel sensor values, slave controller 114 determines at step S306 whether a major leak was detected. If so, slave controller 114 forwards an appropriate major leak message to master controller 100 at step S308. At step S310, the fuel sensor values are analyzed to determine whether a minor leak was detected. If so, slave controller 114 sends an appropriate minor leak message to master controller 100 at step S312.

At step S314, slave controller 114 reads external temperature information from temperature circuitry 67 and associated temperature sensor 59. At step S316, slave controller 114 sends external temperature values to master controller 100.

Figure 26:
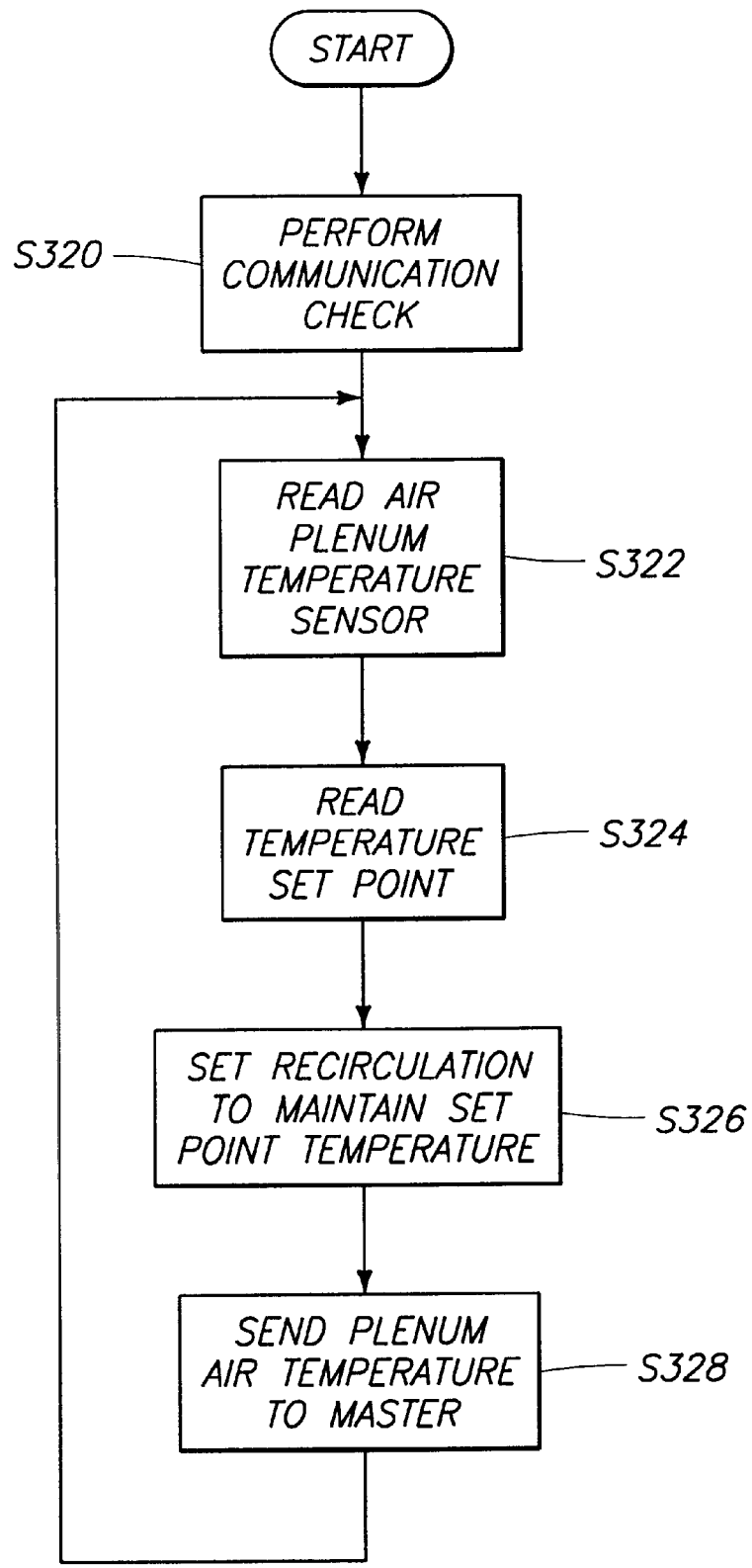
FIG. 26 is a flow chart illustrating exemplary operations of the air temperature slave controller of the control system.

Referring to FIG. 26, a flow chart illustrating exemplary operations of air temperature slave controller 116 is shown. Initially, slave controller 116 performs a communication check with master controller 100 at step S320. Thereafter, slave controller 116 reads temperature values from temperature circuitry 68 and associated temperature sensor 55 located within air plenum 51. At step S324, slave controller 116 reads a temperature set point as calculated from master controller 100.

At step S326, slave controller 116 sets recirculation using air passage 56 and fan 54 to maintain a set point temperature. Slave controller 116 outputs the air temperature of plenum 51 as determined by temperature sensor 55 to master controller 100 at step S328.

Referring to FIG. 27, a flow chart illustrating exemplary operations of shunt slave controller 118 is shown. Initially, at step S330, slave controller 118 performs a communication check with master controller 100. At step S332, slave controller 118 reads data from master controller 100.

At step S334, it is determined whether there was a change in status of the fuel cell cartridges 14. If so, slave controller 118 proceeds to step S336 to determine whether there is a change of any of the fuel cell cartridges 14 to an off-line condition. If not, the appropriate switching device 96 for the respective fuel cell cartridge 14 is latched to an off position at step S338. Alternatively, slave controller 118 proceeds to step S340 to latch the appropriate switching device 96 for the respective fuel cell cartridge 14 in an on position.

Following processing of steps S338 or S340, or alternatively if there is no change in status of fuel cell cartridges 14 as determined at step S334, slave controller 118 proceeds to step S342 to cyclically shunt fuel cells 90 within fuel cell cartridges 14 as described in detail in U.S. Pat. No. 6,076,449 incorporated by reference above.

Referring to FIG. 28, a flow chart illustrating exemplary operations of switch slave controller 120 is shown. Slave controller 120 performs a communication check with master controller 100 at step S350. Thereafter, slave controller 120 reads switch status information from switches 20 and switch conditioning circuitry 19 at step S352. At step S354, slave controller 120 reads load enable status information from master controller 100.

Slave controller 120 determines whether a power off request was received from master controller 100 at step S356. If yes, slave controller 120 proceeds to step S358 to send a shut down message to master controller 100. Otherwise, slave controller 120 proceeds to step S360. Slave controller 120 determines whether a load enable request was provided from switches 20. If so, slave controller 120 proceeds to step S362 to determine whether master controller 100 has indicated fuel cell power system 10 is ready to provide power as determined in step S354. If so, slave controller 120 proceeds to step S364 to enable switching device 38.

At step S366, slave controller 120 determines whether the master controller 100 is in an off-line condition. If so, slave controller 120 disables switching device 38 at step S368. Otherwise, slave controller 120 proceeds to step S370 to determine whether a cartridge reset has been indicated from switches 20. If so, slave controller 120 proceeds to send a cartridge reset message to master controller 100 at step S372. Slave controller 120 then returns to step S352 to read switch status from switch conditioning circuitry 19 and associated switches 20 at step S352.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell power system comprising:
   a plurality of fuel cells electrically coupled with plural terminals and individually configured to convert chemical energy into electricity, wherein the fuel cells are configured to be individually selectively deactivated and remaining ones of the fuel cells are configured to provide electricity to the terminals with another of the fuel cells deactivated; and
   a digital control system configured to at least one of control and monitor an operation of the fuel cells.

2. The fuel cell power system according to claim 1 wherein the control system is configured to control the operation.

3. The fuel cell power system according to claim 1 wherein the control system is configured to monitor the operation.

4. The fuel cell power system according to claim 1 wherein the fuel cells are coupled in series.

5. The fuel cell power system according to claim 1 wherein the control system comprises a plurality of distributed controllers.

6. The fuel cell power system according to claim 5 wherein the distributed controllers are configured in a master\slave relationship.

7. The fuel power system according to claim 1 wherein the fuel cells comprise polymer electrolyte membrane fuel cells.

8. The fuel cell power system according to claim 1 wherein the fuel cells are individually configured to be physically removeable.

9. The fuel cell power system according to claim 1 wherein the fuel cells are individually configured to be electrically bypassed.

10. The fuel cell power system according to claim 1 further comprising a plurality of switching devices configured to selectively shunt respective fuel cells.

11. The fuel cell power system according to claim 10 wherein the control system is configured to monitor at least one electrical characteristic of the fuel cells and to control the switching devices responsive to the monitoring.

12. The fuel cell power system according to claim 1 further comprising:
   a housing about the fuel cells;
   a temperature sensor within the housing; and
   an air temperature control assembly configured to at least one of increase and decrease the temperature in the housing.

13. The fuel cell power system according to claim 12 wherein the control system is configured to monitor temperature using the temperature sensor and to control the air temperature control assembly responsive to the monitoring to maintain the temperature within the housing within a predefined range.

14. The fuel cell power system according to claim 12 wherein the control system is configured to monitor temperature using the temperature sensor and to control the air temperature control assembly responsive to the monitoring to maintain the temperature within the housing within a predefined range of approximately 25° Celsius to 80° Celsius.

15. The fuel cell power system according to claim 1 further comprising a fan configured to direct air to the fuel cells, and the control system is configured to control the fan.

16. The fuel cell power system according to claim 1 further comprising a plurality of valves configured to supply fuel to respective fuel cells, and the control system is configured to control the valves.

17. The fuel cell power system according to claim 1 further comprising a main valve configured to supply fuel to the fuel cells, and the control system is configured to control the main valve.

18. The fuel cell power system according to claim 1 further comprising a communication port adapted to couple with a remote device, and the control system is configured to communicate with the remote device via the communication port.

19. The fuel cell power system according to claim 1 wherein the control system is configured to implement a shut down operation to deactivate one or more of the fuel cells.

20. The fuel cell power system according to claim 19 wherein the control system is configured to implement the shut down operation to deactivate all the fuel cells.

21. The fuel cell power system according to claim 1 further comprising a switching device intermediate one of the terminals and the fuel cells, and the control system is configured to control the switching device.

22. The fuel cell power system according to claim 1 further comprising:
   a housing about the fuel cells; and
   a fuel sensor configured to monitor for the presence of fuel within the housing, and the control system is coupled with the fuel sensor and configured to implement a shut down operation responsive to a detection of fuel within the housing.

23. The fuel cell power system according to claim 1 wherein the fuel cells are provided in a plurality of cartridges.

24. A fuel cell power system comprising:
   a housing;
   a plurality of terminals;
   a plurality of fuel cells within the housing and electrically coupled with the terminals and configured to convert chemical energy into electricity;
   a plurality of valves adapted to couple with a fuel source and configured to selectively supply fuel to respective fuel cells; and
   a control system configured to control the plurality of valves.

25. The fuel cell power system according to claim 24 wherein the control system comprises a plurality of distributed controllers.

26. The fuel cell power system according to claim 24 wherein the fuel cells comprise polymer electrolyte membrane fuel cells.

27. The fuel cell power system according to claim 24 wherein the fuel cells are configured to be individually selectively deactivated and remaining ones of the fuel cells are configured to provide electricity to the terminals with others of the fuel cells deactivated.

28. The fuel cell power system according to claim 27 wherein the fuel cells are individually configured to be physically removable.

29. The fuel cell power system according to claim 27 wherein the fuel cells are individually configured to be electrically bypassed.

30. The fuel cell power system according to claim 24 wherein the control system is configured to monitor at least one electrical characteristic of the fuel cells and to control the respective valves responsive to the monitoring.

31. A fuel cell power system comprising:
   a housing;
   a plurality of terminals;
   a plurality of fuel cells within the housing and electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;
   a bleed valve configured to selectively purge matter from at least one of the fuel cells; and
   a control system configured to control selective positioning of the bleed valve.

32. The fuel cell power system according to claim 31 wherein the control system comprises a plurality of distributed controllers.

33. The fuel cell power system according to claim 31 wherein the fuel cells comprise polymer electrolyte membrane fuel cells.

34. The fuel cell power system according to claim 31 wherein the control system is configured to periodically open the bleed valve.

35. The fuel cell power system according to claim 31 further comprising a connection arranged to provide drainage from an anode side of at least one of the fuel cells to the bleed valve.

36. A fuel cell power system comprising:
   a housing;
   a plurality of terminals;
   a plurality of fuel cells within the housing and electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;
   a fan within the housing and configured to direct air to at least one of the fuel cells; and
   a control system configured to control an operation of the fan.

37. The fuel cell power system according to claim 36 wherein the control system comprises a plurality of distributed controllers.

38. The fuel cell power system according to claim 36 wherein the fuel cells comprise polymer electrolyte membrane fuel cells.

39. The fuel cell power system according to claim 36 further comprising at least one sensor configured to at least one of monitor current supplied to a load coupled with the terminals and monitor voltage of at least one of the fuel cells, and the control system is configured to control a rate of air flow of the fan responsive to the monitoring.

40. The fuel cell power system according to claim 36 wherein the fuel cells individually include a cathode side and the fan and the housing are configured to direct air into the cathode side of at least one of the fuel cells.

41. The fuel cell power system according to claim 36 further comprising a plenum within the housing and configured to direct air from the fan to at least one of the fuel cells.

42. The fuel cell power system according to claim 41 wherein the plenum is configured to direct air to cathode sides of the fuel cells.

43. The fuel cell power system according to claim 36 further comprising an air flow device configured to operate responsive to control from the control system to permit selective passage of air at least one of into and out of the housing.

44. The fuel cell power system according to claim 36 further comprising monitoring circuitry configured to monitor an air flow rate of the fan and output a signal indicative of the air flow rate to the control system.

45. The fuel cell power system according to claim 44 wherein the control system is configured to control an air flow rate of the fan.

46. A fuel cell power system comprising:
   a housing;
   a plurality of terminals;
   a plurality of fuel cells within the housing and electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;

a control system configured to at least one of control and monitor an operation of at least one of the fuel cells; and an operator interface coupled with the control system to indicate at least one operational status responsive to control from the control system.

47. The fuel cell power system according to claim 46 wherein the control system comprises a plurality of distributed controllers.

48. The fuel cell power system according to claim 46 wherein the fuel cells comprise polymer electrolyte membrane fuel cells.

49. The fuel cell power system according to claim 46 wherein the operator interface is positioned for observation from the exterior of the housing.

50. The fuel cell power system according to claim 46 wherein the operator interface comprises a display configured to emit a human perceptible signal.

51. The fuel cell power system according to claim 46 wherein the operator interface comprises interface switches configured to receive operator inputs.

52. A fuel cell power system comprising:
a plurality of terminals;
at least one fuel cell electrically coupled with the terminals and configured to convert chemical energy into electricity;
a power supply comprising a battery;
a control system configured to receive electricity from the battery and to at least one of control and monitor at least one operation of the at least one fuel cell; and
charge circuitry configured to selectively charge the battery responsive to control from the control system.

53. The fuel cell power system according to claim 52 wherein the control system comprises a plurality of distributed controllers.

54. The fuel cell power system according to claim 52 wherein the at least one fuel cell comprises a plurality of polymer electrolyte membrane fuel cells.

55. The fuel cell power system according to claim 52 wherein the at least one fuel cell comprises a plurality of fuel cells.

56. The fuel cell power system according to claim 55 wherein the fuel cells are configured to be individually selectively deactivated and remaining ones of the fuel cells are configured to provide electricity to the terminals with others of the fuel cells deactivated.

57. The fuel cell power system according to claim 52 wherein the control system is configured to monitor an electrical condition of the battery and to control the charge circuitry to charge the battery responsive to the monitoring of the electrical condition of the battery.

58. The fuel cell power system according to claim 52 wherein the battery is configured to supply electricity to the control system during a start-up operation of the fuel cell power system.

59. The fuel cell power system according to claim 52 further comprising an operator interface and the control system is configured to control the operator interface to indicate the at least one operation.

60. A fuel cell power system comprising:
a plurality of terminals;
a plurality of fuel cells electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;

a sensor configured to monitor at least one electrical condition of at least one of the fuel cells; and a control system coupled with the sensor and configured to monitor the sensor.

61. The fuel cell power system according to claim 60 wherein the control system comprises a plurality of distributed controllers.

62. The fuel cell power system according to claim 60 wherein the fuel cells comprise polymer electrolyte membrane fuel cells.

63. The fuel cell power system according to claim 60 further comprising an operator interface and the control system is configured to control the operator interface to indicate the at least one electrical condition.

64. The fuel cell power system according to claim 60 further comprising a fan configured to direct air to at least one of the fuel cells and the control system is configured to control the fan responsive to the at least one electrical condition.

65. A fuel cell power system comprising:
a plurality of terminals;
a plurality of fuel cells electrically coupled with the terminals and configured to convert chemical energy into electricity;
a main valve adapted to couple with a fuel source;
a plurality of auxiliary valves in fluid communication with the main valve and configured to selectively supply fuel to respective fuel cells; and
a control system configured to control the main valve.

66. The fuel cell power system according to claim 65 wherein the control system comprises a plurality of distributed controllers.

67. The fuel cell power system according to claim 65 wherein the fuel cells comprise polymer electrolyte membrane fuel cells.

68. The fuel cell power system according to claim 65 wherein the fuel cells are configured to be individually selectively deactivated and remaining ones of the fuel cells are configured to provide electricity to the terminals with others of the fuel cells deactivated.

69. The fuel cell power system according to claim 65 wherein the auxiliary valves are positioned intermediate the main valve and respective fuel cells.

70. A fuel cell power system comprising:
a housing;
a plurality of terminals;
at least one fuel cell within the housing and electrically coupled with the terminals and configured to convert chemical energy into electricity;
an air temperature control assembly configured to direct air within the housing to the at least one fuel cell and comprising a modifying element configured to condition the temperature of the air; and
a control system configured to control the modifying element.

71. The fuel cell power system according to claim 70 wherein the control system comprises a plurality of distributed controllers.

72. The fuel cell power system according to claim 70 wherein the at least one fuel cell comprises a plurality of polymer electrolyte membrane fuel cells.

73. The fuel cell power system according to claim 70 wherein the at least one fuel cell comprises a plurality of fuel cells.

74. The fuel cell power system according to claim 73 herein the fuel cells are configured to be individually selectively deactivated and remaining ones of the fuel cells are configured to provide electricity to the terminals with others of the fuel cells deactivated.

75. The fuel cell power system according to claim 70 further comprising a temperature sensor configured to monitor the temperature of the directed air within the housing.

76. The fuel cell power system according to claim 75 wherein the control system is configured to monitor the temperature of the directed air from the temperature sensor and to control the modifying element responsive to the monitoring of the temperature.

77. The fuel cell power system according to claim 70 wherein the modifying element comprises a heater.

78. A fuel cell power system comprising:
   a housing;
   a plurality of terminals;
   at least one fuel cell within the housing and electrically coupled with the terminals and configured to convert chemical energy into electricity;
   a hydrogen sensor positioned within the housing; and
   a control system configured to monitor a detection of hydrogen within the housing using the hydrogen sensor.

79. The fuel cell power system according to claim 78 wherein the control system comprises a plurality of distributed controllers.

80. The fuel cell power system according to claim 78 wherein the at least one fuel cell comprises a plurality of polymer electrolyte membrane fuel cells.

81. The fuel cell power system according to claim 78 wherein the at least one fuel cell comprises a plurality of fuel cells.

82. The fuel cell power system according to claim 81 wherein the fuel cells are configured to be individually selectively deactivated and remaining ones of the fuel cells are configured to provide electricity to the terminals with others of the fuel cells deactivated.

83. The fuel cell power system according to claim 78 further comprising an operator interface and the control system is configured to control the operator interface to indicate a detection of hydrogen.

84. The fuel cell power system according to claim 78 further comprising a fuel delivery system configured to supply hydrogen to the at least one fuel cell.

85. The fuel cell power system according to claim 84 wherein the at least one fuel cell comprises a plurality of fuel cells, and fuel delivery system comprises a plurality of valves configured to supply hydrogen to respective ones of the fuel cells.

86. The fuel cell power system according to claim 85 wherein the control system is configured to selectively close the valves responsive to a detection of hydrogen using the hydrogen sensor.

87. The fuel cell power system according to claim 78 further comprising a heater configured to selectively impart heat flux to the hydrogen sensor.

88. A fuel cell power system comprising:
   a housing;
   a plurality of terminals;
   at least one fuel cell within the housing and electrically coupled with the terminals and configured to convert chemical energy into electricity;
   a temperature sensor within the housing; and
   a control system coupled with the temperature sensor and configured to monitor the temperature in the housing using the temperature sensor.

89. The fuel cell power system according to claim 88 wherein the control system comprises a plurality of distributed controllers.

90. The fuel cell power system according to claim 88 wherein the at least one fuel cell comprises a plurality of polymer electrolyte membrane fuel cells.

91. The fuel cell power system according to claim 88 wherein the at least one fuel cell comprises a plurality of fuel cells.

92. The fuel cell power system according to claim 91 wherein the fuel cells are configured to be individually selectively deactivated and remaining ones of the fuel cells are configured to provide electricity to the terminals with others of the fuel cells deactivated.

93. The fuel cell power system according to claim 88 further comprising an air temperature control assembly configured to at least one of increase and decrease the temperature in the housing.

94. The fuel cell power system according to claim 93 wherein the control system is configured to control the air temperature control assembly.

95. The fuel cell power system according to claim 93 wherein the control system is configured to control the air temperature control assembly to maintain the temperature in the housing within a predefined range.

96. The fuel cell power system according to claim 93 wherein the control system is configured to control the air temperature control assembly to maintain the temperature in the housing within a predefined range of approximately 25° Celsius to 80° Celsius.

97. The fuel cell power system according to claim 93 wherein the air temperature control assembly comprises:
   a fan configured to circulate air within the housing; and
   an air flow device configured to permit selective passage of air at least one of into and out of the housing.

98. The fuel cell power system according to claim 97 wherein the control system is configured to control the fan and the air flow device.

99. The fuel cell power system according to claim 88 further comprising a temperature sensor configured to monitor a temperature exterior of the housing.

100. A fuel cell power system comprising:
   a plurality of terminals;
   a plurality of fuel cells within the housing and electrically coupled with the terminals and configured to convert chemical energy into electricity;
   a plurality of switching devices individually configured to selectively shunt at least one of the fuel cells; and
   a control system configured to control the switching devices.

101. The fuel cell power system according to claim 100 wherein the control system comprises a plurality of distributed controllers.

102. The fuel cell power system according to claim 100 wherein the at least one fuel cell comprises a plurality of polymer electrolyte membrane fuel cells.

103. The fuel cell power system according to claim 100 wherein the at least one fuel cell comprises a plurality of fuel cells.

104. The fuel cell power system according to claim 103 wherein the fuel cells are configured to be individually selectively deactivated and remaining ones of the fuel cells are configured to provide electricity to the terminals with others of the fuel cells deactivated.

105. The fuel cell power system according to claim 100 wherein the control system is configured to shunt the at least one fuel cell for a variable period of time.

106. The fuel cell power system according to claim 100 wherein the control system is configured to sequentially shunt the fuel cells using the respective switching devices.

107. The fuel cell power system according to claim 100 wherein the control system is configured to shunt individual ones of the fuel cells using the respective switching devices.

108. The fuel cell power system according to claim 107 wherein the control system is configured to shunt the individual ones of the fuel cells according to a specified order.

109. The fuel cell power system according to claim 100 further comprising a plurality of valves individually configured to selectively supply fuel to respective fuel cells, and wherein the control system is configured to control the valves.

110. The fuel cell power system according to claim 109 wherein the control system is configured to cease supply of fuel to shunted fuel cells using respective ones of the valves.

111. The fuel cell power system according to claim 100 wherein the switching devices comprise MOSFET switching devices.

112. A fuel cell power system comprising:
a housing;
a plurality of terminals;
at least one fuel cell within the housing and electrically coupled with the terminals and configured to convert chemical energy into electricity;
a switching device coupled intermediate the at least one fuel cell and one of the terminals;
a control system coupled with the switching device and configured to control the switching device to selectively couple the terminal with the at least one fuel cell; and
a temperature sensor positioned within the housing, wherein the control system is configured to monitor the temperature within the housing and to couple the terminal with the at least one fuel cell using the switching device responsive to the temperature being within a predefined range.

113. The fuel cell power system according to claim 112 wherein the control system comprises a plurality of distributed controllers.

114. The fuel cell power system according to claim 112 wherein the at least one fuel cell comprises a plurality of polymer electrolyte membrane fuel cells.

115. The fuel cell power system according to claim 112 wherein the at least one fuel cell comprises a plurality of fuel cells.

116. The fuel cell power system according to claim 115 wherein the fuel cells are configured to be individually selectively deactivated and remaining ones of the fuel cells are configured to provide electricity to the terminals with others of the fuel cells deactivated.

117. The fuel cell power system according to claim 112 wherein the switching device comprises at least one MOSFET switching device.

118. The fuel cell power system according to claim 112 wherein the terminals are adapted to be electrically coupled with a load.

119. A method of controlling a fuel cell power system comprising:
providing a plurality of fuel cells individually configured to convert chemical energy into electricity;
electrically coupling the plurality of fuel cells;
providing a first terminal coupled with the fuel cells;
providing a second terminal coupled with the fuel cells;
coupling a digital control system with the fuel cells to at least one of monitor and control an operation of the fuel cells; and
deactivating at least one of the fuel cells.

120. The method according to claim 119 further comprising monitoring the operation of the fuel cells.

121. The method according to claim 119 further comprising controlling the operation of the fuel cells.

122. The method according to claim 119 wherein the coupling the control system comprises coupling a plurality of distributed controllers.

123. The method according to claim 119 wherein the providing the fuel cells comprises providing polymer electrolyte membrane fuel cells.

124. The method according to claim 119 further comprising controlling the deactivating using the digital control system.

125. The method according to claim 119 wherein the deactivating comprises physically removing.

126. The method according to claim 119 wherein the deactivating comprises electrically bypassing.

127. The method according to claim 119 further comprising providing electricity to a load coupled with the terminals with the at least one fuel cell deactivated.

128. The method according to claim 119 further comprising selectively shunting at least one of the fuel cells.

129. The method according to claim 119 further comprising:
monitoring at least one electrical characteristic of the fuel cells; and
shunting at least one of the fuel cells responsive to the monitoring.

130. The method according to claim 119 further comprising maintaining an air temperature about the fuel cells in a predefined range.

131. The method according to claim 119 further comprising maintaining an air temperature about the fuel cells in a predefined range of approximately 25° Celsius to 80° Celsius.

132. The method according to claim 119 further comprising directing air to the fuel cells using a fan.

133. The method according to claim 132 further comprising:
monitoring a load coupled with the terminals; and
controlling the fan responsive to the monitoring using the control system.

134. The method according to claim 119 further comprising:
supplying fuel to the fuel cells using a plurality of auxiliary valves; and
controlling the auxiliary valves using the control system.

135. The method according to claim 134 further comprising:
supplying fuel to the auxiliary valves using a main valve; and
controlling the main valve using the control system.

136. The method according to claim 119 further comprising:
communicating with a remote device using a communication port; and
controlling the communicating using the control system.

137. The method according to claim 119 further comprising:
switching a connection intermediate one of the terminals and the fuel cells; and
controlling the switching using the control system.

138. The method according to claim 119 further comprising:
  monitoring for the presence of fuel within a housing about the fuel cells; and
  implementing a shut down operation responsive to the monitoring using the control system.

139. The method according to claim 138 wherein the implementing comprises the deactivating.

140. The method according to claim 138 wherein the implementing comprises deactivating all of the fuel cells.

141. A method of controlling a fuel cell power system comprising:
  providing a plurality of fuel cells configured to convert chemical energy into electricity;
  providing a first terminal coupled with the fuel cells;
  providing a second terminal coupled with the fuel cells;
  supplying fuel to the fuel cells;
  controlling the supplying using a control system; and
  deactivating at least one of the fuel cells.

142. The method according to claim 141 wherein the controlling comprises controlling using the control system comprising a plurality of distributed controllers.

143. The method according to claim 141 wherein the providing the fuel cells comprises providing polymer electrolyte membrane fuel cells.

144. The method according to claim 141 further comprising controlling the deactivating using the control system.

145. The method according to claim 141 further comprising controlling the deactivating using the control system and the controlling the supplying comprises ceasing delivery of the fuel to the at least one deactivated fuel cell.

146. The method according to claim 141 further comprising providing electricity to a load coupled with the terminals with the at least one fuel cell deactivated.

147. The method according to claim 141 further comprising monitoring at least one electrical characteristic of the at least one deactivated fuel cell, and the deactivating is responsive to the monitoring.

148. A method of controlling a fuel cell power system comprising:
  providing a plurality of fuel cells configured to convert chemical energy into electricity;
  providing a first terminal coupled with at least one of the fuel cells;
  providing a second terminal coupled with at least one of the fuel cells;
  selectively bleeding a connection coupled with at least one of the fuel cells to purge matter from the at least one fuel cell coupled with the connection;
  controlling the bleeding using a control system; and
  deactivating at least one of the fuel cells.

149. The method according to claim 148 wherein the controlling comprises controlling using the control system comprising a plurality of distributed controllers.

150. The method according to claim 148 wherein the providing the at least one fuel cell comprises providing the at least one fuel cell having a plurality of polymer electrolyte membrane fuel cells.

151. The method according to claim 148 further comprising providing electricity to a load coupled with the terminals with the at least one fuel cell deactivated.

152. The method according to claim 148 wherein the selectively bleeding comprises periodically bleeding responsive to control of the control system.

153. The method according to claim 148 wherein the bleeding comprises bleeding using a bleed valve.

154. The method according to claim 148 wherein the bleeding comprises bleeding to purge diluents from an anode of the at least one fuel cell.

155. A method of controlling a fuel cell power system comprising:
  providing at least one fuel cell configured to convert chemical energy into electricity;
  providing a first terminal coupled with the at least one fuel cell;
  providing a second terminal coupled with the at least one fuel cell;
  directing air to the at least one fuel cell;
  monitoring the temperature of the air; and
  controlling the directing using a control system.

156. The method according to claim 155 wherein the controlling comprises controlling using the control system comprising a plurality of distributed controllers.

157. The method according to claim 155 wherein the providing the at least one fuel cell comprises providing the at least one fuel cell having a plurality of polymer electrolyte membrane fuel cells.

158. The method according to claim 155 wherein the providing the at least one fuel cell comprises providing a plurality of fuel cells.

159. The method according to claim 158 further comprising deactivating at least one of the fuel cells.

160. The method according to claim 159 further comprising providing electricity to a load coupled with the terminals with the at least one fuel cell deactivated.

161. The method according to claim 155 further comprising providing electricity to a load coupled with the terminals, monitoring the providing of electricity, and the controlling is responsive to the monitoring of the providing of electricity.

162. The method according to claim 155 further comprising monitoring at least one of voltage of the at least one fuel cell and current passing through the at least one fuel cell, and the controlling is responsive to the monitoring of at least one of voltage and current.

163. The method according to claim 155 wherein the directing comprises directing air into a cathode side of the at least on fuel cell.

164. The method according to claim 163 wherein the directing comprises directing using a fan, and the controlling comprises controlling an air flow rate of the fan.

165. The method according to claim 155 further comprising introducing exterior air into a housing about the at least one fuel cell.

166. The method according to claim 155 wherein the controlling is responsive to the monitoring.

167. The method according to claim 155 further comprising controlling a modifying element using the control system to control the temperature of the air responsive to the monitoring.

168. A method of controlling a fuel cell power system comprising:
  providing at least one fuel cell configured to convert chemical energy into electricity;
  providing a first terminal coupled with the at least one fuel cell;
  providing a second terminal coupled with the at least one fuel cell;
  indicating at least one operational status of the fuel cell power system using an operator interface;

controlling the indicating using a control system; and forwarding the at least one operational status to a remote device.

169. The method according to claim 168 wherein the controlling comprises controlling using the control system comprising a plurality of distributed controllers.

170. The method according to claim 168 wherein the providing the at least one fuel cell comprises providing the at least one fuel cell having a plurality of polymer electrolyte membrane fuel cells.

171. The method according to claim 168 wherein the providing the at least one fuel cell comprises providing a plurality of fuel cells.

172. The method according to claim 171 further comprising deactivating at least one of the fuel cells.

173. The method according to claim 172 further comprising providing electricity to a load coupled with the terminals with the at least one fuel cell deactivated.

174. The method according to claim 168 wherein the indicating comprises emitting a human perceptible signal.

175. The method according to claim 168 wherein the indicating comprises indicating using a display.

176. The method according to claim 168 further comprising receiving communications from the remote device.

177. The method according to claim 168 further comprising receiving operator inputs using the operator interface.

178. A method of controlling a fuel cell power system comprising:

providing a plurality of fuel cells configured to convert chemical energy into electricity;

providing a first terminal coupled with at least one fuel cell;

providing a second terminal coupled with at least one fuel cell;

supplying electricity to a control system using a power supply comprising a battery;

monitoring at least one operation of at least one of the fuel cells using the control system; and deactivating at least one of the fuel cells.

179. The method according to claim 178 wherein the controlling comprises controlling using the control system comprising a plurality of distributed controllers.

180. The method according to claim 178 wherein the providing the at least one fuel cell comprises providing the fuel cell having a plurality of polymer electrolyte membrane fuel cells.

181. The method according to claim 178 further comprising providing electricity to a load coupled with the terminals with the at least one fuel cell deactivated.

182. The method according to claim 178 further comprising monitoring an electrical condition of the battery and controlling charging of the battery responsive to the monitoring of the electrical condition of the battery.

183. The method according to claim 178 wherein the supplying comprises supplying power using the battery to the control system during a start-up operation of the fuel cell power system.

184. The method according to claim 178 further comprising:

charging the battery; and controlling the charging using the control system.

185. A method of controlling a fuel cell power system comprising:

providing at least one fuel cell configured to convert chemical energy into electricity;

providing a first terminal coupled with the at least one fuel cell;

providing a second terminal coupled with the at least one fuel cell;

monitoring an electrical condition of the at least one fuel cell using a control system; and shunting the at least one fuel cell after the monitoring.

186. The method according to claim 185 wherein the controlling comprises controlling using the control system comprising a plurality of distributed controllers.

187. The method according to claim 185 wherein the providing the at least one fuel cell comprises providing the fuel cell having a plurality of polymer electrolyte membrane fuel cells.

188. The method according to claim 185 wherein the providing the at least one fuel cell comprises providing a plurality of fuel cells.

189. The method according to claim 188 further comprising deactivating at least one of the fuel cells.

190. The method according to claim 189 further comprising providing electricity to a load coupled with the terminals with the at least one fuel cell deactivated.

191. The method according to claim 185 further comprising indicating the electrical condition using an operator interface.

192. The method according to claim 185 further comprising:

directing air to the at least one fuel cell; and controlling the directing using the control system responsive to the monitoring.

193. The method according to claim 185 wherein the shunting is responsive to the monitoring.

194. A method of controlling a fuel cell power system comprising:

providing a plurality of fuel cells individually configured to convert chemical energy into electricity;

providing a first terminal coupled with the fuel cells;

providing a second terminal coupled with the fuel cells;

supplying fuel to the fuel cells, wherein the supplying comprises:

supplying using a main valve; and supplying using a plurality of auxiliary valves in fluid communication with the main valve and respective fuel cells; and controlling the supplying using a control system.

195. The method according to claim 194 wherein the controlling comprises controlling using the control system comprising a plurality of distributed controllers.

196. The method according to claim 194 wherein the providing the fuel cells comprises providing a plurality of polymer electrolyte membrane fuel cells.

197. The method according to claim 194 further comprising deactivating at least one of the fuel cells.

198. The method according to claim 197 further comprising providing electricity to a load coupled with the terminals with the at least one fuel cell deactivated.

199. The method according to claim 194 wherein the supplying comprises supplying using the auxiliary valves positioned intermediate the main valve and the respective fuel cells.

200. The method according to claim 194 wherein the supplying comprises selectively ceasing the supplying of fuel to at least one of the fuel cells using a respective one of the auxiliary valves.

201. The method according to claim 194 wherein the controlling comprises controlling the main valve and the auxiliary valves using the control system.

202. A method of controlling a fuel cell power system comprising:
   providing at least one fuel cell configured to convert chemical energy into electricity;
   providing a first terminal coupled with the at least one fuel cell;
   providing a second terminal coupled with the at least one fuel cell;
   supplying fuel to the at least one fuel cell; and
   monitoring for the presence of fuel within a housing about the at least one fuel cell using a control system.

203. The method according to claim 202 wherein the controlling comprises controlling using the control system comprising a plurality of distributed controllers.

204. The method according to claim 202 wherein the providing the at least one fuel cell comprises providing the fuel cell having a plurality of polymer electrolyte membrane fuel cells.

205. The method according to claim 202 wherein the providing the at least one fuel cell comprises providing a plurality of fuel cells.

206. The method according to claim 205 further comprising deactivating at least one of the fuel cells.

207. The method according to claim 206 further comprising providing electricity to a load coupled with the terminals with the at least one fuel cell deactivated.

208. The method according to claim 202 further comprising:
   coupling an operator interface with the control system; and
   controlling the operator interface using the control system to indicate the presence of fuel within the housing.

209. The method according to claim 202 further comprising:
   selectively ceasing the supplying responsive to the monitoring; and
   controlling the ceasing using the control system.

210. The method according to claim 202 wherein the monitoring comprises monitoring using a fuel sensor.

211. The method according to claim 209 further comprising heating the fuel sensor.

212. A method of controlling a fuel cell power system comprising:
   providing at least one fuel cell configured to convert chemical energy into electricity;
   providing a first terminal coupled with the at least one fuel cell;
   providing a second terminal coupled with the at least one fuel cell; and
   monitoring a temperature within a housing about the at least one fuel cell using a control system.

213. The method according to claim 212 wherein the controlling comprises controlling using the control system comprising a plurality of distributed controllers.

214. The method according to claim 212 wherein the providing the at least one fuel cell comprises providing the fuel cell having a plurality of polymer electrolyte membrane fuel cells.

215. The method according to claim 212 wherein the providing the at least one fuel cell comprises providing a plurality of fuel cells.

216. The method according to claim 215 further comprising deactivating at least one of the fuel cells.

217. The method according to claim 216 further comprising providing electricity to a load coupled with the terminals with the at least one fuel cell deactivated.

218. The method according to claim 212 further comprising selectively one of increasing and decreasing the temperature in the housing using an air temperature control assembly.

219. The method according to claim 218 further comprising controlling the air temperature control assembly using the control system and responsive to the monitoring.

220. The method according to claim 219 wherein the controlling comprises controlling to maintain the temperature in the housing within a predefined range.

221. The method according to claim 219 wherein the controlling comprises controlling to maintain the temperature in the housing within a predefined range of approximately 25° Celsius and 80° Celsius.

222. The method according to claim 212 further comprising:
   directing air to the at least one fuel cell; and
   controlling the directing using the control system and responsive to the monitoring.

223. The method according to claim 212 further comprising:
   inputting exterior air into the housing; and
   controlling the inputting using the control system and responsive to the monitoring.

224. The method according to claim 212 further comprising monitoring a temperature exterior of the housing.

225. The method according to claim 212 wherein the monitoring comprises monitoring using a temperature sensor.

226. A method of controlling a fuel cell power system comprising:
   providing a plurality of fuel cells configured to convert chemical energy into electricity;
   providing a first terminal coupled with the fuel cells;
   providing a second terminal coupled with the fuel cells;
   shunting the fuel cells according to a specified order; and
   controlling the shunting using a control system.

227. The method according to claim 226 wherein the controlling comprises controlling using the control system comprising a plurality of distributed controllers.

228. The method according to claim 226 wherein the providing the fuel cells comprises providing polymer electrolyte membrane fuel cells.

229. The method according to claim 226 further comprising varying a period of time of the shunting using the control system.

230. The method according to claim 226 further comprising deactivating at least one of the fuel cells.

231. The method according to claim 230 further comprising providing electricity to a load coupled with the terminals with the at least one fuel cell deactivated.

232. The method according to claim 226 wherein the shunting according to the specified order comprises sequentially shunting the fuel cells.

233. The method according to claim 226 further comprising:
   detecting a failed one of the fuel cells; and
   ceasing supply of fuel to the failed fuel cell responsive to the detecting.

234. The method according to claim 233 wherein the detecting comprises monitoring an electrical characteristic of the fuel cells.

235. The method according to claim 226 further comprising:
   detecting the presence of fuel; and
   ceasing the supplying responsive to the detecting.

236. A method of controlling a fuel cell power system comprising:
- providing at least one fuel cell configured to convert chemical energy into electricity;
- providing a first terminal coupled with the at least one fuel cell;
- providing a second terminal coupled with the at least one fuel cell;
- switching a connection immediate one of the terminals and the at least one fuel cell;
- controlling the switching using a control system; and
- monitoring a temperature within a housing about the at least one fuel cell and wherein the controlling is responsive to the monitoring.

237. The method according to claim 236 herein the controlling comprises controlling using the control system comprising a plurality of distributed controllers.

238. The method according to claim 236 wherein the providing the at least one fuel cell comprises providing the fuel cell having a plurality of polymer electrolyte membrane fuel cells.

239. The method according to claim 236 wherein the providing the at least one fuel cell comprises providing a plurality of fuel cells.

240. The method according to claim 239 further comprising deactivating at least one of the fuel cells.

241. The method according to claim 240 further comprising providing electricity to a load coupled with the terminals with the at least one fuel cell deactivated.

242. The method according to claim 236 further comprising monitoring an electrical characteristic of the at least one fuel cell and the controlling is responsive to the monitoring.

243. A method of operating a fuel cell power system comprising:
- initiating a start-up procedure;
- monitoring the temperature within a housing containing at least one fuel cell;
- selectively adjusting the temperature within the housing using a modifying element responsive to the monitoring; and
- coupling a power bus with a terminal responsive to the monitoring.

244. The method according to claim 243 further comprising monitoring for the presence of fuel.

245. The method according to claim 243 further comprising:
- shunting the at least one fuel cell according to a duty cycle; and
- selectively setting the duty cycle to maximum.

246. The method according to claim 243 wherein the adjusting comprises heating using the modifying element to increase the temperature.

247. A fuel cell power system comprising:
- a plurality of fuel cells electrically coupled with plural terminals and individually configured to convert chemical energy into electricity; and
- a digital control system comprising a plurality of distributed controllers configured to at least one of control and monitor an operation of the fuel cells.

248. The fuel cell power system according to claim 247 wherein the distributed controllers are configured in a masterslave relationship.

249. A fuel cell power system comprising:
- a plurality of fuel cells electrically coupled with plural terminals and individually configured to convert chemical energy into electricity;
- a digital control system configured to at least one of control and monitor an operation of the fuel cells; and
- a plurality of valves configured to supply fuel to respective fuel cells, and the control system is configured to control the valves.

250. A fuel cell power system comprising:
- a plurality of fuel cells electrically coupled with plural terminals and individually configured to convert chemical energy into electricity;
- a digital control system configured to at least one of control and monitor an operation of the fuel cells; and
- a communication port adapted to couple with a remote device, and the control system is configured to communicate with the remote device via the communication port.

251. A fuel cell power system comprising:
- a plurality of fuel cells electrically coupled with plural terminals and individually configured to convert chemical energy into electricity;
- a digital control system configured to at least one of control and monitor an operation of the fuel cells; and
- a switching device intermediate one of the terminals and the fuel cells, and the control system is configured to control the switching device.

252. A fuel cell power system comprising:
- a plurality of fuel cells electrically coupled with plural terminals and individually configured to convert chemical energy into electricity;
- a digital control system configured to at least one of control and monitor an operation of the fuel cells;
- a housing about the fuel cells; and
- a fuel sensor configured to monitor for the presence of fuel within the housing, and the control system is coupled with the fuel sensor and configured to implement a shut down operation responsive to a detection of fuel within the housing.

253. A fuel cell power system comprising:
- a housing;
- a plurality of terminals;
- at least one fuel cell within the housing and electrically coupled with the terminals and configured to convert chemical energy into electricity;
- a bleed valve configured to selectively purge matter from the at least one fuel cell; and
- a control system comprising a plurality of distributed controllers, wherein the control system is configured to control selective positioning of the bleed valve.

254. A fuel cell power system comprising:
- a housing;
- a plurality of terminals;
- at least one fuel cell within the housing and electrically coupled with the terminals and configured to convert chemical energy into electricity;
- a fan within the housing and configured to direct air to the at least one fuel cell; and
- a control system comprising a plurality of distributed controllers, wherein the control system is configured to control an operation of the fan.

255. A fuel cell power system comprising:
- a housing;
- a plurality of terminals;
- at least one fuel cell within the housing and electrically coupled with the terminals and configured to convert chemical energy into electricity;

a control system comprising a plurality of distributed controllers, wherein the control system is configured to at least one of control and monitor an operation of the at least one fuel cell; and an operator interface coupled with the control system to indicate at least one operational status of the fuel cell power system responsive to control from the control system.

256. A fuel cell power system comprising:

a plurality of terminals;

at least one fuel cell electrically coupled with the terminals and configured to convert chemical energy into electricity;

a sensor configured to monitor at least one electrical condition of the at least one fuel cell; and a control system comprising a plurality of distributed controllers, wherein the control system is coupled with the sensor and configured to monitor the sensor.

257. A fuel cell power system comprising:

a plurality of terminals;

a plurality of fuel cells electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;

a main valve adapted to couple with a fuel source and configured to selectively supply fuel to the fuel cells; and a control system configured to control the main valve.

258. A fuel cell power system comprising:

a housing;

a plurality of terminals;

at least one fuel cell within the housing and electrically coupled with the terminals and configured to convert chemical energy into electricity;

a fuel delivery system configured to supply fuel to the at least one fuel cell;

a fuel sensor positioned within the housing; and a control system comprising a plurality of distributed controllers, wherein the control system is configured to monitor a detection of fuel within the housing using the fuel sensor.

259. A fuel cell power system comprising:

a housing;

a plurality of terminals;

a plurality of fuel cells within the housing and electrically coupled with the terminals and configured to convert chemical energy into electricity, wherein the fuel cells are configured to be individually selectively deactivated and remaining ones of the cells are configured to provide electricity to the terminals with another of the fuel cells deactivated;

a fuel delivery system configured to supply fuel to the at least one fuel cell;

a fuel sensor positioned within the housing; and a control system configured to monitor a detection of fuel within the housing using the fuel sensor.

260. A fuel cell power system comprising:

a housing;

a plurality of terminals;

a plurality of fuel cells within the housing and electrically coupled with the terminals and configured to convert chemical energy into electricity;

a fuel delivery system comprising a plurality of valves configured supply fuel to respective ones of the fuel cells;

a fuel sensor positioned within the housing; and a control system configured to monitor a detection of fuel within the housing using the fuel sensor.

261. The fuel cell power system according to claim 260 wherein the control system is configured to selectively close the valves responsive to a detection of fuel using the fuel sensor.

262. A fuel cell power system comprising:

a plurality of terminals;

at least one fuel cell within the housing and electrically coupled with the terminals and configured to convert chemical energy into electricity;

at least one switching device configured to selectively shunt the at least one fuel cell; and a control system comprising a plurality of distributed controllers, wherein the control system is configured to control the at least one switching device.

263. A fuel cell power system comprising:

a plurality of terminals;

a plurality of fuel cells within the housing and electrically coupled with the terminals and configured to convert chemical energy into electricity, wherein the fuel cells are configured to be individually selectively deactivated and remaining ones of the fuel cells are configured to provide electricity to the terminals with another of the fuel cells deactivated;

at least one switching device configured to selectively shunt at least one of the fuel cells; and a control system configured to control the at least one switching device.

264. A fuel cell power system comprising:

a housing;

a plurality of terminals;

at least one fuel cell within the housing and electrically coupled with the terminals and configured to convert chemical energy into electricity;

a switching device coupled intermediate the at least one fuel cell and one of the terminals; and a control system comprising a plurality of distributed controllers, wherein the control system is coupled with the switching device and configured to control the switching device to selectively couple the terminal with the at least one fuel cell.

265. A method of controlling a fuel cell power system comprising:

providing a plurality of fuel cells individually configured to convert chemical energy into electricity;

electrically coupling the plurality of fuel cells;

providing a first terminal coupled with the fuel cells;

providing a second terminal coupled with the fuel cells;

providing a digital control system comprising a plurality of distributed controllers; and coupling the digital control system with the fuel cells to at least one of monitor and control an operation of the fuel cells.

266. A method of controlling a fuel cell power system comprising:

providing a plurality of fuel cells individually configured to convert chemical energy into electricity;

electrically coupling the plurality of fuel cells;

providing a first terminal coupled with the fuel cells;

providing a second terminal coupled with the fuel cells;

selectively shunting at least one of the fuel cells; and coupling a digital control system with the fuel cells to at least one of monitor and control an operation of the fuel cells.

267. The method according to claim 266 further comprising monitoring at least one electrical characteristic of the fuel cells, and wherein the shunting comprises shunting responsive to the monitoring.

268. A method of controlling a fuel cell power system comprising:

providing a plurality of fuel cells individually configured to convert chemical energy into electricity;

electrically coupling the plurality of fuel cells;

providing a first terminal coupled with the fuel cells;

providing a second terminal coupled with the fuel cells;

coupling a digital control system with the fuel cells to at least one of monitor and control an operation of the fuel cells;

supplying fuel to the fuel cells using a plurality of auxiliary valves in fluid communication with the fuel cells; and controlling the auxiliary valves using the control system.

269. The method according to claim 268 further comprising:

supplying fuel to the auxiliary valves using a main valve; and controlling the main valve using the control system.

270. A method of controlling a fuel cell power system comprising:

providing a plurality of fuel cells individually configured to convert chemical energy into electricity;

electrically coupling the plurality of fuel cells;

providing a first terminal coupled with the fuel cells;

providing a second terminal coupled with the fuel cells;

coupling a digital control system with the fuel cells to at least one of monitor and control an operation of the fuel cells;

communicating with a remote device using a communication port; and controlling the communicating using the control system.

271. A method of controlling a fuel cell power system comprising:

providing a plurality of fuel cells individually configured to convert chemical energy into electricity;

electrically coupling the plurality of fuel cells;

providing a first terminal coupled with the fuel cells;

providing a second terminal coupled with the fuel cells;

coupling a digital control system with the fuel cells to at least one of monitor and control an operation of the fuel cells;

monitoring for the presence of fuel within a housing about the fuel cells; and implementing a shut down operation responsive to the monitoring using the control system.

272. The method according to claim 271 wherein the implementing deactivates one or more of the fuel cells.

273. The method according to claim 272 wherein the implementing deactivates all of the fuel cells.

274. A method of controlling a fuel cell power system comprising:

providing at least one fuel cell configured to convert chemical energy into electricity;

providing a first terminal coupled with the at least one fuel cell;

providing a second terminal coupled with the at least one fuel cell;

providing a control system comprising a plurality of distributed controllers;

supplying fuel to the at least one fuel cell; and controlling the supplying using the control system.

275. A method of controlling a fuel cell power system comprising:

providing at least one fuel cell configured to convert chemical energy into electricity;

providing a first terminal coupled with the at least one fuel cell;

providing a second terminal coupled with the at least one fuel cell;

providing a control system comprising a plurality of distributed controllers;

directing air to the at least one fuel cell; and controlling the directing using the control system.

276. A method of controlling a fuel cell power system comprising:

providing a plurality of fuel cells configured to convert chemical energy into electricity;

providing a first terminal coupled with the fuel cells;

providing a second terminal coupled with the fuel cells;

directing air to the fuel cells;

deactivating at least one of the fuel cells; and controlling the directing using a control system.

277. The method according to claim 276 further comprising providing electricity to a load coupled with the terminals with the at least one fuel cell deactivated.

278. A method of controlling a fuel cell power system comprising:

providing at least one fuel cell configured to convert chemical energy into electricity;

providing a first terminal coupled with the at least one fuel cell;

providing a second terminal coupled with the at least one fuel cell;

providing electricity to a load coupled with the terminals;

monitoring the providing the electricity;

directing air to the at least one fuel cell; and controlling the directing using a control system responsive to the monitoring.

279. A method of controlling a fuel cell power system comprising:

providing at least one fuel cell configured to convert chemical energy into electricity;

providing a first terminal coupled with the at least one fuel cell;

providing a second terminal coupled with the at least one fuel cell;

providing a control system comprising a plurality of distributed controllers;

indicating at least one operational status of the fuel cell power system using an operator interface; and controlling the indicating using the control system.

280. A method of controlling a fuel cell power system comprising:

providing a plurality of fuel cells configured to convert chemical energy into electricity;
providing a first terminal coupled with the fuel cells;
providing a second terminal coupled with the fuel cells;
deactivating at least one of the fuel cells;
indicating at least one operational status of the fuel cell power system using an operator interface; and
controlling the indicating using a control system.

281. The method according to claim 280 further comprising providing electricity to a load coupled with the terminals with the at least one fuel cell deactivated.

282. A method of controlling a fuel cell power system comprising:
providing at least one fuel cell configured to convert chemical energy into electricity;
providing a first terminal coupled with the at least one fuel cell;
providing a second terminal coupled with the at least one fuel cell;
providing a control system comprising a plurality of distributed controllers; and
monitoring an electrical condition of the at least one fuel cell using the control system.

283. A method of controlling a fuel cell power system comprising:
providing a plurality of fuel cells configured to convert chemical energy into electricity;
providing a first terminal coupled with the fuel cells;
providing a second terminal coupled with the fuel cells;
monitoring an electrical condition of at least one of the fuel cells using a control system; and
deactivating at least one of the fuel cells.

284. The method according to claim 283 further comprising providing electricity to a load coupled with the terminals with the at least one fuel cell deactivated.

285. A method of controlling a fuel cell power system comprising:
providing a plurality of fuel cells individually configured to convert chemical energy into electricity;
providing a first terminal coupled with the fuel cells;
providing a second terminal coupled with the fuel cells;
providing a control system comprising a plurality of distributed controllers;
supplying fuel to the fuel cells; and
controlling the supplying using the control system.

286. A method of controlling a fuel cell power system comprising:
providing a plurality of fuel cells individually configured to convert chemical energy into electricity;
providing a first terminal coupled with the fuel cells;
providing a second terminal coupled with the fuel cells;
supplying fuel to the fuel cells;
controlling the supplying using a control system; and
deactivating at least one of the fuel cells.

287. The method according to claim 286 further comprising providing electricity to a load coupled with the terminals with the at least one fuel cell deactivated.

288. A method of controlling a fuel cell power system comprising:
providing at least one fuel cell configured to convert chemical energy into electricity;
providing a first terminal coupled with the at least one fuel cell;
providing a second terminal coupled with the at least one fuel cell;
providing a control system comprising a plurality of distributed controllers;
shunting the at least one fuel cell; and
controlling the shunting using the control system.

289. A method of controlling a fuel cell power system comprising: providing at least one fuel cell configured to convert chemical energy into electricity;
providing a first terminal coupled with the at least one fuel cell;
providing a second terminal coupled with the at least one fuel cell;
providing a control system comprising a plurality of distributed controllers;
switching a connection immediate one of the terminals and the at least one fuel cell; and
controlling the switching using the control system.

290. A fuel cell power system comprising:
a plurality of fuel cells electrically coupled with plural terminals and individually configured to convert chemical energy into electricity;
a digital control system configured to at least one of control and monitor an operation of the fuel cells; and
a plurality of switching devices configured to selectively shunt respective fuel cells.

291. The fuel cell power system according to claim 290 wherein the control system is configured to monitor at least one electrical characteristic of the fuel cells and to control the switching devices responsive to the monitoring.

292. A fuel cell power system comprising:
a plurality of fuel cells electrically coupled with plural terminals and individually configured to convert chemical energy into electricity;
a digital control system configured to at least one of control and monitor an operation of the fuel cells;
a housing about the fuel cells;
a temperature sensor within the housing; and
an air temperature control assembly configured to at least one of increase and decrease the temperature in the housing.

293. The fuel cell power system according to claim 292 wherein the control system is configured to monitor temperature using the temperature sensor and to control the air temperature control assembly responsive to the monitoring to maintain the temperature within the housing within a predefined range.

294. The fuel cell power system according to claim 292 wherein the control system is configured to monitor temperature using the temperature sensor and to control the air temperature control assembly responsive to the monitoring to maintain the temperature within the housing within a predefined range of approximately 25° Celsius to 80° Celsius.

295. A fuel cell power system comprising:
a plurality of terminals;
at least one fuel cell electrically coupled with the terminals and configured to convert chemical energy into electricity;
a power supply comprising a battery; and
a control system comprising a plurality of distributed controllers configured to receive electricity from the battery and to at least one of control and monitor at least one operation of at least the one of the fuel cells.

296. A fuel cell power system comprising:
a plurality of terminals;
a plurality of fuel cells electrically coupled with the terminals and configured to convert chemical energy into electricity;
a power supply comprising a battery; and
a control system configured to receive electricity from the battery and to at least one of control and monitor at least one operation of at least one of the fuel cells;
wherein the fuel cells are configured to be individually selectively deactivated and remaining ones of the fuel cells are configured to provide electricity to the terminals with others of the fuel cells deactivated.

297. A method of controlling a fuel cell power system comprising:
providing at least one fuel cell configured to convert chemical energy into electricity;
providing a first terminal coupled with the at least one fuel cell:
providing a second terminal coupled with the at least one fuel cell;
selectively bleeding a connection coupled with the at least one fuel cell to purge matter from the at least one fuel cell; and
controlling the bleeding using a control system comprising a plurality of distributed controllers.

298. A method of controlling a fuel cell power system comprising:
providing at least one fuel cell configured to convert chemical energy into electricity;
providing a first terminal coupled with the at least one fuel cell;
providing a second terminal coupled with the at least one fuel cell;
supplying electricity to a control system comprising a plurality of distributed controllers using a power supply comprising a battery; and
monitoring at least one operation of the at least one fuel cell using the control system.

299. A method of controlling a fuel cell power system comprising:
providing at least one fuel cell configured to convert chemical energy into electricity;
providing a first terminal coupled with the at least one fuel cell;
providing a second terminal coupled with the at least one fuel cell;
supplying electricity to a control system using a power supply comprising a battery;
monitoring at least one operation of the at least one fuel cell using the control system;
monitoring an electrical condition of the battery; and
controlling charging of the battery responsive to the monitoring of the electrical condition of the battery.

300. A method of controlling a fuel cell power system comprising:
providing at least one fuel cell configured to convert chemical energy into electricity;
providing a first terminal coupled with the at least one fuel cell:
providing a second terminal coupled with the at least one fuel cell;
supplying electricity to a control system using a power supply comprising a battery;
monitoring at least one operation of the at least one fuel cell using the control system;
charging the battery; and
controlling the charging using the control system.

* * * * *

UNITED STATES PATENT AND TRADEMARK OFFICE
CERTIFICATE OF CORRECTION

PATENT NO.   : 6,387,556 B1
DATED        : May 14, 2002
INVENTOR(S)  : William A. Fuglevand et al.

It is certified that error appears in the above-identified patent and that said Letters Patent is hereby corrected as shown below:

Column 1,
Line 9, replace "6,096,499" with -- 6,096,449 --.

Column 4,
Line 34, replace "reset function a" with -- reset function --.

Column 8,
Line 15, replace "6,0303,718" with -- 6,030,718 --.

Column 15,
Line 36, replace "determine s" with -- determines --.

Column 16,
Line 17, replace "as $\geqq 5000$ ppm" with -- as $\geq 5000$ ppm --.

Column 19,
Line 4, replace "at so step" with -- at step --.

Column 21,
Lines 12-13, replace "6,076,449" with -- 6,096,449 --.

Column 26,
Line 77, replace "herein" with -- wherein --.

Column 31,
Line 29, replace "svstem" with -- system --.
Line 30, replace "c ontroll ing" with -- controlling --.

Column 32,
Line 4, replace "bleeding to purge diluents from" with -- bleeding from --.

Column 35,
Line 40, replace "209" with -- 210 --.

Column 37,
Line 15, replace "herein" with -- wherein --.
Lines 61-62, replace "masterslave" with -- master\slave --.

Column 39,
Line 52, replace "ones of the cells" with -- ones of the fuel cells --.

UNITED STATES PATENT AND TRADEMARK OFFICE
CERTIFICATE OF CORRECTION

PATENT NO. : 6,387,556 B1
DATED : May 14, 2002
INVENTOR(S) : William A. Fuglevand et al.

It is certified that error appears in the above-identified patent and that said Letters Patent is hereby corrected as shown below:

Column 41,
Line 64, replace "272" with -- 271 --.

Signed and Sealed this

Sixth Day of April, 2004

JON W. DUDAS
*Acting Director of the United States Patent and Trademark Office*

(12) EX PARTE REEXAMINATION CERTIFICATE (7187th)
United States Patent
Fuglevand et al.

(10) Number: US 6,387,556 C1
(45) Certificate Issued: Nov. 24, 2009

(54) FUEL CELL POWER SYSTEMS AND METHODS OF CONTROLLING A FUEL CELL POWER SYSTEM

(75) Inventors: William A. Fuglevand, Spokane, WA (US); Shiblihanna I. Bayyuk, Spokane, WA (US); Greg Lloyd, Spokane, WA (US); Peter D. Devries, Spokane, WA (US); David R. Lott, Spokane, WA (US); John P. Scartozzi, Spokane, WA (US)

(73) Assignee: Relion, Inc., Spokane, WA (US)

Reexamination Request:
No. 90/008,681, Jul. 28, 2007

Reexamination Certificate for:
Patent No.: 6,387,556
Issued: May 14, 2002
Appl. No.: 09/322,666
Filed: May 28, 1999

Certificate of Correction issued Apr. 6, 2004.

Related U.S. Application Data

(63) Continuation-in-part of application No. 09/108,667, filed on Jul. 1, 1998, now Pat. No. 6,096,449, which is a continuation-in-part of application No. 08/979,853, filed on Nov. 20, 1997, now Pat. No. 6,030,718.

(51) Int. Cl.
H01M 8/10 (2006.01)
H01M 8/24 (2006.01)
H01M 8/02 (2006.01)
H01M 8/04 (2006.01)

(52) U.S. Cl. .......................... 429/22; 429/23; 429/24; 429/25; 429/9

(58) Field of Classification Search .................. None
See application file for complete search history.

(56) References Cited

U.S. PATENT DOCUMENTS

| | | | |
|---|---|---|---|
| 3,072,146 A | | 1/1963 | Gizeski |
| 3,160,528 A | | 12/1964 | Dengler |
| 3,300,341 A | * | 1/1967 | Gregory et al. ............ 429/24 |
| 3,432,356 A | | 3/1969 | Christianson |
| 3,553,023 A | | 1/1971 | Doyle |

(Continued)

FOREIGN PATENT DOCUMENTS

| | | | |
|---|---|---|---|
| EP | 0 827 226 | | 3/1998 |
| JP | 59-207565 A | * | 11/1984 |
| JP | 60-65471 A | * | 4/1985 |
| JP | 60-212966 A | * | 10/1985 |
| JP | 6-96787 A | * | 4/1994 |

(Continued)

OTHER PUBLICATIONS

Figaro Product Information, Sep. 2002.
L.G. Austin, "Fuel Cells, A Review of Government Sponsered Research, 1950–1964," Article, 1967, pp. 1–11.

(Continued)

*Primary Examiner*—Alan Diamond

(57) ABSTRACT

Fuel cell power systems and methods of controlling a fuel cell power system are provided. According to one aspect, a fuel cell power system includes a plurality of fuel cells electrically coupled with plural terminals and individually configured to convert chemical energy into electricity; and a digital control system configured to at least one of control and monitor an operation of the fuel cells. Another aspect provides a method of controlling a fuel cell power system including providing a plurality of fuel cells individually configured to convert chemical energy into electricity; electrically coupling the plurality of fuel cells; providing a first terminal coupled with the fuel cells; providing a second terminal coupled with the fuel cells; and coupling a digital control system with the fuel cells to at least one of monitor and control an operation of the fuel cells.

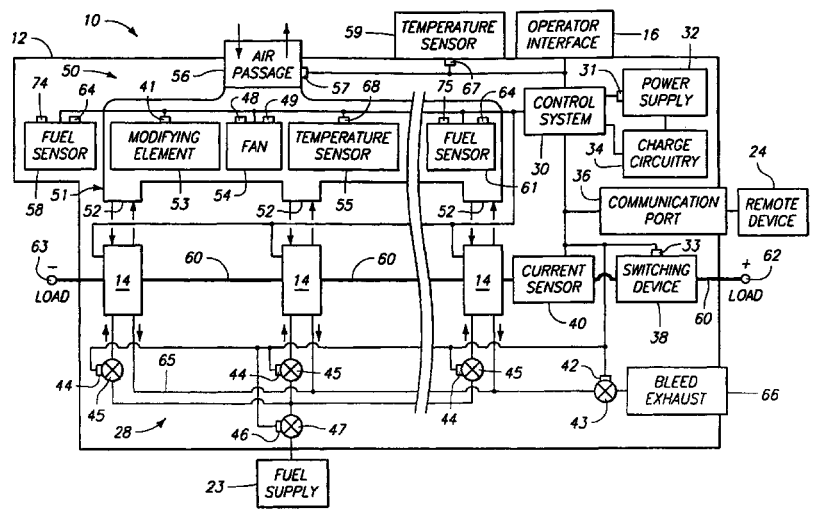

U.S. PATENT DOCUMENTS

| | | | |
|---|---|---|---|
| 3,580,741 A | * 5/1971 | Hovious et al. | 429/23 |
| 4,098,959 A | 7/1978 | Fanciullo | |
| 4,178,840 A | 12/1979 | Caknis | |
| 4,243,731 A | 1/1981 | Cheron | |
| 4,304,823 A | * 12/1981 | Lemelson | 429/19 |
| 4,310,605 A | 1/1982 | Early et al. | |
| 4,324,844 A | 4/1982 | Kothmann | |
| 4,407,903 A | * 10/1983 | Gutbier et al. | 429/23 |
| 4,508,793 A | 4/1985 | Kumata | |
| 4,517,259 A | 5/1985 | Lance | |
| 4,640,873 A | 2/1987 | Tajima | |
| 4,729,930 A | 3/1988 | Beal | |
| 4,741,978 A | 5/1988 | Takabayashi | |
| 4,782,669 A | 11/1988 | Trocciola et al. | |
| 4,839,246 A | 6/1989 | Takabayashi | |
| 4,883,724 A | 11/1989 | Yamamoto | |
| 4,913,983 A | 4/1990 | Cheiky | |
| 4,961,151 A | 10/1990 | Early et al. | |
| 5,094,928 A | 3/1992 | Dyer | |
| 5,124,622 A | 6/1992 | Kawamura | |
| 5,156,928 A | 10/1992 | Takabayashi | |
| 5,170,124 A | 12/1992 | Blair | |
| 5,298,341 A | 3/1994 | Khandkar | |
| 5,334,463 A | 8/1994 | Tajima et al. | |
| 5,366,820 A | 11/1994 | Tsutsumi | |
| 5,366,821 A | 11/1994 | Merritt et al. | |
| 5,401,589 A | 3/1995 | Palmer et al. | |
| 5,462,815 A | 10/1995 | Horiuchi | |
| 5,470,671 A | 11/1995 | Fletcher et al. | |
| 5,480,738 A | 1/1996 | Elangovan | |
| 5,532,072 A | 7/1996 | Spaeh et al. | |
| 5,543,240 A | 8/1996 | Lee | |
| 5,547,777 A | 8/1996 | Richards | |
| 5,573,867 A | 11/1996 | Zafred | |
| 5,599,638 A | * 2/1997 | Surampudi et al. | 429/33 |
| 5,637,414 A | 6/1997 | Inoue | |
| 5,726,552 A | 3/1998 | Okamura | |
| 5,734,255 A | 3/1998 | Thompson | |
| 5,741,605 A | 4/1998 | Gillett et al. | |
| 5,744,936 A | 4/1998 | Kawakami | |
| 5,750,278 A | 5/1998 | Gillett | |
| 5,763,113 A | * 6/1998 | Meltser et al. | 429/13 |
| 5,780,980 A | 7/1998 | Naito | |
| 5,780,981 A | 7/1998 | Sonntag et al. | |
| 5,798,187 A | * 8/1998 | Wilson et al. | 429/26 |
| 5,853,910 A | * 12/1998 | Tomioka et al. | 429/17 |
| 5,877,600 A | 3/1999 | Sonntag | |
| 5,886,614 A | * 3/1999 | Cheng et al. | 338/34 |
| 5,962,155 A | 10/1999 | Kuranaka | |
| 5,991,670 A | 11/1999 | Mufford | |
| 6,001,499 A | 12/1999 | Grot et al. | |
| 6,013,385 A | 1/2000 | DuBose | |
| 6,074,771 A | * 6/2000 | Cubukcu et al. | 429/30 |
| 6,194,095 B1 | * 2/2001 | Hockaday | 429/34 |
| 7,445,647 B1 | 11/2008 | Davis et al. | |

FOREIGN PATENT DOCUMENTS

| | | | |
|---|---|---|---|
| JP | 06-96787 A | | 4/1994 |
| JP | 8-31436 A | * | 2/1996 |
| JP | 8-37013 A | * | 2/1996 |
| JP | 9-293524 A | * | 11/1997 |
| WO | WO 91/19328 | | 12/1991 |
| WO | WO 98/13891 | | 4/1998 |

OTHER PUBLICATIONS

Unknown, Smithsonian Intitution, "Collecting the History of Fuel Cells," Article, Sep. 2007, pp. 1–4.

Warshay & Prokopius, "The Fuel Cell in Space: Yesterday, Today and Tomorrow," Memorandum, Sep. 1989, pp. 1–11, Cleveland, OH.

Kenneth A. Burke, "Fuel Cells for Space Science Applications," Article, Nov. 2003, pp. 1–7.

NASA, "Project Gemini Familiarization Manual, Rendezvous & Docking Configurations," Manual, Jul. 1966, pp. 1–22, NASA.

NASA, "Gemini Program Mission Report," Jan. 1967, pp. 1–25, NASA, Houston, TX.

NASA, "Apollo Spacecraft Familiarization," Manual, Dec. 1966, pp. 1–11, NASA, Houston, TX.

NASA, Design of an Autonomous Lunar Construction Utility Vehicle, Manual, 1989–1990, NASA.

N.H. Hagedorn, "Modification of a Fuel–Cell Engine for Control by a Digital Computer," Abstract, Jun. 1972, p. 1, NASA.

Hagedorn & Thomas, "Monitoring and Control of Fuel–Cell System by Digital Computer," Abstract, Oct. 1973, p. 1, NASA.

Hanaway & Moorehead, "Space Shuttle Avionics System," Book, 1989, pp. 1–9, NASA, Washington, DC.

Nadal & Barbir, "Development of a Hybrid Fuel Cell/Battery Powered Electric Vehicle," Sep. 11, 1995, pp. 497–505.

* cited by examiner

US 6,387,556 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 10 between lines 41 and 42:
*As disclosed in U.S. Pat. No. 6,096,449, a shunt controller is provided which is coupled in controlling relation relative to a fuel cell supply valve, and a plurality of switching devices, and which allows the fuel supply valve to substantially continuously supply a source of fuel gas to the fuel cell. It is speculated that selected, repeated, electrical shunting of the respective fuel cells while continuously supplying fuel gas to the respectively shunted fuel cells causes the respective fuel cells to be "conditioned", that is, shunting is believed to cause an increase in the amount of water that is available to the fuel cells thereby increasing the power output of the respective fuel cells following the shunting. The overall increase in the electrical power output of the fuel cells as controlled by the adjustable, sequential, shunting of the individual fuel cells, or group of fuel cells results in the entire serially connected group of fuel cells increasing in their overall power production. A control system 30 for implementing this feature of the invention will be discussed in detail in the paragraphs which follow.*

AS A RESULT OF REEXAMINATION, IT HAS BEEN DETERMINED THAT:

Claims 2, 4, 7, 8, 23–64, 67, 68, 70–99, 102–104, 107 and 112–300 are cancelled.

Claims 1, 3, 5, 6, 9–22, 65, 66, 69, 100, 101, 105, 106 and 108–111 are determined to be patentable as amended.

1. A fuel cell power system comprising:
*a DC bus having plural terminals electrically coupled to a load;*
*a plurality of serially electrically coupled and conductive contacts electrically coupled to the DC bus;*
a plurality of fuel [cells electrically coupled with plural terminals and] *cell cartridges which are serially electrically coupled together, each cartridge enclosing a plurality of polymer electrolyte membrane fuel cells, each fuel cell* individually configured to convert chemical energy into electricity, *wherein the respective fuel cell cartridges are releasably electrically coupled to both the plurality of conductive contacts and the DC bus, and* wherein the fuel [cells] *cell cartridges* are configured to be individually selectively deactivated and remaining ones of the fuel [cells] *cell cartridges* are configured to provide electricity to the terminals with another of the fuel cells deactivated *and while the deactivated fuel cell cartridge remains in physical contact with the conductive contacts, and further wherein the fuel cell cartridges, while operational, are physically removable from the DC bus while the remaining fuel cell cartridges remain operational*; and
a digital control system configured to at least one of control and monitor an operation of the fuel [cells] *cell cartridges*.

3. The fuel cell power system according to claim 1, *and* wherein the control system is configured to monitor the operation *of the fuel cell power system*.

5. The fuel cell power system according to claim 1, *and* wherein the control system comprises a plurality of distributed controllers.

6. The fuel cell power system according to claim 5, *and* wherein the distributed controllers are configured in a master\slave relationship.

9. The fuel cell power system according to claim 1, *and* wherein the fuel [cells] *cell cartridges* are individually configured to be electrically bypassed.

10. The fuel cell power system according to claim 1, *and* further comprising a plurality of switching devices configured to selectively, *repeatedly, electrically* shunt respective fuel cells *while continuously supplying fuel gas to the respective shunted fuel cells so as to increase the power output of the respective fuel cells following the shunting*.

11. The fuel cell power system according to claim 10, *and* wherein the control system is configured to monitor at least one electrical characteristic of the fuel cells and to control the switching devices responsive to the monitoring.

12. The fuel cell power system according to claim 1, *and* further comprising:
a housing about the fuel [cells] *cell cartridges*;
a temperature sensor within the housing; and
an air temperature control assembly configured to at least one of increase and decrease the temperature in the housing.

13. The fuel cell power system according to claim 12, *and* wherein the control system is configured to monitor temperature using the temperature sensor and to control the air temperature control assembly responsive to the monitoring to maintain the temperature within the housing within a predefined range.

14. The fuel cell power system according to claim 12, *and* wherein the control system is configured to monitor temperature using the temperature sensor and to control the air temperature control assembly responsive to the monitoring to maintain the temperature within the housing within a predefined range of approximately 25° Celsius to 80° Celsius.

15. The fuel cell power system according to claim 1, *and* further comprising a fan configured to direct air to the fuel [cells] *cell cartridges*, and the control system is configured to control the fan.

16. The fuel cell power system according to claim 1, *and* further comprising a plurality of valves configured to *selectively* supply fuel to respective fuel [cells] *cell cartridges*, and the control system is configured to control the valves.

17. The fuel cell power system according to claim 1, *and* further comprising a main valve configured to supply fuel to the fuel [cells] *cell cartridges*, and the control system is configured to control the main valve.

18. The fuel cell power system according to claim 1, *and* further comprising a communication port adapted to couple with a remote device, and the control system is configured to communicate with the remote device via the communicaton port.

19. The fuel cell power system according to claim 1, *and* wherein the control system is configured to implement a shut down operation to deactivate one or more of the fuel [cells] *cell cartridges*.

20. The fuel cell power system according to claim 19, *and* wherein the control system is configured to implement the shut down operation to deactivate all the fuel [cells] *cell cartridges*.

21. The fuel cell power system according to claim 1, *and* further comprising a switching device intermediate one of the terminals and the fuel [cells] *cell cartridges*, and the control system is configured to control the switching device.

22. The fuel cell power system according to claim 1, *and* further comprising:
  a housing [about] *for enclosing* the fuel [cells] *cell cartridges*; and
  a fuel sensor configured to monitor for the presence of fuel within the housing, and *wherein* the control system is coupled with the fuel sensor and configured to implement a shut down operation responsive to a detection of fuel within the housing.

65. *A fuel cell power system comprising:*
  *a plurality of terminals electrically coupled to a load;*
  *a DC bus electrically coupled to the plurality of terminals;*
  *a plurality of serially electrically coupled and conductive contacts electrically coupled to the DC bus;*
  *a plurality of serially electrically connected* fuel [cells] *cell cartridges which are releasably* electrically coupled with [both] the [terminals and] *plurality of conductive contacts and the DC bus, each cartridge enclosing a plurality of polymer electrolyte membrane fuel cells, each fuel cell* configured to convert chemical energy into electricity, *and wherein each fuel cell cartridge is configured to be individually selectively deactivated and remaining fuel cell cartridges are configured to provide electricity to the plurality of terminals with another of the fuel cell cartridges deactivated and while the deactivated fuel cell cartridge remains in physical contact with the conductive contacts, and further wherein the fuel cell cartridges, while operational, are physically removable from the DC bus while the remaining fuel cell cartridges remain operational;*
  a main valve [adapted to couple] *coupled* with a fuel source [cells] *which is supplied to the respective fuel cell cartridges*;
  a plurality of auxiliary valves in fluid communication with the main valve and configured to selectively supply *the source of* fuel to respective fuel [cells] *cell cartridges, and wherein the auxiliary valves terminate the flow of the source of fuel to the deactivated respective fuel cell cartridges*; and
  a control system configured to control the main valve.

66. The fuel cell power system according to claim 65, *and* wherein the control system comprises a plurality of distributed controllers.

69. The fuel cell power system according to claim 65, *and* wherein the auxiliary valves are positioned intermediate the main valve and *the* respective fuel [cells] *cell cartridges*.

100. *A fuel cell power system comprising:*
  *a housing for enclosing a fuel cell power system;*
  *a plurality of terminals electrically coupled to a load;*
  *a D.C. bus mounted within the housing and electrically coupled with the plurality of terminals;*
  *a plurality of serially electrically coupled conductive contacts electrically coupled to the D.C. bus;*
  a plurality of *air cooled, serially electrically coupled* fuel [cells] *cell cartridges positioned* within the housing, and *which are releasably* electrically coupled with *both* the [terminals and] *plurality of conductive contacts, and the D.C. bus, and wherein the respective fuel cell cartridges enclose a plurality of polymer electrolyte membrane fuel cells, and wherein the respective fuel cells are individually* configured to convert chemical energy into electricity, *and either wherein the respective fuel cell cartridges may be selectively deactivated while remaining in electrical contact with the conductive contacts and within the housing while the remaining fuel cells remain operational and continue to produce electricity which is supplied to the DC bus, or wherein the respective fuel cell cartridges, while operatonal, may be physically removed from the housing of the fuel cell power system while the remaining fuel cell cartridges remain operational and continue to produce electricity which is supplied to the DC bus*;
  a plurality of switching devices individually configured to selectively, *repeatedly, electrically* shunt at least one of the fuel cells *while continuously supplying fuel gas to the at least one shunted fuel cell so as to increase the power output of the at least one fuel cell following shunting*; and
  a control system configured to control the switching devices *to perform the shunting*.

101. The fuel cell power system according to claim 100, *and* wherein the control system comprises a plurality of distributed controllers.

105. The fuel cell power system according to claim 100, *and* wherein the control system is configured to shunt the at least one fuel cell for a variable period of time.

106. The fuel cell power system according to claim 100, *and* wherein the control system is configured to sequentially shunt the fuel cells using the respective switching devices.

108. The fuel cell power system according to claim [107] *100, and* wherein the control system is configured to shunt the individual ones of the fuel cells according to a specified order.

109. The fuel cell power system according to claim 100, *and* further comprising a plurality of valves individually configured to selectively supply fuel to *the* respective fuel [cells] *cell cartridges*, and wherein the control system is configured to control the valves.

110. The fuel cell power system according to claim 109, *and* wherein the control system is configured to cease *the* supply of fuel to [shunted fuel cells using respective ones of the valves] *the fuel cell cartridges which are deactivated*.

111. The fuel cell power system according to claim 100, *and* wherein the switching devices comprise MOSFET switching devices.

* * * * *